US008775051B2

(12) United States Patent
Hirai et al.

(10) Patent No.: US 8,775,051 B2
(45) Date of Patent: Jul. 8, 2014

(54) APPARATUS FOR DIAGNOSING TEMPERATURE STATE OF CARRIER OF CATALYST CONVERTER

(75) Inventors: Taro Hirai, Kariya (JP); Noriaki Ikemoto, Kariya (JP); Takeshi Harada, Kariya (JP); Naoyuki Kamiya, Kariya (JP); Hisashi Iida, Kariya (JP)

(73) Assignee: Denso Corporation, Kariya (JP)

( * ) Notice: Subject to any disclaimer, the term of this patent is extended or adjusted under 35 U.S.C. 154(b) by 526 days.

(21) Appl. No.: 13/096,344

(22) Filed: Apr. 28, 2011

(65) Prior Publication Data

US 2011/0268613 A1 Nov. 3, 2011

(30) Foreign Application Priority Data

Apr. 28, 2010 (JP) ................................. 2010-103573

(51) Int. Cl.
*F02D 41/00* (2006.01)
*G06F 11/00* (2006.01)

(52) U.S. Cl.
USPC .................. 701/102; 123/568.31; 60/277

(58) Field of Classification Search
CPC . F02D 41/222; F02D 41/266; F02D 41/0072; F02D 2041/001; F02M 25/0754; F02M 25/0776; G05B 23/02; G06F 11/008; G06F 11/2257; B60W 10/06; F01N 3/26; F01N 3/2026; F01N 11/007; F01N 2610/02
USPC ........ 701/102, 108, 114; 123/568.31; 60/277, 60/286, 300, 303; 702/183, 185
See application file for complete search history.

(56) References Cited

U.S. PATENT DOCUMENTS

| 5,758,492 A | 6/1998 | Kato et al. | |
| 6,034,610 A | 3/2000 | Schnaibel et al. | |
| 7,958,720 B2* | 6/2011 | Okamoto et al. | 60/284 |
| 2003/0136118 A1* | 7/2003 | Sakai | 60/302 |
| 2004/0210378 A1* | 10/2004 | Ellmer | 701/114 |
| 2005/0022507 A1* | 2/2005 | Schneider et al. | 60/277 |
| 2007/0089402 A1* | 4/2007 | Bruck | 60/285 |

(Continued)

FOREIGN PATENT DOCUMENTS

| JP | H06-173663 | 6/1994 |
| JP | 11-083791 | 3/1999 |

(Continued)

OTHER PUBLICATIONS

Translation of JP 2009-191681.*

(Continued)

*Primary Examiner* — John Kwon
*Assistant Examiner* — Johnny Hoang
(74) *Attorney, Agent, or Firm* — Nixon & Vanderhye P.C.

(57) ABSTRACT

An apparatus is used for diagnosing the temperature state of a catalyst converter. The catalyst converter includes a catalyst for cleaning an emission, and a conductive carrier for carrying the catalyst. The conductive carrier is energized for temperature rise of the catalyst, and the conductive carrier has a characteristic in which resistance drops with temperature increase. In the apparatus, a first obtaining unit obtains a first parameter having a first correlation with supply power to the conductive carrier for energization of the conductive carrier. A second obtaining unit obtains a second parameter having a second correlation with a temperature of the conductive carrier. A diagnosing unit diagnoses the temperature state of the conductive carrier based on a comparison between the first parameter and the second parameter.

11 Claims, 18 Drawing Sheets

(56) References Cited

U.S. PATENT DOCUMENTS

| | | | |
|---|---|---|---|
| 2009/0105924 A1* | 4/2009 | Kamichi et al. | 701/99 |
| 2010/0222982 A1* | 9/2010 | Wang et al. | 701/102 |
| 2011/0107827 A1* | 5/2011 | Alich et al. | 73/114.75 |

FOREIGN PATENT DOCUMENTS

| | | |
|---|---|---|
| JP | H11-083791 | 3/1999 |
| JP | 3602614 | 10/2004 |
| JP | 2005-194935 A | 7/2005 |
| JP | P2005-194935 A | 7/2005 |
| JP | 2006-183602 A | 7/2006 |
| JP | P2006-183602 A | 7/2006 |
| JP | 2009-191681 A | 8/2009 |
| JP | P2009-191681 A | 8/2009 |

OTHER PUBLICATIONS

Japanese Office Action dated Oct. 9, 2012, issued in corresponding Japanese Application No. 2010-103573, with English translation.
Japanese Office Action dated Feb. 14, 2012, issued in corresponding Japanese Application No. 2010-103573, with English translation.

* cited by examiner

APPARATUS FOR DIAGNOSING TEMPERATURE STATE OF CARRIER OF CATALYST CONVERTER

CROSS REFERENCE TO RELATED APPLICATIONS

This application is based on Japanese Patent Application 2010-103573 filed on Apr. 28, 2010. This application claims the benefit of priority from the Japanese Patent Application, so that the descriptions of which are all incorporated herein by reference.

TECHNICAL FIELD

The present disclosure relates to apparatuses for diagnosing the temperature state of an electrically heated catalyst converter to be used for cleaning engine emissions; this electrically heated catalyst converter has a conductive carrier with a characteristic in which electric resistance drops with temperature increase.

BACKGROUND

Engine emission control is one of the important technologies installed in modern motor vehicles. In order to clean exhaust emissions through the exhaust pipe of an internal combustion engine, a catalyst is normally provided in the exhaust pipe. Catalysts are characterized to activate with their temperatures equal to or higher than an activation temperature, and, in the activated state, oxidize particular components in the exhaust emissions. Thus, when the temperature of a catalyst provided in the exhaust pipe is lower than its activation temperature during, for example, engine start-up, heating the carrier of the catalyst to activate the catalyst as soon as possible is required. As an example of how to heat the carrier of a catalyst, U.S. Pat. No. 5,758,492 corresponding to Japanese Examined Patent Publication No. 3602614 discloses an electrically heated catalyst converter, referred to simply as an "EHC converter", which supplies current to the conductive carrier of the EHC converter to thereby heat the carrier.

SUMMARY

The inventors have discovered that there is a problem in cases of applying, to an EHC converter, a catalyst converter whose conductive carrier has a characteristic in which electric resistance drops with temperature increase; this characteristic will be referred to as an NTC (Negative Temperature Coefficient) characteristic.

Generally, a conductive carrier is produced by adding conductive material to base material (conductive material or non-conductive material), such as ceramic material. Non-uniform distribution of the conductive material, non-uniform distribution of the density of the base material, and/or non-uniform thickness of the conductive carrier may cause different resistance portions in the conductive carrier.

Specifically, if the conductive carrier of a catalyst converter with the NTC characteristic used as the EHC converter has a portion with lower resistance than the remaining portions, current supplied to the conductive carrier flows locally through the lower-resistance portion, resulting in local heating of the lower-resistance portion.

As the locally heated portion drops in resistance, the locally heated portion more increases in temperature, resulting the carrier in temperature nonuniform state. In this situation of the EHC converter with its conductive carrier in the temperature nonuniform state, if a system is designed to measure the temperature of the conductive carrier of the EHC converter, and supply current to the conductive carrier until the measured temperature value is equal to or lower than a threshold value, the system may erroneously determine that the measured temperature value is equal to or higher than the threshold value although the temperature values of the remaining portions are lower than the threshold value. This is because the temperature of the lower-resistance portion (locally-heated portion) of the conductive carrier is a dominant temperature of the conductive carrier.

This erroneous determination may cause the system to erroneously determine that the temperature of the catalyst reaches its activation temperature so that the system stops the supply of current to the conductive carrier of the EHC converter with the temperature of the catalyst being lower than its activation temperature. This may make it insufficient for the catalyst to clean the exhaust emissions, deteriorating the controllability of the exhaust emissions.

In view of the circumstances set forth above, an aspect of the present disclosure seeks to provide apparatuses for diagnosing the temperature state of an electrically heated catalyst converter; these apparatuses are designed to solve the problem set forth above.

Specifically, an alternative aspect of the present disclosure aims to provide such diagnostic apparatuses capable of diagnosing whether a conductive carrier of the electrically heated catalyst converter is in temperature nonuniform state.

According to one aspect of the present disclosure, there is provided an apparatus for diagnosing temperature state of a catalyst converter comprising a catalyst for cleaning an emission, and a conductive carrier for carrying the catalyst. The conductive carrier is energized for temperature rise of the catalyst. The conductive carrier has a characteristic in which resistance drops with temperature increase. The apparatus includes a first obtaining unit configured to obtain a first parameter having a first correlation with supply power to the conductive carrier for energization of the conductive carrier, and a second obtaining unit configured to obtain a second parameter having a second correlation with a temperature of the conductive carrier. The apparatus includes a diagnosing unit configured to diagnose the temperature state of the conductive carrier based on a comparison between the first parameter and the second parameter.

According to an alternative aspect of the present disclosure, there is provided a computer program product for an apparatus for diagnosing temperature state of a catalyst converter. The catalyst converter includes a catalyst for cleaning an emission, and a conductive carrier for carrying the catalyst. The conductive carrier is energized for temperature rise of the catalyst. The conductive carrier has a characteristic in which resistance drops with temperature increase. The computer program product includes a computer usable medium, and a set of computer program instructions embodied on the computer useable medium. The instructions includes a first instruction to obtain a first parameter having a first correlation with supply power to the conductive carrier for energization of the conductive carrier, a second instruction to obtain a second parameter having a second correlation with a temperature of the conductive carrier, and a third instruction to diagnose the temperature state of the conductive carrier based on a comparison between the first parameter and the second parameter.

The inventors have found that, if there is no local heating in the conductive carrier, the first parameter has a correlation with the second parameter. Because the second parameter has the second correlation with the temperature of the conductive carrier, the diagnostic apparatus according to the one aspect of the present disclosure and the computer program product according to the alternative aspect of the present disclosure can determine the temperature state of the conductive carrier based on a result of the comparison between the first parameter and the second parameter, such as the difference therebetween.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENTS

Figure 1:
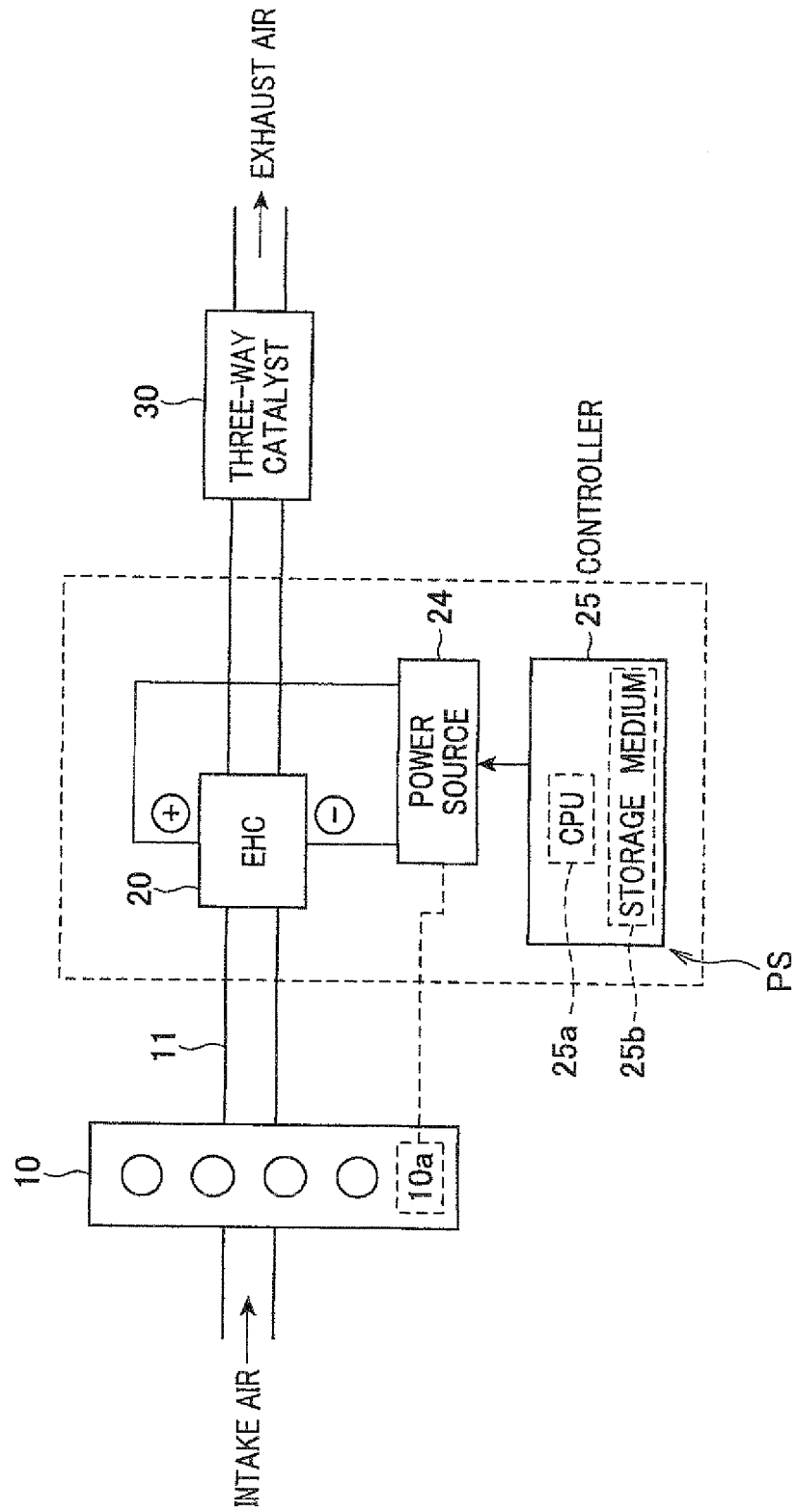
FIG. 1 is a schematic structural view of a power supply system for supplying power to an electrically heated catalyst (EHC) converter located in an exhaust pipe of an internal combustion engine according to the first embodiment of the present disclosure.

Embodiments of the present disclosure will be described hereinafter with reference to the accompanying drawings. In the drawings, identical reference characters are utilized to identify corresponding identical components.

First Embodiment

Referring to FIG. 1, there is illustrated an internal combustion engine 10 with an exhaust pipe 11, an electrically heated catalyst converter (EHC converter) 20, and a power supply system PS for supplying power to the EHC converter 20. A diagnostic apparatus for the temperature state of the EHC converter 20 according to the first embodiment of the present disclosure is, for example, designed as a part of the power supply system PS.

As an example of internal combustion engines, a spark-ignited gasoline engine is used. The spark-ignited gasoline engine, referred to simply as an engine, 10 is installed in a motor vehicle. The motor vehicle installs therein a drive motor (not shown). The engine 10 and drive motor cooperatively operate as a drive source of the motor vehicle.

Specifically, the engine 10 works to compress air-fuel mixture by the piston within each cylinder using intake air, and burn the compressed air-fuel mixture within each cylinder. This changes the fuel energy to mechanical energy, such as rotative energy, to reciprocate the piston within each cylinder, thus rotating a crankshaft (not shown) of the engine 10. The rotation of the crankshaft is transferred to driving wheels through a powertrain installed in the motor vehicle to thereby drive the motor vehicle.

The drive motor works to rotate the crankshaft when energized.

In the exhaust pipe 11 of the engine 10, the EHC converter 20 and a three-way catalyst 30 are provided. The EHC converter 20 is located downstream of the engine 10, and the three-way catalyst 30 is located downstream of the EHC converter 20. The EHC converter 20 is characterized to activate with its temperature equal to or higher than a predetermined activation temperature, and, in the activated state, the EHC converter 20 oxidizes hydrocarbons (HC) in exhaust emissions out of the engine 10 through the exhaust pipe 11, and reduces carbon monoxide (CO) and oxides of nitrogen (NOx) in the exhaust emissions to purify the HC, CO, and NOx. Similarly, the three-way catalyst 30 is characterized to activate with its temperature equal to or higher than a predetermined activation temperature, and, in the activated state, the three-way catalyst 30 oxidizes HC in the exhaust emissions through the exhaust pipe 11, and reduces CO and NOx in the exhaust emissions to purify the HC, CO, and NOx.

For example, the EHC converter 20 is smaller in size than the three-way catalyst 30 to reduce the time required for the EHC converter 20 to reach the activation temperature.

Figure 2:
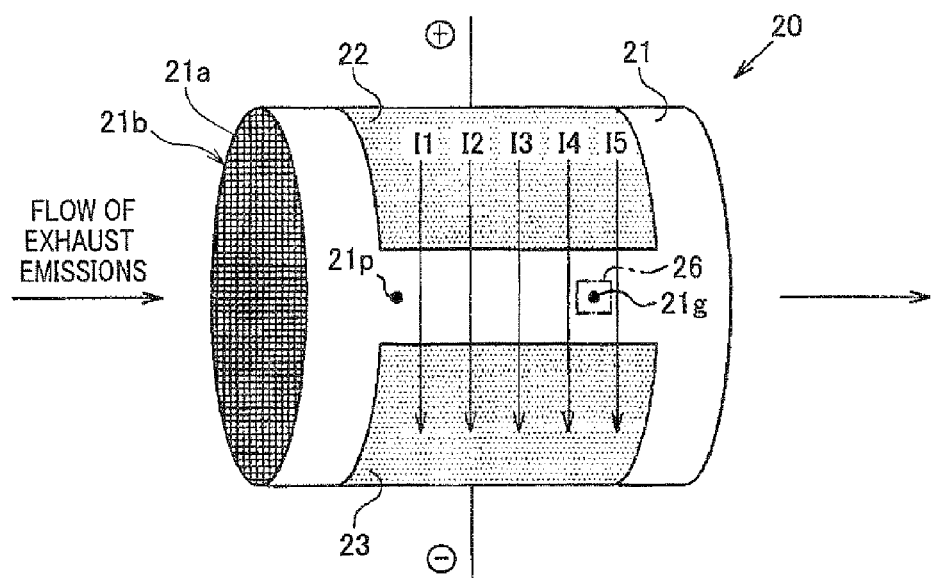
FIG. 2 is an enlarged perspective view of the EHC converter illustrated in FIG. 1.

FIG. 2 is an enlarged perspective view of an example of the structure of the EHC converter 20. The EHC converter 20 is comprised of a substantially cylindrical ceramic honeycomb carrier 21 with conductivity having many channels (flow-through cells) 21a; these channels 21a are arranged in the flow direction of the exhaust emissions through the exhaust pipe 11. That is, the ceramic honeycomb carrier, referred to simply as a ceramic carrier, 21 is configured as a honeycomb wall defining the channels 21a. On the inner surface of the honeycomb wall 21, which faces a corresponding channel 21a, a catalyst 21b is carried by, for example, coating.

The power supply system PS includes a pair of positive and negative electrodes 22 and 23, a power source 24, and a controller 25. The positive electrode 22 is mounted on one part of the outer circumferential surface of the ceramic carrier 21, and the negative electrode 23 is so mounted on another part of the outer circumferential surface of the ceramic carrier 21 as to be opposite to the positive electrode 22 with gaps therebetween.

Figure 3:
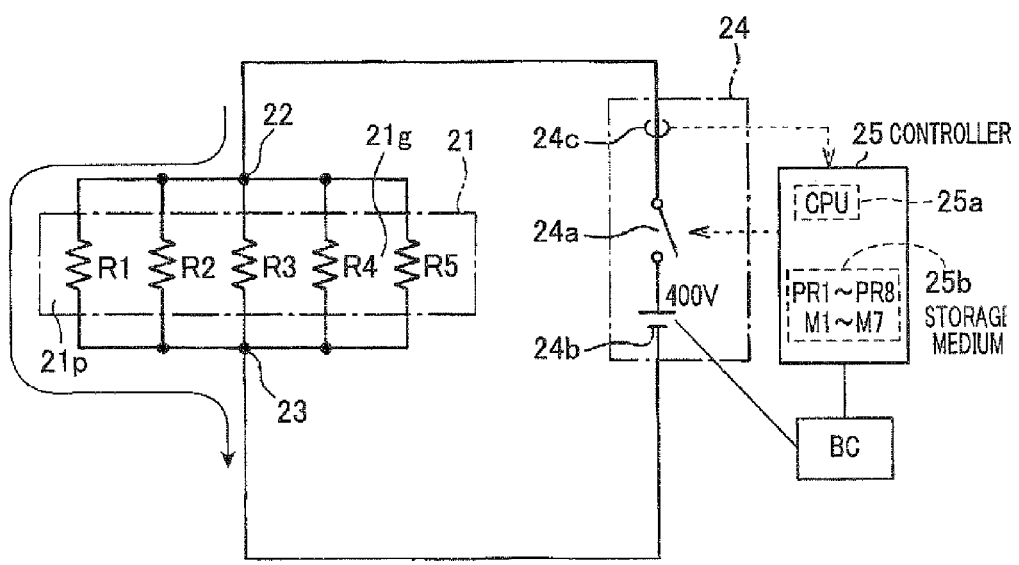
FIG. 3 is an equivalent circuit diagram of the power supply system and the ceramic carrier of the EHC converter according to the first embodiment.

The power source 24 is electrically connected with the positive and negative electrodes 22 and 23 via corresponding conductors (wires). As illustrated in FIG. 3, the motor vehicle according to the first embodiment includes a battery, such as a lithium rechargeable battery, 24b for driving the drive motor. The power source 24 is designed to apply a terminal voltage of, for example, an approximately 400 Volts (V), across the positive and negative terminals 22 and 23. The power source 24 also includes a switch 24a located at the conductor between the battery 24b and the positive terminal 22. The switch 24 is controllably connected with the controller 25, and is designed to open or close according to instructions sent from the controller 25.

That is, when the terminal voltage is applied across the positive and negative electrodes 22 and 23, currents flow from the positive electrode 22 to the negative electrode 23 through the ceramic carrier 21 (see reference characters I1 to I5 in FIG. 2). This causes the ceramic carrier 21 to heat up, increasing in temperature.

The power source 24 also includes a current sensor 24c for measuring supply current from the battery 24b to the ceramic carrier 21. The current sensor 24c is electrically connected with the controller 25, and the current value measured by the current sensor 24c is output therefrom to the controller 25.

Generally, conductive ceramic is produced by adding conductive material to base material (conductive material or non-conductive material), such as ceramic material. Nonuniform distribution of the conductive material, nonuniform distribution of the density of the ceramic material, and/or nonuniform thickness of the conductive ceramic may cause different resistance portions in the conductive ceramic.

For at least these reasons, the conductive ceramic carrier 21 consists of a plurality of identically-shaped unit portions with different resistance values. For example, if the electrically conducting path of the ceramic carrier 21 between the positive and negative electrodes 22 and 23 consists of five unit sections in the direction of the current with different resistance values, the electrical connection between the positive and negative electrodes 22 and 23 via the ceramic carrier 21 can be expressed as an equivalent circuit illustrated in FIG. 3 in which five resistors R1 to R5 with different resistance values are connected between the positive and negative electrodes 22 and 23 in parallel with each other.

Reference characters I1 to I5 illustrated in FIG. 2 represent currents individually flowing through the respective resistors R1 to R5. For example, if the resistance value of the resistor R1 is the lowest in the five resistors R1 to R5, the current I1 is the highest in all of the currents I1 to I5. This causes the unit portion of the ceramic carrier 21 corresponding to the resistor R1 to increase in temperature more than another unit portion; this unit portion corresponding to the resistor R1 with the highest resistance value will be referred to as a lower-resistance portion 21p hereinafter.

A battery controller BC installed in the motor vehicle is operative to measure the terminal voltage of the battery 24b to control the amount of charge in the battery 24b based on the measured terminal voltage. The battery controller BC is also operative to supply, to the controller 25, the measured terminal voltage.

The controller 25 is designed as, for example, a normal microcomputer circuit consisting of, for example, a CPU 25a; a storage medium 25b including a ROM (Read Only Memory), such as a rewritable ROM, a RAM (Random Access Memory), and the like; an I/O (Input and output) interface; buses; and so on. The CPU 25a, storage medium 25b, and the I/O interface are communicably connected with each other via the buses. The storage medium 25b stores therein beforehand various programs including a catalyst warm-up program PR1 and a program PR2 for diagnosing the temperature state of the ceramic carrier 21 described later.

Specifically, the controller 25, that is, its CPU 25a, is operative to calculate, based on the measured current value inputted from the current sensor 24 and the measured terminal voltage inputted from the battery controller BC, resistance R of the electrically conducting path of the ceramic carrier 21 between the positive and negative electrodes 22 and 23; the resistance R is equivalent to the combined resistance of the resistance values of the resistors R1 to R5. The resistance R of the electrically conducting path of the ceramic carrier 21 between the positive and negative electrodes 22 and 23 will also be referred to as a "resistance R of the ceramic carrier 21".

Note that temperature T of the ceramic carrier 21 and the resistance R of the electrically conducting path of the ceramic carrier 21 between the positive and negative electrodes 22 and 23 have a correlation therebetween; this correlation will be referred to as an "R-T characteristic" of the ceramic carrier 21. In the first embodiment, the storage medium 25b stores therein a map M1 designed as, for example, a data table, a program, and/or a formula; this map M1 represents the R-T characteristic between a variable of the temperature T of the ceramic carrier 21 and a variable of the resistance R of the electrically conducting path of the ceramic carrier 21 between the positive and negative electrodes 22 and 23. The map M1 can have been determined based on data obtained by tests and/or simulations using the power supply system PS, the engine 10, and the EHC converter 20 or their equivalent computer models.

Specifically, the CPU 25a of the controller 25 is operative to reference the map M1 using a calculated value of the resistance R of the ceramic carrier 21 as a key to extract, based on a result of the reference, a value of the temperature T of the ceramic carrier 21 corresponding to the calculated value of the resistance R thereof. In the first embodiment, the R-T characteristic of the ceramic carrier 21 is the NTC characteristic in which electrical resistance of the ceramic carrier 21 drops with temperature increase. In other words, the ceramic carrier 21 is made from, for example, an SiC (Silicon Carbide) material having such an NTC characteristic.

Figure 4:
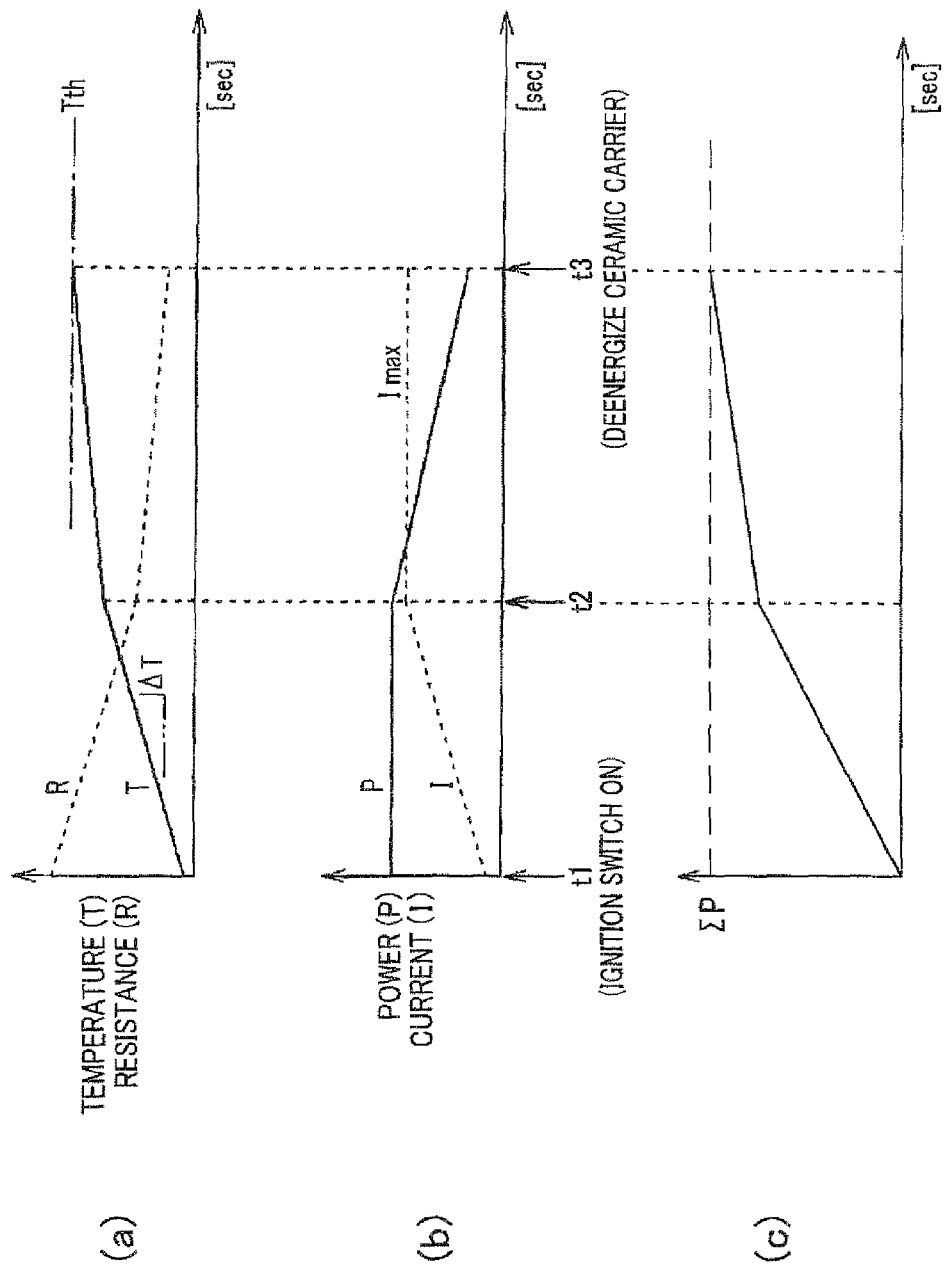
FIG. 4 is a timing chart schematically illustrating the transitions of the temperature and the resistance of the ceramic carrier, and the transitions of supply power and supply current to the ceramic carrier during a controller illustrated in FIG. 3 running a catalyst warm-up program according to the first embodiment.

FIG. 4 is a timing chart schematically illustrating the transitions of the temperature T and the resistance R of the ceramic carrier 21, and the transitions of supply power (P) and supply current (I) to the ceramic carrier 21 during the CPU 25a running the catalyst warm-up program PR1 in response to when an ignition switch of the motor vehicle is turned on by the driver.

Specifically, if the temperature T of the ceramic carrier 21, which is equivalent to the temperature of the catalyst 21b and outside air temperature, is lower than the activation temperature of the catalyst 21b at time t1 when the ignition switch is turned on, the CPU 25a determines that a catalyst warm-up request occurs, then turning on the switch 24a to supply power from the power source 24 to the ceramic carrier 21 of the EHC converter 20 without waiting engine start-up. The amount of the power supplied to the ceramic carrier 21 is set to be as great as the EHC converter 20 cannot be damaged. Note that the CPU 25a can adjust the duty cycle of the switch 24a, that is, the ratio of on time to a corresponding cycle (on time+off time) to thereby control the amount of the supply power to the ceramic carrier 21. A circuit for variably setting a current value of the supply power to the ceramic carrier 21 can be provided in order to control the amount of the supply power thereto. At that time, the CPU 25a sets, based on the temperature T of the ceramic carrier 21 and the activation temperature Tth, a target value ΣPth of the integral ΣP of the power supplied to the ceramic carrier 21.

After the time t1, the temperature T of the ceramic carrier 21 gradually rises with drop in the resistance R of the ceramic carrier 21 (see (a) of FIG. 4). Thus, the supply current I of the power P to the ceramic carrier 21 increases although the supply power P is controlled to be constant because of the drop in the resistance R of the ceramic carrier 21 (see (b) of FIG. 4). After the supply current I reaches a predetermined maximum value Imax at time t2, the CPU 25a adjusts the duty cycle of the switch 24a so that the supply current I does not exceed the maximum value Imax. In other words, the CPU 25a adjusts the duty cycle of the switch 24a to reduce the supply power P to the ceramic carrier 21 such that, even if the resistance R of the ceramic carrier 21 drops with increase in the temperature T thereof, the supply current I is limited to be lower than the maximum value Imax. This limitation of the supply current I allows the rate (gradient ΔT) of the temperature rise and the rate of the resistance drop to be reduced.

Thereafter, when the integral ΣP of the power P supplied to the ceramic carrier 21 is equal to or greater than the target value ΣPth and when the temperature T of the ceramic carrier 21 reaches the activation temperature Tth of the catalyst 21b at time t3, the CPU 25a determines that the EHC converter 20, that is, the catalyst 21b of the EHC converter 20 is considered to be activated so that the catalyst warm-up request is cancelled, thus turning off the switch 24a to deenergize the ceramic carrier 21, and terminating the catalyst warm-up program PR1 (see (a) and (c) of FIG. 4).

Note that another approach for warming up the EHC converter 20 is known; this approach is designed to retard the ignition timing of the engine 10 relative to a previously specified timing, such as a preset degree of BTDC to thereby increase the temperature of the exhaust emissions through the exhaust pipe 11. However, this approach would carry out the warming up of the EHC converter 20 only after engine start-up.

In contrast, the power supply system PS according to the first embodiment is capable of carrying out the warming up of the EHC converter 20 without waiting engine start-up, thus completing the warming up of the EHC converter 20 as early as possible, improving the engine-emission performance of the motor vehicle.

As described above, the lower-resistance portion 21p in the ceramic carrier 21 is higher in temperature than another portion therein. Because the ceramic carrier 21 of the EHC converter 20 has the NTC characteristic, the higher the ceramic carrier 21 in temperature is, the lower the resistance of the low resistance portion 21p in the ceramic carrier 21 is. This facilitates temperature rise of the low resistance portion 21p, resulting in local heating of the lower-resistance portion 21p. The locally heated portion 21p causes the ceramic carrier 21 to be in temperature nonuniform state. The ceramic carrier 21 in the temperature nonuniform state may cause the controller 25 to erroneously determine that the temperature T of the ceramic carrier 21 reaches the activation temperature Tth although the temperature values of the remaining portions except for the locally heated portion 21p in the ceramic carrier 21 are lower than the activation temperature Tth. This is because the temperature of the locally heated portion 21p in the ceramic carrier 21 is a dominant temperature of the ceramic carrier 21. This erroneous determination may cause the controller 25 to stop the supply of power to the ceramic carrier 21 of the EHC converter 20 irrespective of the temperature of the catalyst 21b being lower than the activation temperature Tth. This may make it insufficient for the catalyst 21b to clean the exhaust emissions, deteriorating the engine-emission performance of the motor vehicle.

In addition, as the level of the temperature nonuniform in the ceramic carrier 21 is stimulated, the locally heated portion 21p in the ceramic carrier 21 may excessively rise in temperature to a degree that there may be a risk of thermal damage of EHC converter 20.

In view of the aforementioned circumstances, the controller 25 of the power supply system PS is configured to diagnose, in accordance with the diagnostic program PR2, whether the ceramic carrier 21 is in the temperature nonuniform state and whether there is an excessive temperature-rise fault in the ceramic carrier 21.

Figure 5:
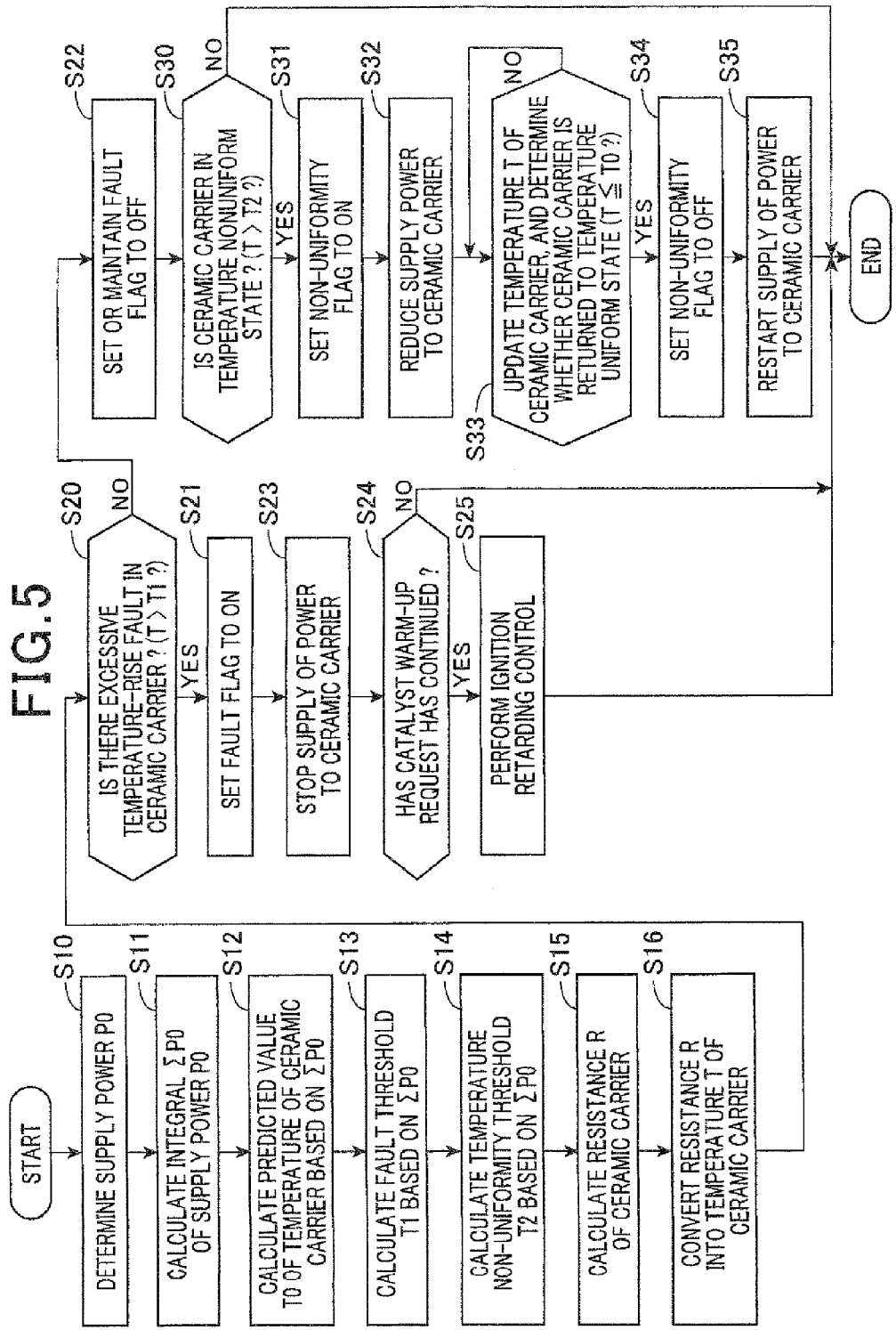
FIG. 5 is a flowchart schematically illustrating a sequence of operations of the CPU of the controller in accordance with a diagnostic program according to the first embodiment.

FIG. 5 is a flowchart schematically illustrating a sequence of operations of the CPU 25a in accordance with the diagnostic program PR2. In other words, the power supply system PS serves as the diagnostic apparatus for the temperature state of the ceramic carrier 21. The CPU 25a runs the diagnostic program PR2 in response to the occurrence of the catalyst warm-up request as a trigger, and repeatedly runs the diagnostic program PR2 in a preset cycle.

When launching the diagnostic program PR2, the CPU 25a determines supply power P0 to the ceramic carrier 21 of the EHC converter 20 in step S10. Specifically, the CPU 25a determines, based on an initial temperature of the catalyst 21b (ceramic carrier 21) and/or outside air temperature, the supply power P0 to the ceramic carrier 21 of the EHC converter 20 such that the determined supply power P0 is a higher value to which there cannot be a risk of thermal damage of EHC converter 20. Then, in step S10, the CPU 25a adjusts the duty cycle of the switch 24a to cause the determined supply power P0 from the power source 24 to the ceramic carrier 21. This results in that current based on the supply power P0 flows through the electrically conducting path of the ceramic carrier 21 so that the ceramic carrier 21 is heated.

In step S11, the CPU 25a calculates the integral ΣP0 of the supply power P0 to the ceramic carrier 21.

In step S12, the CPU 25a calculates a predicted value T0 of the temperature of the ceramic carrier 21 (EHC converter 20) based on the integral ΣP0 of the supply power P0 to the ceramic carrier 21 calculated in step S11. Specifically, the temperature of the ceramic carrier 21 should be increased with increase in the integral ΣP0 of the supply power P0, so the integral ΣP0 of the supply power P0 has a correlation with the temperature of the ceramic carrier 21.

In other words, if there is no local heating in the ceramic carrier 21, the integral ΣP0 is in proportion to the temperature T of the ceramic carrier 21 in accordance with the following equation (1):

$$\Sigma P0 = C1 \times T \tag{1}$$

where C1 is a proportional constant.

For example, in the first embodiment, the storage medium 25b stores therein a map M2 designed as, for example, a data table, a program, and/or a formula; this map M2 represents the correlation between a variable of the integral ΣP0 of the supply power P0 and a variable of the temperature of the ceramic carrier 21. The map M2 can have been determined based on data obtained by tests and/or simulations using the power supply system PS, the engine 10, and the EHC converter 20 or their equivalent computer models. The map M2 can be described in the diagnostic program PR2.

Specifically, in step S12, the CPU 25a references the map M2 using the integral ΣP0 of the supply power P0 as a key to extract, based on a result of the reference, a predicted value T0 of the temperature of the ceramic carrier 21 corresponding to the integral ΣP0 of the supply power P0.

Following the operation in step S12, the CPU 25a calculates, based on the integral ΣP0 of the supply power P0 calculated in step S11, a fault threshold T1 for the temperature of the ceramic carrier 21 in step S13; this fault threshold T1 is set to be higher than the activation temperature Tth of the catalyst 21b, and is used to determine whether there is an excessive temperature-rise fault in the ceramic carrier 21. For example, the CPU 25a calculates the fault threshold T1 based on the map M2 such that, the greater the integral ΣP0 of the supply power P0 is, the higher the fault threshold T1 is.

Next, the CPU 25a calculates, based on the integral ΣP0 of the supply power P0 calculated in step S11, a temperature non-uniformity threshold T2 for the temperature of the ceramic carrier 21 in step S14; this non-uniformity threshold T2 is used to determine whether the ceramic carrier 21 is in the temperature nonuniform state. For example, the CPU 25a calculates the temperature non-uniformity threshold T2 based on the map M2 such that, the greater the integral ΣP0 of the supply power P0 is, the higher the temperature non-uniformity threshold T2 is, and the temperature non-uniformity threshold T2 is lower than the fault threshold T1.

Subsequent to the operation in step S14, the CPU 25a calculates, based on the measured current value inputted from the current sensor 24 and the measured terminal voltage inputted from the battery controller BC, the resistance R of the electrically conducting path of the ceramic carrier 21 between the positive and negative electrodes 22 and 23 in step S15; the resistance R is equivalent to the combined resistance of the resistance values of the resistors R1 to R5.

In step S16, the CPU 25a references the map M1 using the calculated value of the resistance R of the ceramic carrier 21 as a key to extract, based on a result of the reference, a value of the temperature T of the ceramic carrier 21 corresponding to the calculated value of the resistance R thereof in step S15. In other words, the CPU 25a converts the calculated value of the resistance R of the ceramic carrier 21 into the value of the temperature T using the map M1. Note that the value of the temperature T of the ceramic catalyst 21 is obtained assuming that there is no local heating in the ceramic carrier 21.

Following the operation in step S16, the CPU 25a compares the value of the temperature T obtained in step S16 with the fault threshold T1 calculated in step S13 to thereby determine, based on a result of the comparison, whether the value of the temperature T is higher than the fault threshold T1 in step S20. This determination in step S20 is to determine whether there is an excessive temperature-rise fault in the ceramic carrier 21 due to local heating.

If the value of the temperature T is higher than the fault threshold T1 (YES in step S20), the CPU 25a determines that the temperature nonuniform state is facilitated to a degree that there may be a risk of thermal damage of the EHC converter 20. In other words, the CPU 25a determines that an excessive temperature-rise fault occurs in the ceramic carrier 21. Then, the CPU 25a sets a fault flag in the form of, for example, a bit to ON (1) in step S21. For example, the fault flag is set to an initial value of OFF (0).

Otherwise, if the value of the temperature T is equal to or lower than the fault threshold T1 (NO in step S20), the CPU 25a determines that the temperature nonuniform state is not facilitated to a degree that there may be a risk of thermal damage of the EHC converter 20. Then, the CPU 25a sets or maintains the fault flag to OFF (0) in step S22.

Following the operation in step S21, the CPU 25a controls the power source 24, for example, turns off the switch 24a, thus stopping the supply of power to the ceramic carrier 21 in step S23. Note that, once the fault flag has been set to ON, even if the fault flag is set to OFF based on the determination of the value of the temperature T being equal to or lower than the fault threshold T1, the CPU 25a can continue to stop the supply of power to the ceramic carrier 21 until the next catalyst warm-up request occurs.

Subsequent to the operation in step S23, the CPU 25a determines whether the catalyst warm-up request has continued in step S24. Upon determining that the catalyst warm-up request has continued (YES in step S24), that is, the integral ΣP0 of the supply power P0 is smaller than the target value ΣPth, the CPU 25a determines that the temperature of another portion in the ceramic carrier 21 except for the locally heated portion 21p does not reach the activation temperature Tth. Then, the CPU 25a carries out ignition retarding control to cause an igniter 10a of the engine 10 to adjust the ignition timing of the engine 10 so that fuel ignition in the engine 10 happens later than a previously specified (designed) timing in step S25. The ignition retarding control increases the temperature of the exhaust emissions through the exhaust pipe 11. That is, the ignition retarding control carried out in step S25 allows the temperature T of the whole of the ceramic carrier 21 to reach the activation temperature Tth by the exhaust emissions with high temperature with the supply of power to the ceramic carrier 21 being stopped. Note that, in step S25, when performing the ignition retarding control, the CPU 25a sets an ignition retarding flag in the form of, for example, a bit to ON (1). An initial value of the ignition retarding flag is set to OFF (0).

Otherwise, upon determining that the catalyst warm-up request has not continued (NO in step S24), the CPU 25a terminates the diagnostic program PR2 without carrying out the ignition retarding control, and repeats the operations in the diagnostic program PR2 from step S10 in the next cycle.

On the other hand, subsequent to the operation in step S22, the CPU 25a compares the value of the temperature T obtained in step S16 with the temperature non-uniformity threshold T2 calculated in step S14 to thereby determine, based on a result of the comparison, whether the value of the temperature T is higher than the temperature non-uniformity threshold T2 in step S30. This determination in step S30 is to determine whether the ceramic carrier 21 is in the temperature nonuniform state due to local heating.

If the value of the temperature T is higher than the temperature non-uniformity threshold T2 (YES in step S30), the CPU 25a determines that the ceramic carrier 21 is in the temperature nonuniform state. Then, the CPU 25a sets a non-uniformity flag in the form of, for example, a bit to ON (1) in step S31; the non-uniformity flag of ON represents that the ceramic carrier 21 is in the temperature nonuniform state. For example, the non-uniformity flag is set to an initial value of OFF (0).

Otherwise, if the value of the temperature T is equal to or lower than the temperature non-uniformity threshold T2 (NO in step S30), the CPU 25a determines that the ceramic carrier 21 is not in the temperature nonuniform state. Then, the CPU 25a terminates the diagnostic program PR2 and repeats the operations in the diagnostic program PR2 from step S10 in the next cycle.

Following the operation in step S31, the CPU 25a controls the power source 24 to reduce the supply power P0 to the ceramic carrier 21 in step S32. For example, in step S32, the CPU 25a adjusts the duty cycle of the switch 24a or reduces current of the supply power P0 to the ceramic carrier 21 to reduce the supply power P0 to the ceramic carrier 21. This reduction in the supply power P0 to the ceramic carrier 21 reduces the amount and/or rate of heating of the locally heated portion (lower-resistance portion) in the ceramic carrier 21. This results in reduction in the non-uniformity of the temperature distribution in the ceramic carrier 21 because heat is conducted from the locally heated portion to another portion in the ceramic carrier 21. For example, in the first embodiment, the CPU 25a reduces the supply power P0 to the ceramic carrier 21 up to zero.

Subsequent to the operation in step S32, the CPU 25a updates the value of the temperature T obtained in step S16, and compares the updated value of the temperature T with the predicted value T0 calculated in step S12 to thereby determine, based on a result of the comparison, whether the updated value of the temperature T is equal to or lower than the predicted value T0 in step S33. This determination in step S33 is to determine whether the non-uniformity of the temperature distribution in the ceramic carrier 21 is reduced to a degree that the temperature state of the ceramic carrier 21 can be taken to temperature uniform state.

Note that, in the first embodiment, the CPU 25a is designed to calculate the value of the temperature T of the ceramic carrier 21 based on the calculated value of the resistance R, and no current flows through the ceramic carrier 21 after the operation in step S32. For this reason, in step S33, the CPU 25a cannot update the value of the temperature T with no current flowing through the ceramic carrier 21.

Then, in step S33, the CPU 25a adjusts the duty cycle of the switch 24a to periodically supply fine current from the power source 24 to the ceramic carrier 21, and periodically calculates the value of the resistance R with the fine current flowing through the ceramic carrier 21 to periodically update the value of the temperature T based on the calculated value of the resistance R. Because fine current is periodically supplied from the power source 24 to the ceramic carrier 21, power supplied to the ceramic carrier 21 based on the fine current is very lower than the supply power P0a to the ceramic carrier 21 after the return of the catalyst warm-up.

If the updated value of the temperature T is equal to or lower than the predicted value T0 (YES in step S33), the CPU 25a determines that the temperature state of the ceramic carrier 21 is returned to a temperature uniform state. Then, the CPU 25a sets the non-uniformity flag to OFF in step S34, and restarts the supply of power to the ceramic carrier 21 with a value of the supplied power limited to be lower than the supply power P0; the supply power P0 was determined at the last time when the temperature state of the ceramic carrier 21 was determined to be a temperature uniform state with the temperature non-uniformity flag of OFF in step S35. Thereafter, the CPU 25a terminates the diagnostic program PR2 and repeats the operations in the diagnostic program PR2 from step S10 in the next cycle.

Otherwise, if the updated value of the temperature T is higher than the predicted value T0 (NO in step S33), the CPU 25a determines that the ceramic carrier 21 remains the temperature nonuniform state. Then, the CPU 25a repeats the operation step S33 while updating the value of the temperature T until the updated value of the temperature T is equal to or lower than the predicted value T0 (YES in step S33).

Note that, if the CPU 25a adjusts the duty cycle of the switch 24a such that the supply power P0 to the ceramic carrier 21 is higher than zero in step S32, and the determination in step S33 is negative, the CPU 25a terminates the diagnostic program PR2 and repeats the operations in the diagnostic program PR2 from step S11 in the next cycle. This is because the supply power P0 to the ceramic carrier 21 has been determined in step S32.

Figure 6:
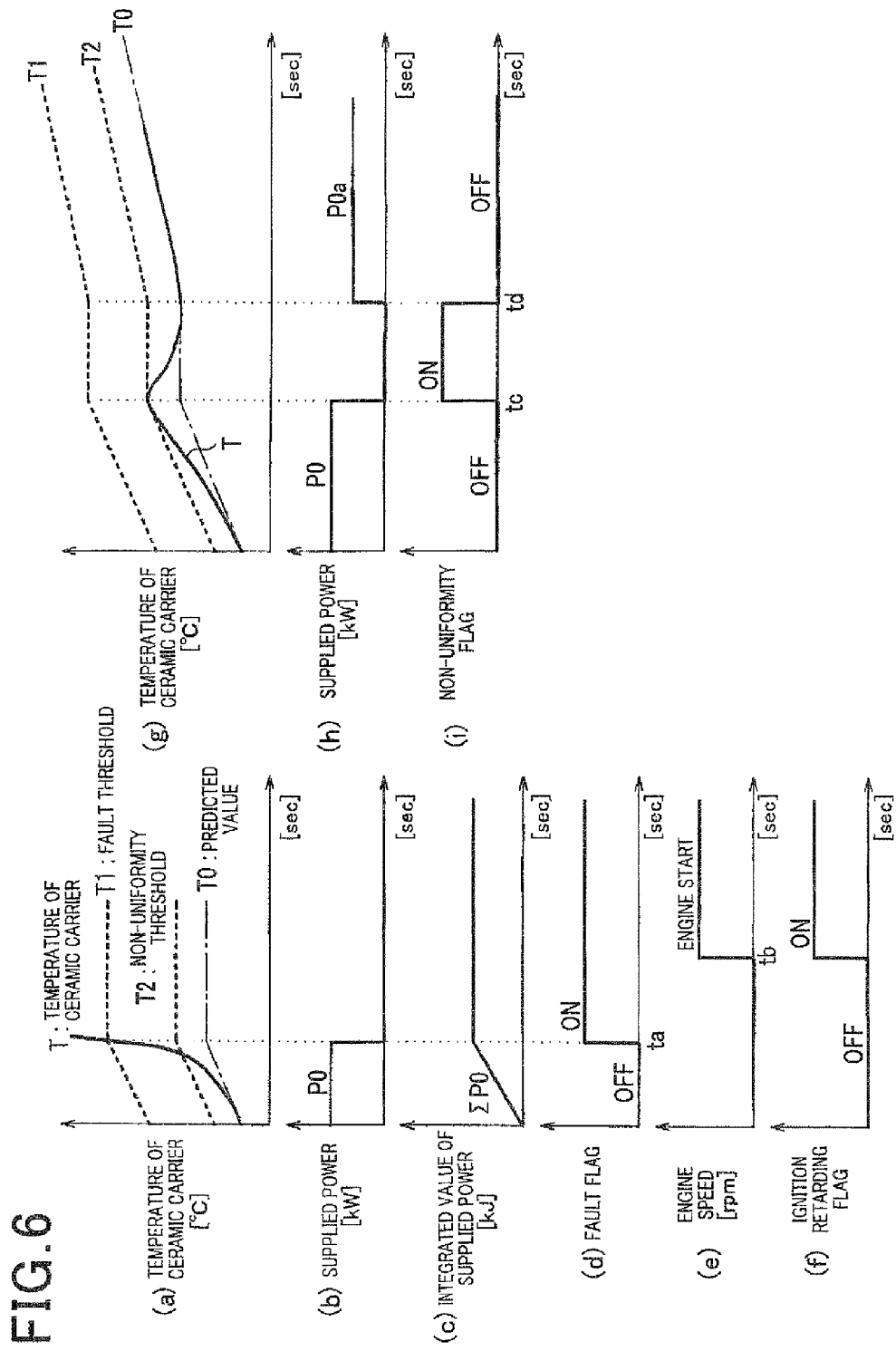
FIG. 6 is a timing chart schematically illustrating the transitions of various parameters during the CPU running the diagnostic program according to the first embodiment.

FIG. 6 is a timing chart schematically illustrating the transitions of various parameters during the CPU 25a running the diagnostic program PR2. The various parameters include the temperature T of the ceramic carrier 21, the fault threshold T1, the temperature non-uniformity threshold T2, the predicted value T0, the supply power P0 to the ceramic carrier 21, the integral $\Sigma P0$ of the supply power P0, the fault flag, the engine speed, the ignition retarding flag, and the non-uniformity flag.

(a) to (f) of FIG. 6 demonstrate the transitions of these parameters except for the non-uniformity flag if the temperature T of the ceramic carrier 21 rises abruptly due to local heating so that an excessive temperature-rise fault occurs in the ceramic carrier 21. (g) to (h) of FIG. 6 demonstrate the transitions of some of these parameters if the temperature T of the ceramic carrier 21 rises so that the ceramic carrier 21 is in the temperature nonuniform state.

First, let us describe the transitions of the parameters for the case of the occurrence of an excessive temperature-rise fault in the ceramic carrier 21 during the CPU 25a running the diagnostic program PR2 with reference to (a) to (f) of FIG. 6.

When the supply of the power P0 determined in step S10 is started (see (b) of FIG. 6), the temperature T of the ceramic carrier 21 rises abruptly due to local heating over the temperature non-uniformity threshold T2, and further over the fault threshold T1 (see (a) of FIG. 6). At the time when the temperature T of the ceramic carrier 21 exceeds the fault threshold T1 at time ta, the fault flag is set to ON in step S21 (see (d) of FIG. 6), and the supply of power to the ceramic carrier 21 is stopped in step S23 (see (b) of FIG. 6).

Note that, because the supply power P0 has been supplied up to the time ta, the integral ΣP0 of the supply power P0 rises up to the time ta (see (c) of FIG. 6). Thus, each of the fault threshold T1, the temperature non-uniformity threshold T2, and the predicted value T0 rises with increase in the integral ΣP0 of the supply power P0 up to the time to (see (a) of FIG. 6).

Thereafter, if the catalyst warm-up request has continued at time tb of the engine 10 starting up in response to the driver's operation in step S24, the ignition retarding control is carried out in step S25 with the ceramic carrier 21 being deenergized (see (e) and (f) of FIG. 6).

Next, let us describe the transitions of some of the parameters for the case where the ceramic carrier 21 is in the temperature nonuniform state during the CPU 25a running the diagnostic program PR2 with reference to (g) to (i) of FIG. 6.

When the supply of the power P0 determined in step S10 is started (see (h) of FIG. 6), the temperature T of the ceramic carrier 21 rises, due to local heating, gradually as compared with the increase in the temperature T of the ceramic carrier 21 in (a) of FIG. 6 so that, when the temperature T of the ceramic carrier 21 becomes higher than the temperature non-uniformity threshold T2 at time tc, the non-uniformity flag is set to ON in step S31 (see (i) of FIG. 6), and the supply of power to the ceramic carrier 21 is reduced, that is, stopped in step S32 (see (h) of FIG. 6). The reduction in the supply of power to the ceramic carrier 21 causes the temperature T of the ceramic carrier 21 to gradually drop (see (g) of FIG. 6).

Thereafter, when the temperature T of the ceramic carrier 21 reaches the predicted value T0 at time td, it is determined that the temperature state of the ceramic carrier 21 is returned to a temperature uniform state so that the non-uniformity flag is set to OFF in step S34 (see (i) of FIG. 6). Thus, the supply of power to the ceramic carrier 21 is restarted (see (h) of FIG. 6), in other words, power supplied to the ceramic carrier 21 is increased from zero to a value P0a with the value P0a limited to be lower than the supply power P0; the supply power P0 was determined at the last time when the temperature state of the ceramic carrier 21 was determined to be a temperature uniform state with the temperature non-uniformity flag of OFF in step S35 (see (h) of FIG. 6).

Note that, because the value of the supplied power to the ceramic carrier 21 with the temperature non-uniformity flag of OFF is limited to be lower than the previous value of the supplied power with the temperature non-uniformity flag of ON, the rate of rise, that is, the gradient of variation, of each of the fault threshold T1, the temperature non-uniformity threshold T2, and the predicted value T0 after the time td is reduced as compared with its rate of rise up to the time tc (see (g) of FIG. 6).

As described above, the diagnostic apparatus according to the first embodiment is configured to calculate the integral ΣP0 of the supply power P0 to the ceramic carrier 21 (see step S11), and calculate the predicted value T0 of the temperature of the ceramic carrier 21 based on the integral ΣP0 (see step S12). In addition, the diagnostic apparatus according to the first embodiment is configured to determine that the ceramic carrier 21 is in the temperature nonuniform state if the temperature T of the ceramic carrier 21 is deviated from the predicted value T0, in other words, if the temperature T of the ceramic carrier 21 is higher than the temperature non-uniformity threshold T2 calculated based on the integral ΣP0 (see YES in step S30).

These configurations allow the CPU 25a to diagnose whether the ceramic carrier 21 is in the temperature nonuniform state as immediately as possible.

If it is determined that the ceramic carrier 21 is in the temperature nonuniform state, the diagnostic apparatus is configured to reduce the supply power P0 to the ceramic carrier 21 to reduce the temperature of the ceramic carrier 21 (see step S32), thus returning the temperature state of the ceramic carrier 21 to a temperature uniform state. If the temperature T of the ceramic carrier 21 becomes to be equal to or lower than the predicted value T0 (see YES in step S33), the diagnostic apparatus is configured to determine that the temperature state of the ceramic carrier 21 is returned to the temperature uniform state, and increase a value of supply power to the ceramic carrier 21 for example from zero to a value P0a (see step S35). This configuration accelerates the catalyst warm-up based on the increase in the temperature of the ceramic carrier 21 (EHC member 20). Moreover, the value P0a of the power supplied to the ceramic carrier 21 after the return is set to be lower than the value P0 of the power supplied to the ceramic carrier 21 in the temperature nonuniform state of the ceramic carrier 21 before the return. This prevents the temperature state of the ceramic carrier 21 from becoming the temperature nonuniform state after the return.

These configurations of the diagnostic apparatus to return the temperature state of the ceramic carrier 21 immediately after the determination of the ceramic carrier 21 being in the temperature nonuniform state make it possible to increase, as early as possible, the temperature of the ceramic carrier 21 (the catalyst 21b) up to the activation temperature of the catalyst 21b while preventing heat damage to the ceramic carrier 21, thus reducing the exhaust emissions.

If the temperature T of the ceramic carrier 21 is further deviated from the predicted value T0, that is, if the temperature T of the ceramic carrier 21 is higher than the fault threshold T1 calculated based on the integral ΣP0 (see YES in step S20), the diagnostic apparatus according to the first embodiment is configured to determine that there is an excessive temperature-rise fault in the ceramic carrier 21 due to local heating. This configuration diagnoses whether there is an excessive temperature-rise fault in the ceramic carrier 21 as immediately as possible.

After it is determined that there is an excessive temperature-rise fault in the ceramic carrier 21 (YES in step S20), the diagnostic apparatus is configured to perform warm-up of the EHC member 20 using the ignition retarding control while maintaining the ceramic carrier 21 deenergized. This configuration makes it possible to increase in temperature the ceramic carrier 21 (the catalyst 21b) up to the activation temperature of the catalyst 21b while preventing heat damage to the ceramic carrier 21.

Within the period during the ceramic carrier 21 being deenergized after the determination that the ceramic carrier 21 is in the temperature nonuniform state, the diagnostic apparatus according to the first embodiment is configured to periodically calculate the value of the resistance R with the fine current flowing through the ceramic carrier 21 to thereby periodically update the value of the temperature T. Because the fine current is periodically supplied from the power source 24 to the ceramic carrier 21, power supplied to the ceramic carrier 21 based on the fine current is very lower than the supply power P0a to the ceramic carrier 21 after the return of the catalyst warm-up. This makes it possible to accelerate temperature uniformity in the ceramic carrier 21.

Second Embodiment

A diagnostic apparatus for the temperature state of the ceramic carrier 21 according to the second embodiment of the present disclosure will be described hereinafter with reference to FIGS. 7 and 8.

The structure and/or functions of the diagnostic apparatus according to the second embodiment are different from those of the diagnostic apparatus according to the first embodiment by the following points. So, the different points will be mainly described hereinafter.

The diagnostic apparatus according to the first embodiment is configured to determine whether: the ceramic carrier 21 is in the temperature nonuniform state, and there is an excessive temperature-rise fault in the ceramic carrier 21 based on the integral $\Sigma P0$ of the supply power P0 to the ceramic carrier 21 and the temperature T of the ceramic carrier 21, more accurately, the temperature T of the ceramic carrier 21 calculated based on the calculated resistance R of the ceramic carrier 21. That is, the diagnostic apparatus according to the first embodiment is configured to carry out the determination using the equation (1) "$\Sigma P0 = C1 \times T$" if there is no local heating in the ceramic carrier 21.

Specifically, the diagnostic apparatus according to the first embodiment determines whether: the ceramic carrier 21 is in the temperature nonuniform state, and there is an excessive temperature-rise fault in the ceramic carrier 21 based on the comparison of the temperature T of the ceramic carrier 21 with each of the thresholds T1 and T2 calculated based on the integral $\Sigma P0$ of the power supplied to the ceramic carrier 21.

In contrast, the diagnostic apparatus according to the second embodiment is configured to determine whether: the ceramic carrier 21 is in the temperature nonuniform state, and there is an excessive temperature-rise fault in the ceramic carrier 21 using the inverse relationship of the temperature T of the ceramic carrier 21 with respect to the resistance R thereof based on the NTC characteristic.

Specifically, the diagnostic apparatus according to the second embodiment is configured to determine whether: the ceramic carrier 21 is in the temperature nonuniform state, and there is an excessive temperature-rise fault in the ceramic carrier 21 based on the comparison of the resistance R of the ceramic carrier 21 with each of a fault threshold R1 and a non-uniformity threshold R2 calculated based on the integral $\Sigma P0$ of the power supplied to the ceramic carrier 21.

Figure 7:
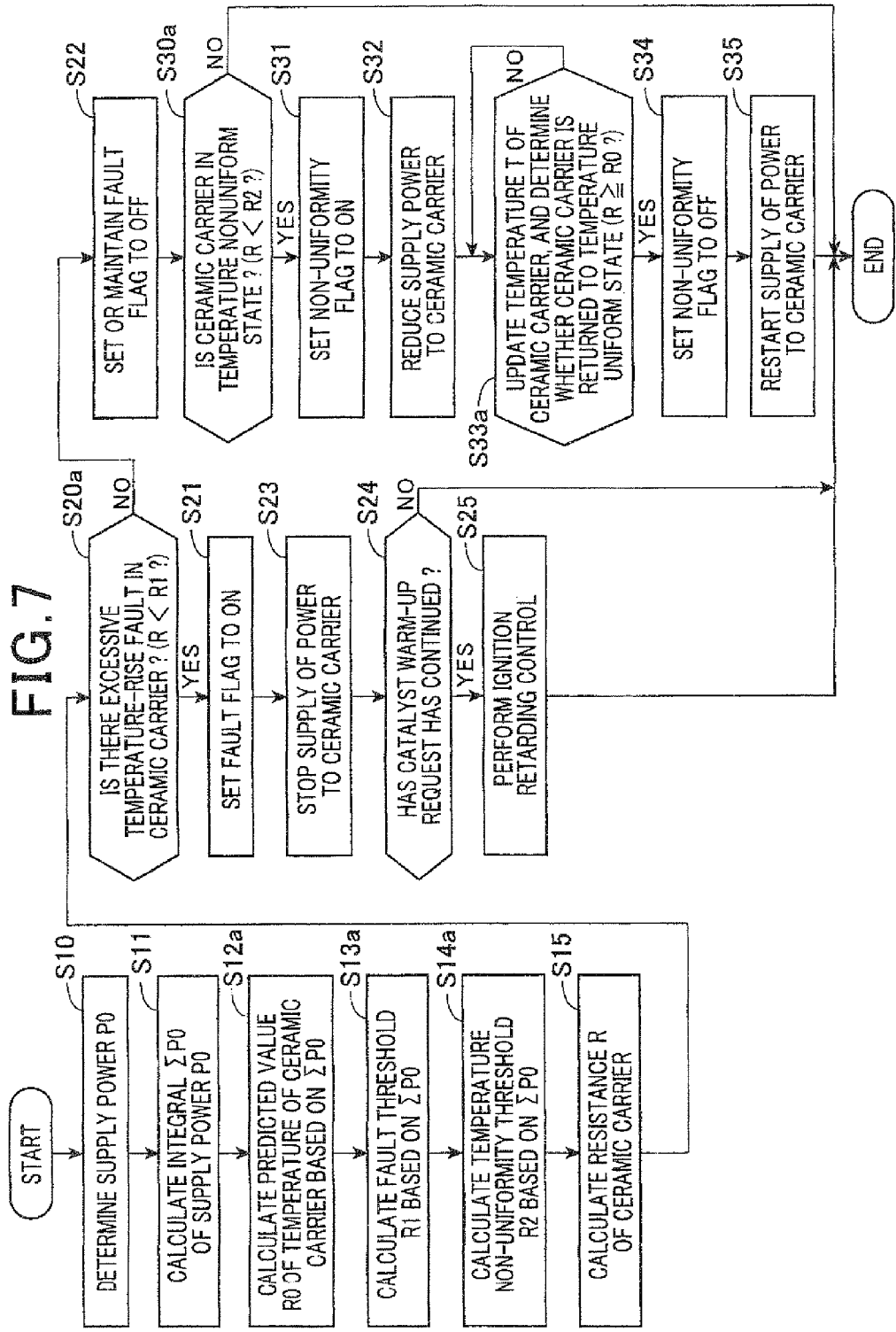
FIG. 7 is a flowchart schematically illustrating a sequence of operations of the CPU of the controller in accordance with a diagnostic program according to the second embodiment of the present disclosure.

FIG. 7 is a flowchart schematically illustrating a sequence of operations of the CPU 25a in accordance with a diagnostic program PR3 stored in the storage medium 25b in place of or in addition to the diagnostic program PR2 (see FIG. 3). Of course, the diagnostic program PR3 can be omitted in the storage medium 25b of the controller 25 according to the first embodiment.

The CPU 25a runs the diagnostic program PR3 in response to the occurrence of the catalyst warm-up request as a trigger, and repeatedly runs the diagnostic program PR3 in a preset cycle. In FIGS. 5 and 7, like operations (steps) therebetween, to which like reference characters are assigned, are omitted or simplified in description.

In step S12a after the operation of calculating the integral $\Sigma P0$ of the supply power P0 to the ceramic carrier 21 in step S11, the CPU 25a calculates a predicted value R0 of the resistance of the ceramic carrier 21 (the resistance of the electrically conducting path of the ceramic carrier 21 between the positive and negative electrodes 22 and 23) based on the is integral $\Sigma P0$ of the supply power P0 to the ceramic carrier 21 calculated in step S11. Specifically, the resistance of the ceramic carrier 21 should be reduced with increase in the integral $\Sigma P0$ of the supply power P0, so the integral $\Sigma P0$ of the supply power P0 has a correlation with the resistance of the ceramic carrier 21.

For example, in the second embodiment, the storage medium 25b stores therein a map M3 designed as, for example, a data table, a program, and/or a formula; this map M3 represents the correlation between a variable of the integral $\Sigma P0$ of the supply power P0 and a variable of the resistance of the ceramic carrier 21. The map M3 can have been determined based on data obtained by tests and/or simulations using the power supply system PS, the engine 10, and the EHC converter 20 or their equivalent computer models. The map M3 can be described in the diagnostic program PR3.

Specifically, in step S12a, the CPU 25a references the map M3 using the integral $\Sigma P0$ of the supply power P0 as a key to extract, based on a result of the reference, a predicted value R0 of the resistance of the ceramic carrier 21 corresponding to the integral $\Sigma P0$ of the supply power P0. The map M3 is illustrated in FIG. 3. Of course, the map M3 can be omitted in the storage medium 25b of the controller 25 according to the first embodiment.

Following the operation in step S12a, the CPU 25a calculates, based on the integral $\Sigma P0$ of the supply power P0 calculated in step S11, the fault threshold R1 for the resistance of the ceramic carrier 21 in step S13a; this fault threshold R1 is used to determine whether there is an excessive temperature-rise fault in the ceramic carrier 21. For example, the CPU 25a calculates the fault threshold R1 based on the map M3 such that, the greater the integral $\Sigma P0$ of the supply power P0 is, the lower the fault threshold R1 is.

Next, the CPU 25a calculates, based on the integral $\Sigma P0$ of the supply power P0 calculated in step S11, the non-uniformity threshold R2 for the resistance of the ceramic carrier 21 in step S14a; this non-uniformity threshold R2 is used to determine whether the ceramic carrier 21 is in the temperature nonuniform state. For example, the CPU 25a calculates the non-uniformity threshold R2 based on the map M3 such that, the greater the integral $\Sigma P0$ of the supply power P0 is, the lower the non-uniformity threshold R2 is, and the non-uniformity threshold R2 is higher than the fault threshold R1.

Subsequent to the operation in step S14a, the CPU 25a calculates, based on the measured current value inputted from the current sensor 24 and the measured terminal voltage inputted from the battery controller BC, a value of the resistance R of the ceramic carrier 21 (the resistance R of the electrically conducting path of the ceramic carrier 21 between the positive and negative electrodes 22 and 23); the resistance R is equivalent to the combined resistance of the resistance values of the resistors R1 to R5.

Following the operation in step S15a, the CPU 25a compares the value of the resistance R calculated in step S15 with the fault threshold R1 calculated in step S13a to thereby determine, based on a result of the comparison, whether the value of the resistance R is lower than the fault threshold R1 in step S20a. This determination in step S20a is to determine whether there is an excessive temperature-rise fault in the ceramic carrier 21 due to local heating.

If the value of the resistance R is lower than the fault threshold R1 (YES in step S20a), the CPU 25a determines that the temperature nonuniform state is facilitated to a degree that there may be a risk of thermal damage of the EHC converter 20. In other words, the CPU 25a determines that an excessive temperature-rise fault occurs in the ceramic carrier 21. Then, the CPU 25a sets a fault flag in the form of, for example, a bit to ON (1) in step S21. For example, the fault flag is set to an initial value of OFF (0).

Otherwise, if the value of the resistance R is equal to or higher than the fault threshold R1 (NO in step S20a), the CPU 25a determines that the temperature nonuniform state is not facilitated to a degree that there may be a risk of thermal damage of the EHC converter 20. Then, the CPU 25a sets or maintains the fault flag to OFF (0) in step S22.

Following the operation in step S21, the CPU 25a carries out the operations in steps S23, S24, and S25 in the same procedure as corresponding steps illustrated in FIG. 5.

On the other hand, subsequent to the operation in step S22, the CPU 25a compares the value of the resistance R measured in step S15 with the non-uniformity threshold R2 calculated in step S14a to thereby determine, based on a result of the comparison, whether the value of the resistance R is lower than the non-uniformity threshold R2 in step S30a. This determination in step S30a is to determine whether the ceramic carrier 21 is in the temperature nonuniform state due to local heating.

If the value of the resistance R is lower than the non-uniformity threshold R2 (YES in step S30a), the CPU 25a determines that the ceramic carrier 21 is in the temperature nonuniform state. Then, the CPU 25a sets a non-uniformity flag in the form of, for example, a bit to ON (1) in step S31; the non-uniformity flag of ON represents that the ceramic carrier 21 is in the temperature nonuniform state. For example, the non-uniformity flag is set to an initial value of OFF (0).

Otherwise, if the value of the resistance R is equal to or higher than the non-uniformity threshold R2 (NO in step S30a), the CPU 25a determines that the ceramic carrier 21 is not in the temperature nonuniform state. Then, the CPU 25a terminates the diagnostic program PR3 and repeats the operations in the diagnostic program PR3 from step S10 in the next cycle.

Following the operation in step S31, the CPU 25a controls the power source 24 to reduce the supply power P0 to the ceramic carrier 21 in step S32. For example, in the second embodiment, the CPU 25a reduces the supply power P0 to the ceramic carrier 21 up to zero.

Subsequent to the operation in step S32, the CPU 25a updates the value of the resistance R calculated in step S15, and compares the updated value of the resistance R with the predicted value R0 calculated in step S12a to thereby determine, based on a result of the comparison, whether the updated value of the resistance R is equal to or higher than the predicted value R0 in step S33a. This determination in step S33a is to determine whether the non-uniformity of the temperature distribution in the ceramic carrier 21 is reduced to a degree that the temperature state of the ceramic carrier 21 can be taken to temperature uniform state.

For the same reason described in the first embodiment, in step S33a, the CPU 25a adjusts the duty cycle of the switch 24a to periodically supply fine current from the power source 24 to the ceramic carrier 21, and periodically updates the value of the resistance R with the fine current flowing through the ceramic carrier 21.

If the updated value of the resistance R is equal to or higher than the predicted value R0 (YES in step S33a), the CPU 25a determines that the temperature state of the ceramic carrier 21 is returned to a temperature uniform state. Then, the CPU 25a sets the non-uniformity flag to OFF in step S34, and restarts the supply of power to the ceramic carrier 21 with a value of the supplied power limited to be lower than the supply power P0; the supply power P0 was determined at the last time when the temperature state of the ceramic carrier 21 was determined to be a temperature uniform state with the temperature non-uniformity flag of OFF in step S35. Thereafter, the CPU 25a terminates the diagnostic program PR3 and repeats the operations in the diagnostic program PR3 from step S10 in the next cycle.

Otherwise, if the updated value of the resistance R is lower than the predicted value R0 (NO in step S33a), the CPU 25a determines that the ceramic carrier 21 remains the temperature nonuniform state. Then, the CPU 25a repeats step S33a while updating the value of the resistance R until the updated value of the resistance R is equal to or higher than the predicted value R0 (YES in step S33a).

Note that, if the CPU 25a adjusts the duty cycle of the switch 24a such that the supply power P0 to the ceramic carrier 21 is higher than zero in step S32, and the determination in step S33a is negative, the CPU 25a terminates the diagnostic program PR3 and repeats the operations in the diagnostic program PR3 from step Si 1a in the next cycle. This is because the supply power P0 to the ceramic carrier 21 has been determined in step S32.

Figure 8:
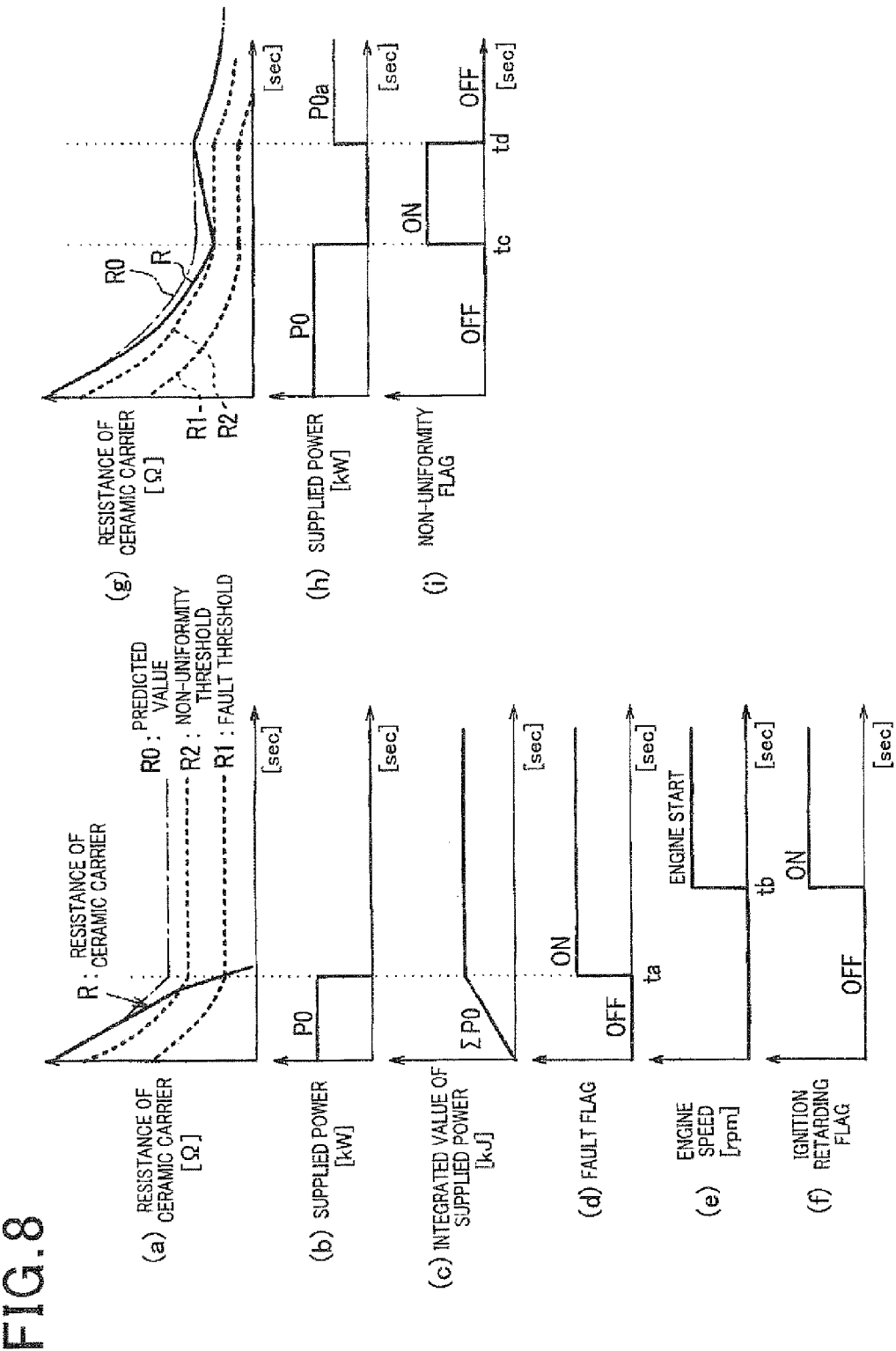
FIG. 8 is a timing chart schematically illustrating the transitions of the various parameters during the CPU running the diagnostic program according to the second embodiment.

FIG. 8 is a timing chart schematically illustrating the transitions of various parameters during the CPU 25a running the diagnostic program PR3. The various parameters include the resistance R of the ceramic carrier 21, the fault threshold R1, the non-uniformity threshold R2, the predicted value R0, the supply power P0 to the ceramic carrier 21, the integral ΣP0 of the supply power P0, the fault flag, the engine speed, the ignition retarding flag, and the non-uniformity flag.

(a) to (f) of FIG. 8 demonstrate the transitions of these parameters except for the non-uniformity flag if the resistance R of the ceramic carrier 21 drops abruptly due to local heating so that an excessive temperature-rise fault occurs in the ceramic carrier 21. (g) to (h) of FIG. 8 demonstrate the transitions of some of these parameters if the resistance R of the ceramic carrier 21 drops so that the ceramic carrier 21 is in the temperature nonuniform state. Note that the descriptions of the parameters in (a) to (h) of FIG. 8, which are identical to those of the parameters (a) to (h) of FIG. 5, are omitted or simplified.

First, let us describe the transitions of the parameters for the case of the occurrence of an excessive temperature-rise fault in the ceramic carrier 21 during the CPU 25a running the diagnostic program PR3 with reference to (a) to (f) of FIG. 8.

When the supply of the power P0 determined in step S10 is started (see (b) of FIG. 8), the resistance R of the ceramic carrier 21 drops abruptly due to local heating below the non-uniformity threshold R2, and further below the fault threshold R1 (see (a) of FIG. 8). At the time when the resistance R of the ceramic carrier 21 is below the fault threshold R1 at time ta, the fault flag is set to ON in step S21 (see (d) of FIG. 8), and the supply of power to the ceramic carrier 21 is stopped in step S23 (see (b) of FIG. 8).

Note that, because the supply power P0 has been supplied up to the time ta, the integral ΣP0 of the supply power P0 rises up to the time ta (see (c) of FIG. 8). Thus, each of the fault threshold R1, the non-uniformity threshold R2, and the predicted value R0 drops with increase in the integral ΣP0 of the supply power P0 up to the time to (see (a) of FIG. 8).

Thereafter, if the catalyst warm-up request has continued at time tb of the engine 10 starting up in response to the driver's operation in step S24, the ignition retarding control is carried out in step S25 with the ceramic carrier 21 being deenergized (see (e) and (f) of FIG. 8).

Next, let us describe the transitions of some of the parameters for the case where the ceramic carrier 21 is in the temperature nonuniform state during the CPU 25a running the diagnostic program PR3 with reference to (g) to (i) of FIG. 8.

When the supply of the power P0 determined in step S10 is started (see (h) of FIG. 8), the resistance R of the ceramic carrier 21 drop gradually irrespective of local heating as compared with the drop in the resistance R of the ceramic carrier 21 in (a) of FIG. 8 so that, when the resistance R of the ceramic carrier 21 becomes lower than the non-uniformity threshold R2 at time tc, the non-uniformity flag is set to ON in step S31 (see (i) of FIG. 8), and the supply of power to the ceramic carrier 21 is reduced, that is, stopped in step S32 (see (h) of FIG. 8). The reduction in the supply of power to the ceramic carrier 21 causes the resistance R of the ceramic carrier 21 to gradually rise (see (g) of FIG. 8).

Thereafter, when the resistance R of the ceramic carrier 21 reaches the predicted value R0 at time td, it is determined that the temperature state of the ceramic carrier 21 is returned to a temperature uniform state so that the non-uniformity flag is set to OFF in step S34 (see (i) of FIG. 8). Thus, the supply of power to the ceramic carrier 21 is restarted (see (h) of FIG. 8), in other words, power supplied to the ceramic carrier 21 is increased from zero to a value P0a with the value P0a limited to be lower than the supply power P0; the supply power P0 was determined at the last time when the temperature state of the ceramic carrier 21 was determined to be a temperature uniform state with the temperature non-uniformity flag of OFF in step S35 (see (h) of FIG. 8).

Note that, because the value of the supplied power to the ceramic carrier 21 with the temperature non-uniformity flag of OFF is limited to be lower than the previous value of the supplied power with the temperature non-uniformity flag of ON, the gradient of variation of each of the fault threshold R1, the non-uniformity threshold R2, and the predicted value R0 after the time td is reduced as compared with its gradient of variation up to the time tc (see (g) of FIG. 8).

As described above, the diagnostic apparatus according to the second embodiment is configured to calculate the predicted value R0 of the resistance of the ceramic carrier 21 based on the integral ΣP0 of the supply power P0 to the ceramic carrier 21 (see step S12a). In addition, the diagnostic apparatus according to the second embodiment is configured to determine that the ceramic carrier 21 is in the temperature nonuniform state if the resistance R of the ceramic carrier 21 is deviated from the predicted value R0, in other words, if the resistance R of the ceramic carrier 21 is lower than the non-uniformity threshold R2 calculated based on the integral ΣP0 (see YES in step S30a).

These configurations allow the CPU 25a to diagnose whether the ceramic carrier 21 is in the temperature nonuniform state as immediately as possible.

If the resistance R of the ceramic carrier 21 is further deviated from the predicted value R0, that is, if the resistance R of the ceramic carrier 21 is lower than the fault threshold R1 calculated based on the integral ΣP0 (see YES in step S20a), the diagnostic apparatus according to the second embodiment is configured to determine that there is an excessive temperature-rise fault in the ceramic carrier 21 due to local heating. This configuration diagnoses whether there is an excessive temperature-rise fault in the ceramic carrier 21 as immediately as possible.

Accordingly, the diagnostic apparatus according to the second embodiment achieves the same technical effects as those in the first embodiment.

Note that, in step S33a, the CPU 25a according to the second embodiment is programmed to compare the updated value of the resistance R with the predicted value R0 calculated in step S12a to thereby determine, based on a result of the comparison, whether the updated value of the resistance R is equal to or higher than the predicted value R0. However, in step S33a, the CPU 25a according to the second embodiment can be programmed to calculate a value of the temperature T in the same procedure as step S16 and a predicted value T0 calculated in the same procedure as step S12, compare the calculated value of the temperature T with the predicted value T0 to thereby determine, based on a result of the comparison, whether the calculated value of the temperature T is equal to or lower than the predicted value T0 in the same procedure as step S33.

Third Embodiment

A diagnostic apparatus for the temperature state of the ceramic carrier 21 according to the third embodiment of the present disclosure will be described hereinafter with reference to FIGS. 9 and 10.

The structure and/or functions of the diagnostic apparatus according to the third embodiment are different from those of the diagnostic apparatus according to the first embodiment by the following points. So, the different points will be mainly described hereinafter.

The diagnostic apparatus according to the third embodiment is configured to determine whether: the ceramic carrier 21 is in the temperature nonuniform state, and there is an excessive temperature-rise fault in the ceramic carrier 21 using the correlation between a measured value of supply current I to the ceramic carrier 21 and the integral ΣP0 of the supply power P0 to the ceramic carrier 21.

Specifically, the diagnostic apparatus according to the third embodiment is configured to determine whether: the ceramic carrier 21 is in the temperature nonuniform state, and there is an excessive temperature-rise fault in the ceramic carrier 21 based on the comparison of the measured value of the supply current I with each of a fault threshold I1 and a non-uniformity threshold I2 calculated based on the integral ΣP0 of the supply power P0 to the ceramic carrier 21.

Figure 9:
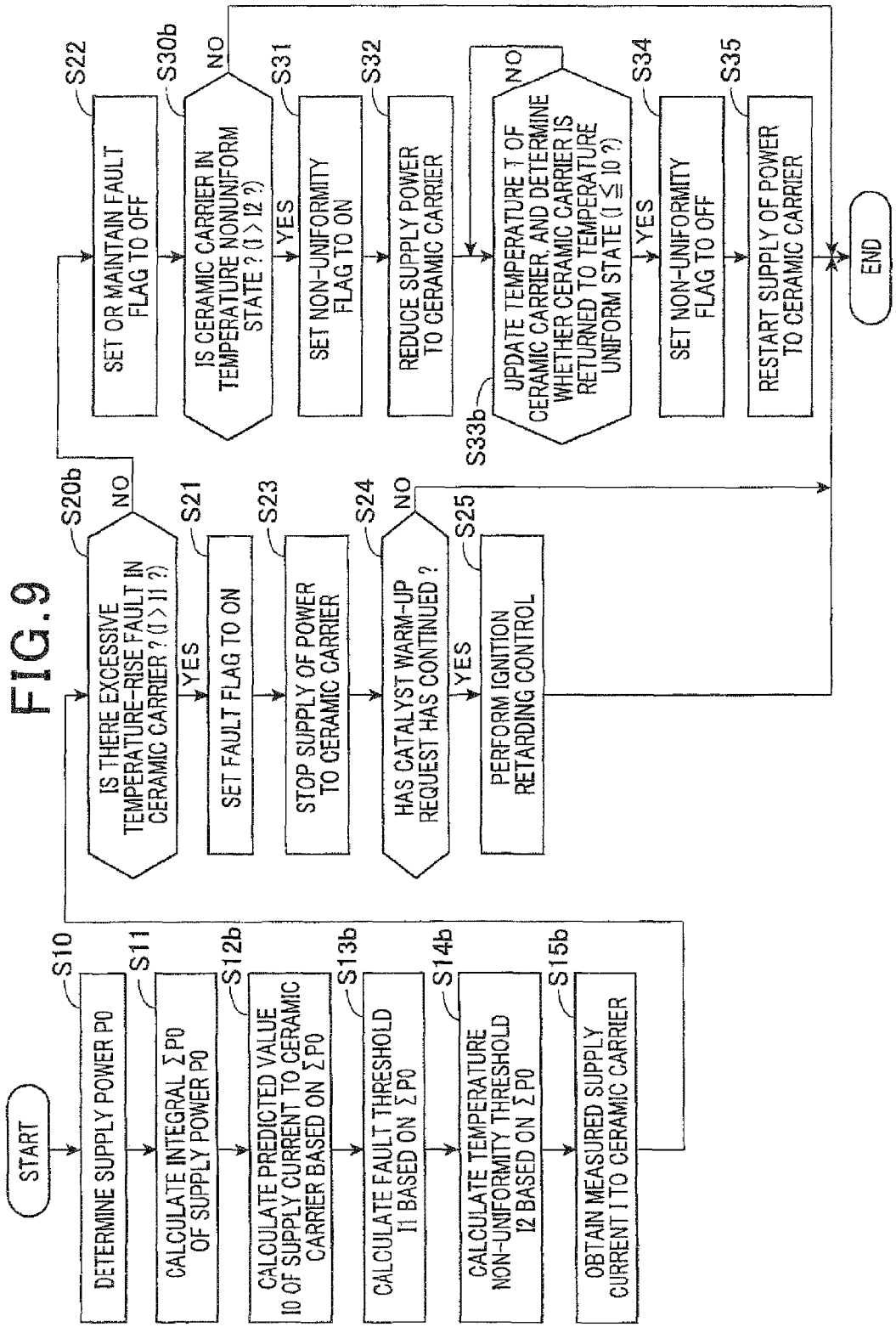
FIG. 9 is a flowchart schematically illustrating a sequence of operations of the CPU of the controller in accordance with a diagnostic program according to the third embodiment of the present disclosure.

FIG. 9 is a flowchart schematically illustrating a sequence of operations of the CPU 25a in accordance with a diagnostic program PR4 stored in the storage medium 25b in place of or in addition to the diagnostic program PR2 (see FIG. 3). Of course, the diagnostic program PR4 can be omitted in the storage medium 25b of the controller 25 according to the first embodiment.

The CPU 25a runs the diagnostic program PR4 in response to the occurrence of the catalyst warm-up request as a trigger, and repeatedly runs the diagnostic program PR4 in a preset cycle. In FIGS. 5 and 9, like operations (steps) therebetween, to which like reference characters are assigned, are omitted or simplified in description.

In step S12b after the operation of calculating the integral ΣP0 of the supply power P0 to the ceramic carrier 21 in step S11, the CPU 25a calculates a predicted value I0 of current supplied to the ceramic carrier 21 based on the integral ΣP0 of the supply power P0 to the ceramic carrier 21 calculated in step S11. Specifically, because the resistance of the ceramic carrier 21 drops with increase in the integral ΣP0 of the supply power P0, current supplied to the ceramic carrier 21 should be increased with reduction in the resistance of the ceramic carrier 21, that is, with increase in the integral ΣP0 of the supply power P0. This results in that the integral ΣP0 of the supply power P0 has a correlation with current supplied to the ceramic carrier 21.

For example, in the third embodiment, the storage medium 25b stores therein a map M4 designed as, for example, a data table, a program, and/or a formula; this map M4 represents the correlation between a variable of the integral ΣP0 of the supply power P0 and a variable of the current supplied to the ceramic carrier 21. The map M4 can have been determined based on data obtained by tests and/or simulations using the power supply system PS, the engine 10, and the EHC converter 20 or their equivalent computer models. The map M4 can be described in the diagnostic program PR4.

Specifically, in step S12b, the CPU 25a references the map M4 using the integral $\Sigma P0$ of the supply power P0 as a key to extract, based on a result of the reference, a predicted value I0 of the current supplied to the ceramic carrier 21 corresponding to the integral $\Sigma P0$ of the supply power P0. The map M4 is illustrated in FIG. 3. Of course, the map M4 can be omitted in the storage medium 25b of the controller 25 according to the first embodiment.

Following the operation in step S12b, the CPU 25a calculates, based on the integral $\Sigma P0$ of the supply power P0 calculated in step S11, the fault threshold I1 for the current supplied to the ceramic carrier 21; this fault threshold I1 is used to determine whether there is an excessive temperature-rise fault in the ceramic carrier 21 in step S13b. For example, the CPU 25a calculates the fault threshold I1 based on the map M4 such that, the greater the integral $\Sigma P0$ of the supply power P0 is, the higher the fault threshold I1 is.

Next, the CPU 25a calculates, based on the integral $\Sigma P0$ of the supply power P0 calculated in step S11, the non-uniformity threshold I2 to be used to determine whether the ceramic carrier 21 is in the temperature nonuniform state in step S14b. For example, the CPU 25a calculates the non-uniformity threshold I2 based on the map M4 such that, the greater the integral $\Sigma P0$ of the supply power P0 is, the higher the non-uniformity threshold I2 is, and the non-uniformity threshold I2 is lower than the fault threshold I1.

Subsequent to the operation in step S14b, the CPU 25a obtains the measured value of the supply current I inputted from the current sensor 24.

In step S20b, the CPU 25a compares the measured value of the supply current I obtained in step S15b with the fault threshold I1 calculated in step S13b to thereby determine, based on a result of the comparison, whether the measured value of the supply current I is higher than the fault threshold I1. This determination in step S20b is to determine whether there is an excessive temperature-rise fault in the ceramic carrier 21 due to local heating.

If the measured value of the supply current I is higher than the fault threshold I1 (YES in step S20b), the CPU 25a determines that the temperature nonuniform state is facilitated to a degree that there may be a risk of thermal damage of the EHC converter 20. In other words, the CPU 25a determines that an excessive temperature-rise fault occurs in the ceramic carrier 21. Then, the CPU 25a sets a fault flag in the form of, for example, a bit to ON (1) in step S21. For example, the fault flag is set to an initial value of OFF (0).

Otherwise, if the measured value of the supply current I is equal to or lower than the fault threshold I1 (NO in step S20b), the CPU 25a determines that the temperature nonuniform state is not facilitated to a degree that there may be a risk of thermal damage of the EHC converter 20. Then, the CPU 25a sets or maintains the fault flag to OFF (0) in step S22.

Following the operation in step S21, the CPU 25a carries out the operations in steps S23, S24, and S25 in the same procedure as corresponding steps illustrated in FIG. 5.

On the other hand, subsequent to the operation in step S22, the CPU 25a compares the measured value of the supply current I obtained in step S15b with the non-uniformity threshold I2 calculated in step S14b to thereby determine, based on a result of the comparison, whether the measured value of the supply current I is higher than the non-uniformity threshold I2 in step S30b. This determination in step S30b is to determine whether the ceramic carrier 21 is in the temperature nonuniform state due to local heating.

If the measured value of the supply current I is higher than the non-uniformity threshold I2 (YES in step S30b), the CPU 25a determines that the ceramic carrier 21 is in the temperature nonuniform state. Then, the CPU 25a sets a non-uniformity flag in the form of, for example, a bit to ON (1) in step S31; the non-uniformity flag of ON represents that the ceramic carrier 21 is in the temperature nonuniform state. For example, the non-uniformity flag is set to an initial value of OFF (0).

Otherwise, if the measured value of the supply current I is equal to or lower than the non-uniformity threshold I2 (NO in step S30b), the CPU 25a determines that the ceramic carrier 21 is not in the temperature nonuniform state. Then, the CPU 25a terminates the diagnostic program PR4 and repeats the operations in the diagnostic program PR4 from step S10 in the next cycle.

Following the operation in step S31, the CPU 25a controls the power source 24 to reduce the supply power P0 to the ceramic carrier 21 in step S32. For example, in the third embodiment, the CPU 25a reduces the supply power P0 to the ceramic carrier 21 up to zero.

Subsequent to the operation in step S32, the CPU 25a updates the measured value of the supply current I obtained in step S15b, that is, newly captures the measured value of the supply current I from the current sensor 24c, and compares the updated measured value of the supply current I with the predicted value I0 calculated in step S12b to thereby determine, based on a result of the comparison, whether the updated measured value of the supply current I is equal to or lower than the predicted value I0 in step S33b. This determination in step S33b is to determine whether the non-uniformity of the temperature distribution in the ceramic carrier 21 is reduced to a degree that the temperature state of the ceramic carrier 21 can be taken to temperature uniform state.

For the same reason described in the first embodiment, in step S33b, the CPU 25a adjusts the duty cycle of the switch 24a to periodically supply fine current from the power source 24 to the ceramic carrier 21, and periodically updates the measured value of the supply current I with the fine current flowing through the ceramic carrier 21.

If the updated measured value of the supply current I is equal to or lower than the predicted value I0 (YES in step S33b), the CPU 25a determines that the temperature state of the ceramic carrier 21 is returned to a temperature uniform state. Then, the CPU 25a sets the non-uniformity flag to OFF in step S34, and restarts the supply of power to the ceramic carrier 21 with a value of the supplied power limited to be lower than the supply power P0; the supply power P0 was determined at the last time when the temperature state of the ceramic carrier 21 was determined to be a temperature uniform state with the temperature non-uniformity flag of OFF in step S35. Thereafter, the CPU 25a terminates the diagnostic program PR4 and repeats the operations in the diagnostic program PR4 from step S10 in the next cycle.

Otherwise, if the updated measured value of the supply current I is higher than the predicted value I0 (NO in step S33b), the CPU 25a determines that the ceramic carrier 21 remains the temperature nonuniform state. Then, the CPU 25a repeats step S33b while updating the measured value of the supply current I until the updated measured value of the supply current I is equal to or lower than the predicted value I0 (YES in step S33b).

Note that, if the CPU 25a adjusts the duty cycle of the switch 24a such that the supply power P0 to the ceramic carrier 21 is higher than zero in step S32, and the determination in step S33b is negative, the CPU 25a terminates the diagnostic program PR4 and repeats the operations in the diagnostic program PR4 from step S11 in the next cycle. This is because the supply power P0 to the ceramic carrier 21 has been determined in step S32.

Figure 10:
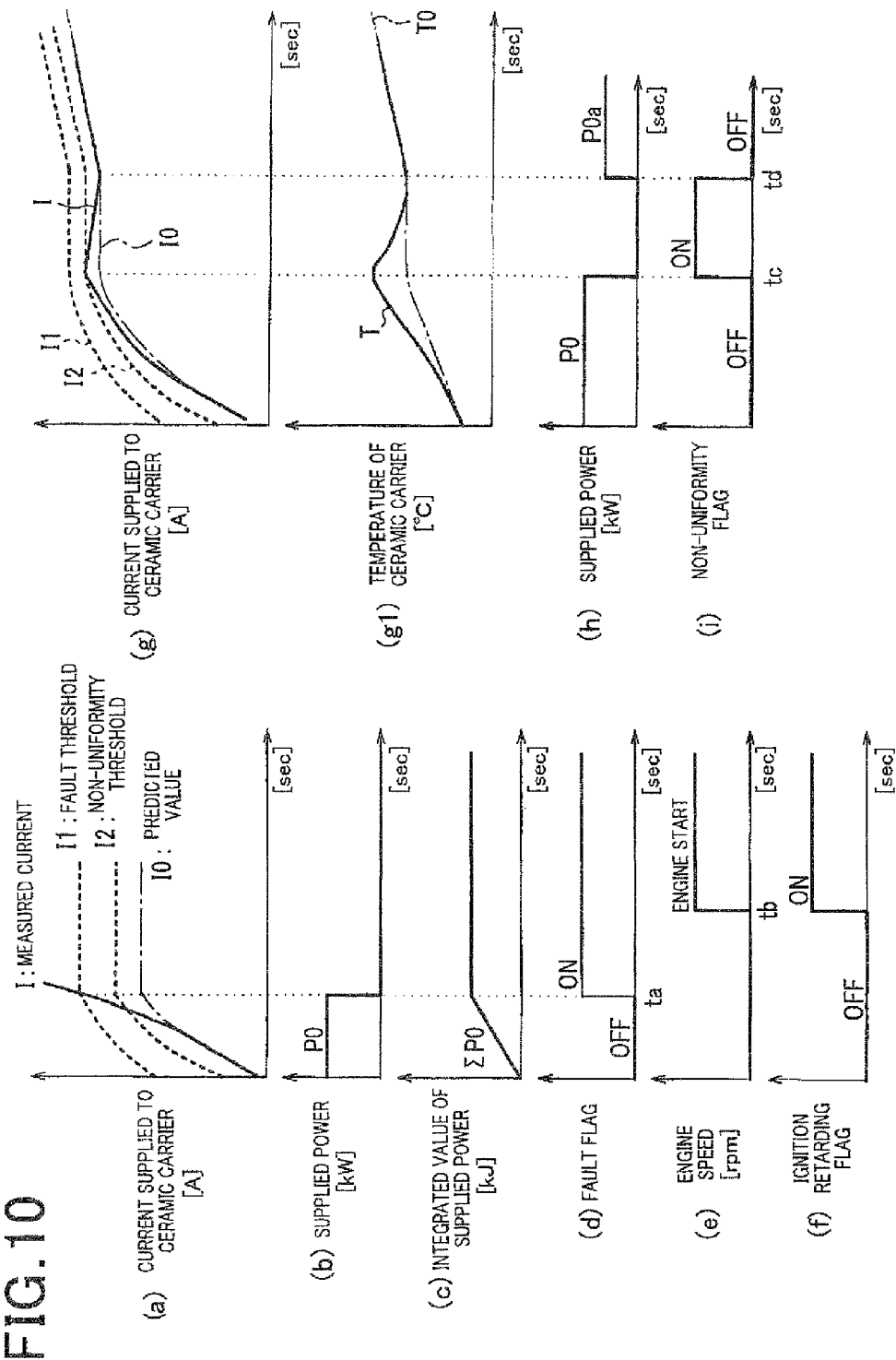
FIG. 10 is a timing chart schematically illustrating the transitions of the various parameters during the CPU running the diagnostic program according to the third embodiment.

FIG. 10 is a timing chart schematically illustrating the transitions of various parameters during the CPU 25a running the diagnostic program PR4. The various parameters include the supply current I to the ceramic carrier 21, the fault threshold I1, the non-uniformity threshold I2, the predicted value I0, the supply power P0 to the ceramic carrier 21, the integral ΣP0 of the supply power P0, the fault flag, the engine speed, the ignition retarding flag, and the non-uniformity flag.

(a) to (f) of FIG. 10 demonstrate the transitions of these parameters except for the non-uniformity flag if the supply current I to the ceramic carrier 21 rises abruptly due to local heating so that an excessive temperature-rise fault occurs in the ceramic carrier 21. (g) to (h) of FIG. 10 demonstrate the transitions of some of these parameters if the supply current I to the ceramic carrier 21 rises so that the ceramic carrier 21 is in the temperature nonuniform state. Note that the descriptions of the parameters in (a) to (h) of FIG. 10, which are identical to those of the parameters (a) to (h) of FIG. 5, are omitted or simplified.

First, let us describe the transitions of the parameters for the case of the occurrence of an excessive temperature-rise fault in the ceramic carrier 21 during the CPU 25a running the diagnostic program PR4 with reference to (a) to (f) of FIG. 10.

When the supply of the power P0 determined in step S10 is started (see (b) of FIG. 10), the resistance R of the ceramic carrier 21 abruptly drops with rapid rise in the temperature of the ceramic carrier 21 due to local heating, resulting in that the measured supply current I to the ceramic carrier 21 rises abruptly over the non-uniformity threshold I2, and further over the fault threshold I1 (see (a) of FIG. 10). At the time when the measured supply current I to the ceramic carrier 21 is over the fault threshold I1 at time ta, the fault flag is set to ON in step S21 (see (d) of FIG. 10), and the supply of power to the ceramic carrier 21 is stopped in step S23 (see (b) of FIG. 10).

Note that, because the supply power P0 has been supplied up to the time ta, the integral ΣP0 of the supply power P0 rises up to the time ta (see (c) of FIG. 10). Thus, each of the fault threshold I1, the non-uniformity threshold I2, and the predicted value I0 rises with increase in the integral ΣP0 of the supply power P0 up to the time ta (see (a) of FIG. 10).

Thereafter, if the catalyst warm-up request has continued at time tb of the engine 10 starting up in response to the driver's operation in step S24, the ignition retarding control is carried out in step S25 with the ceramic carrier 21 being deenergized (see (e) and (f) of FIG. 10).

Next, let us describe the transitions of some of the parameters for the case where the ceramic carrier 21 is in the temperature nonuniform state during the CPU 25a running the diagnostic program PR4 with reference to (g) to (i) of FIG. 10.

When the supply of the power P0 determined in step S10 is started (see (h) of FIG. 10), the measured supply current I to the ceramic carrier 21 rises gradually irrespective of local heating as compared with the increase in the measured supply current I to the ceramic carrier 21 in (a) of FIG. 10 so that, when the measured supply current I to the ceramic carrier 21 becomes higher than the non-uniformity threshold I2 at time tc, the non-uniformity flag is set to ON in step S31 (see (i) of FIG. 10), and the supply of power to the ceramic carrier 21 is reduced, that is, stopped in step S32 (see (h) of FIG. 10). The reduction in the supply of power to the ceramic carrier 21 causes the measured supply current I to the ceramic carrier 21 to gradually drop (see (g) of FIG. 10).

Thereafter, when the measured supply current I to the ceramic carrier 21 reaches the predicted value I0 at time td, it is determined that the temperature state of the ceramic carrier 21 is returned to a temperature uniform state so that the non-uniformity flag is set to OFF in step S34 (see (i) of FIG. 10). Thus, the supply of power to the ceramic carrier 21 is restarted (see (h) of FIG. 10), in other words, power supplied to the ceramic carrier 21 is increased from zero to a value P0a with the value P0a limited to be lower than the supply power P0; the supply power P0 was determined at the last time when the temperature state of the ceramic carrier 21 was determined to be a temperature uniform state with the temperature non-uniformity flag of OFF in step S35 (see (h) of FIG. 10).

Note that, because the value of the supplied power to the ceramic carrier 21 with the temperature non-uniformity flag of OFF is limited to be lower than the previous value of the supplied power with the temperature non-uniformity flag of ON, the gradient of variation of each of the fault threshold I1, the non-uniformity threshold I2, and the predicted value I0 after the time td is reduced as compared with its gradient of variation up to the time tc (see (g) of FIG. 10).

As described above, the diagnostic apparatus according to the third embodiment is configured to calculate the predicted value I0 of the supply current I to the ceramic carrier 21 based on the integral ΣP0 of the supply power P0 to the ceramic carrier 21 (see step S12b). In addition, the diagnostic apparatus according to the third embodiment is configured to determine that the ceramic carrier 21 is in the temperature nonuniform state if the measured value of the supply current I to the ceramic carrier 21 is deviated from the predicted value I0, in other words, if the measured value of the supply current I to the ceramic carrier 21 is higher than the non-uniformity threshold I2 calculated based on the integral ΣP0 (see YES in step S30b).

These configurations allow the CPU 25a to diagnose whether the ceramic carrier 21 is in the temperature nonuniform state as immediately as possible.

If the measured value of the supply current I to the ceramic carrier 21 is further deviated from the predicted value I0, that is, if the measured value of the current supplied to the ceramic carrier 21 is higher than the fault threshold I1 calculated based on the integral ΣP0 (see YES in step S20b), the diagnostic apparatus according to the third embodiment is configured to determine that there is an excessive temperature-rise fault in the ceramic carrier 21 due to local heating. This configuration diagnoses whether there is an excessive temperature-rise fault in the ceramic carrier 21 as immediately as possible.

Accordingly, the diagnostic apparatus according to the third embodiment achieves the same technical effects as those in the first embodiment.

Note that, in step S33b, the CPU 25a according to the third embodiment is programmed to compare the updated measured value of the supply current I with the predicted value I0 calculated in step S12b to thereby determine, based on a result of the comparison, whether the updated measured value of the supply current I is equal to or lower than the predicted value I0. However, in step S33b, the CPU 25a according to the third embodiment can be programmed to calculate a value of the temperature T in the same procedure as step S16 and a predicted value T0 calculated in the same procedure as step S12, compare the calculated value of the temperature T with the predicted value T0 to thereby determine, based on a result of the comparison, whether the calculated value of the temperature T is equal to or lower than the predicted value T0 in the same procedure as step S33. The temperature T and the predicted value T0 vary as illustrated in (g1) of FIG. 10.

Fourth Embodiment

A diagnostic apparatus for the temperature state of the ceramic carrier 21 according to the fourth embodiment of the present disclosure will be described hereinafter with reference to FIGS. 11 and 12.

The structure and/or functions of the diagnostic apparatus according to the fourth embodiment are different from those of the diagnostic apparatus according to the first embodiment by the following points. So, the different points will be mainly described hereinafter.

The diagnostic apparatus according to the fourth embodiment is configured to determine whether: the ceramic carrier 21 is in the temperature nonuniform state, and there is an excessive temperature-rise fault in the ceramic carrier 21 using the correlation between the rate ΔT of temperature change of the ceramic carrier 21 and the supply power P0 to the ceramic carrier 21; the rate ΔT of temperature change of the ceramic carrier 21 represents the amount of change of the temperature T of the ceramic carrier 21 per unit of time.

Specifically, the diagnostic apparatus according to the fourth embodiment is configured to determine whether: the ceramic carrier 21 is in the temperature nonuniform state, and there is an excessive temperature-rise fault in the ceramic carrier 21 based on the comparison of the rate ΔT of temperature change of the ceramic carrier 21 with each of a fault threshold Δ1 and a non-uniformity threshold ΔT2 calculated based on the supply power P0 to the ceramic carrier 21.

Figure 11:
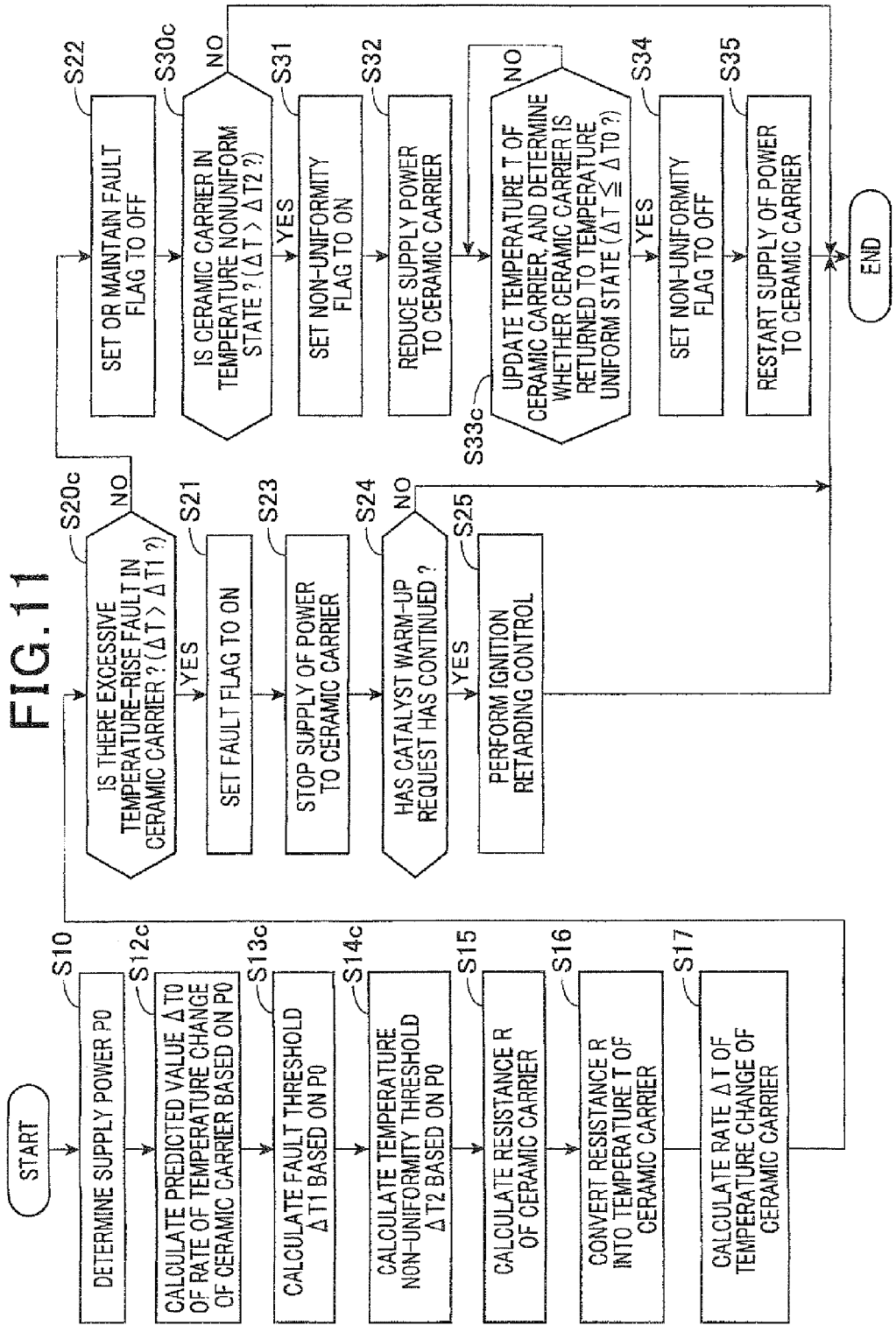
FIG. 11 is a flowchart schematically illustrating a sequence of operations of the CPU of the controller in accordance with a diagnostic program according to the fourth embodiment of the present disclosure.

FIG. 11 is a flowchart schematically illustrating a sequence of operations of the CPU 25a in accordance with a diagnostic program PR5 stored in the storage medium 25b in place of or in addition to the diagnostic program PR2 (see FIG. 3). Of course, the diagnostic program PR5 can be omitted in the storage medium 25b of the controller 25 according to the first embodiment.

The CPU 25a runs the diagnostic program PR5 in response to the occurrence of the catalyst warm-up request as a trigger, and repeatedly runs the diagnostic program PR5 in a preset cycle. In FIGS. 5 and 11, like operations (steps) therebetween, to which like reference characters are assigned, are omitted or simplified in description.

In step S12c after the operation of determining the supply power P0 to the ceramic carrier 21 in step S10, the CPU 25a calculates a predicted value ΔT0 of the rate of temperature change of the ceramic carrier 21 (EHC converter 20) based on the supply power P0 to the ceramic carrier 21 determined in step S10. Specifically, because the resistance R of the ceramic carrier 21 drops with increase in the supply power P0 to the ceramic carrier 21 so that current flowing through the ceramic carrier 21 increases, the rate of temperature rise (temperature change) of the ceramic carrier 21 should be increased. This results in that the supply power P0 to the ceramic carrier 21 has a correlation with the rate of temperature change of the ceramic carrier 21.

In other words, if there is no local heating in the ceramic carrier 21, the supply power P0 to the ceramic carrier 21 is in proportion to the rate ΔT of temperature change of the ceramic carrier 21 in accordance with the following equation (2):

$$P0 = C2 \times \Delta T \qquad (2)$$

where C2 is a proportional constant.

For example, in the fourth embodiment, the storage medium 25b stores therein a map M5 designed as, for example, a data table, a program, and/or a formula; this map M5 represents the correlation between a variable of the supply power P0 to the ceramic carrier 21 and a variable of the rate of temperature rise of the ceramic carrier 21. The map M5 can have been determined based on data obtained by tests and/or simulations using the power supply system PS, the engine 10, and the EHC converter 20 or their equivalent computer models. The map M5 can be described in the diagnostic program PR5.

Specifically, in step S12c, the CPU 25a references the map M5 using the supply power P0 determined in step S10 as a key to extract, based on a result of the reference, a predicted value ΔT0 of the rate of temperature change of the ceramic carrier 21 corresponding to the supply power P0. The map M5 is illustrated in FIG. 3. Of course, the map M5 can be omitted in the storage medium 25b of the controller 25 according to the first embodiment.

Following the operation in step S12c, the CPU 25a calculates, based on the supply power P0 determined in step S10, the fault threshold ΔT1 for the rate of temperature change of the ceramic carrier 21; this fault threshold is used to determine whether there is an excessive temperature-rise fault in the ceramic carrier 21 in step S13c. For example, the CPU 25a calculates the fault threshold ΔT1 based on the map M5 such that, the greater the supply power P0 is, the higher the fault threshold ΔT1 is.

Next, the CPU 25a calculates, based on the supply power P0 determined in step S10, the non-uniformity threshold ΔT2 for the rate of temperature change of the ceramic carrier 21; this non-uniformity threshold ΔT2 is used to determine whether the ceramic carrier 21 is in the temperature nonuniform state in step S14c. For example, the CPU 25a calculates the non-uniformity threshold ΔT2 based on the map M5 such that, the greater the supply power P0 is, the higher the non-uniformity threshold ΔT2 is, and the non-uniformity threshold ΔT2 is lower than the fault threshold T1.

Subsequent to the operation in step S14c, the CPU 25a carries out the operation in step S15 set forth above to calculate (measure) the resistance R of the electrically conducting path of the ceramic carrier 21 between the positive and negative electrodes 22 and 23 (the resistance R of the ceramic carrier 21). Next, in step S16, the CPU 25a carries out the operation in step S16 set forth above to convert the calculated value of the resistance R of the ceramic carrier 21 into a value of the temperature T of the ceramic carrier 21.

Next, in step S17, the CPU 25a calculates the rate ΔT of temperature change of the ceramic carrier 21 based on the present value of the temperature T of the ceramic carrier 21 calculated in step S16 of the present cycle and at least one previous value of the temperature T of the ceramic carrier 21 calculated in step S16 of at least one previous cycle. If this present cycle is the first cycle, the initial temperature of the catalyst 21b (ceramic carrier 21) is used as the at least one previous value of the temperature T of the ceramic carrier 21. Thus, the rate ΔT of temperature change of the ceramic carrier 21 is determined assuming that there is no local heating in the ceramic carrier 21.

Following the operation in step S17, the CPU 25a compares the rate ΔT of temperature change of the ceramic carrier 21 calculated in step S17 with the fault threshold ΔT1 calculated in step S13c to thereby determine, based on a result of the comparison, whether the rate ΔT of temperature change of the ceramic carrier 21 is higher than the fault threshold ΔT1. This determination in step S20c is to determine whether there is an excessive temperature-rise fault in the ceramic carrier 21 due to local heating.

If the rate ΔT of temperature change of the ceramic carrier 21 is higher than the fault threshold ΔT1 (YES in step S20c), the CPU 25a determines that the temperature nonuniform state is facilitated to a degree that there may be a risk of thermal damage of the EHC converter 20. In other words, the CPU 25a determines that an excessive temperature-rise fault occurs in the ceramic carrier 21. Then, the CPU 25a sets a fault flag in the form of, for example, a bit to ON (1) in step S21. For example, the fault flag is set to an initial value of OFF (0).

Otherwise, if the rate $\Delta T$ of temperature change of the ceramic carrier 21 is equal to or lower than the fault threshold $\Delta T1$ (NO in step S20c), the CPU 25a determines that the temperature nonuniform state is not facilitated to a degree that there may be a risk of thermal damage of the EHC converter 20. Then, the CPU 25a sets or maintains the fault flag to OFF (0) in step S22.

Following the operation in step S21, the CPU 25a carries out the operations in steps S23, S24, and S25 in the same procedure as corresponding steps illustrated in FIG. 5.

On the other hand, subsequent to the operation in step S22, the CPU 25a compares the rate $\Delta T$ of temperature change of the ceramic carrier 21 calculated in step S17 with the non-uniformity threshold $\Delta T2$ calculated in step S14c to thereby determine, based on a result of the comparison, whether the rate $\Delta T$ of temperature change of the ceramic carrier 21 is higher than the non-uniformity threshold $\Delta T2$ in step S30c. This determination in step S30c is to determine whether the ceramic carrier 21 is in the temperature nonuniform state due to local heating.

If the rate $\Delta T$ of temperature change of the ceramic carrier 21 is higher than the non-uniformity threshold $\Delta T2$ (YES in step S30c), the CPU 25a determines that the ceramic carrier 21 is in the temperature nonuniform state. Then, the CPU 25a sets a non-uniformity flag in the form of, for example, a bit to ON (1) in step S31; the non-uniformity flag of ON represents that the ceramic carrier 21 is in the temperature nonuniform state. For example, the non-uniformity flag is set to an initial value of OFF (0).

Otherwise, if the rate $\Delta T$ of temperature change of the ceramic carrier 21 is equal to or lower than the non-uniformity threshold $\Delta T2$ (NO in step S30c), the CPU 25a determines that the ceramic carrier 21 is not in the temperature nonuniform state. Then, the CPU 25a terminates the diagnostic program PR5 and repeats the operations in the diagnostic program PR5 from step S10 in the next cycle.

Following the operation in step S31, the CPU 25a controls the power source 24 to reduce supply power to the ceramic carrier 21 in step S32. For example, in the fourth embodiment, the CPU 25a reduces the supply power to the ceramic carrier 21 up to zero.

Subsequent to the operation in step S32, the CPU 25a updates the rate $\Delta T$ of temperature change of the ceramic carrier 21 calculated in step S17, and compares the updated rate $\Delta T$ of temperature change of the ceramic carrier 21 with the predicted value $\Delta T0$ calculated in step S12c to thereby determine, based on a result of the comparison, whether the updated rate $\Delta T$ of temperature change of the ceramic carrier 21 is equal to or lower than the predicted value $\Delta T0$ in step S33c. This determination in step S33c is to determine whether the non-uniformity of the temperature distribution in the ceramic carrier 21 is reduced to a degree that the temperature state of the ceramic carrier 21 can be taken to temperature uniform state.

For the same reason described in the first embodiment, in step S33c, the CPU 25a adjusts the duty cycle of the switch 24a to periodically supply fine current from the power source 24 to the ceramic carrier 21, and periodically updates the rate $\Delta T$ of temperature change of the ceramic carrier 21 with the fine current flowing through the ceramic carrier 21. Thus, in step S33c, the CPU 25a can compare the updated value of the temperature T with the predicted value T0 in place of the comparison of the updated rate $\Delta T$ of temperature change of the ceramic carrier 21 with the predicted value $\Delta T0$ in the same procedure as step S33. In step S33c, the CPU 25a also can compare the updated value of the resistance R with the predicted value R0 in place of the comparison of the updated rate $\Delta T$ of temperature change of the ceramic carrier 21 with the predicted value $\Delta T0$ in the same procedure as step S33a.

If the updated rate $\Delta T$ of temperature change of the ceramic carrier 21 is equal to or lower than the predicted value $\Delta T0$ (YES in step S33c), the CPU 25a determines that the temperature state of the ceramic carrier 21 is returned to a temperature uniform state. Then, the CPU 25a sets the non-uniformity flag to OFF in step S34, and restarts the supply of power to the ceramic carrier 21 with a value of the supplied power limited to be lower than the supply power P0; the supply power P0 was determined at the last time when the temperature state of the ceramic carrier 21 was determined to be a temperature uniform state with the temperature non-uniformity flag of OFF in step S35. Thereafter, the CPU 25a terminates the diagnostic program PR5 and repeats the operations in the diagnostic program PR5 from step S10 in the next cycle.

Otherwise, if the updated rate $\Delta T$ of temperature change of the ceramic carrier 21 is higher than the predicted value $\Delta T0$ (NO in step S33c), the CPU 25a determines that the ceramic carrier 21 remains the temperature nonuniform state. Then, the CPU 25a repeats step S33c while updating the rate $\Delta T$ of temperature change of the ceramic carrier 21 until the updated rate $\Delta T$ of temperature change of the ceramic carrier 21 is equal to or lower than the predicted value $\Delta T0$ (YES in step S33c).

Note that, if the CPU 25a adjusts the duty cycle of the switch 24a such that the supply power to the ceramic carrier 21 is higher than zero in step S32, and the determination in step S33c is negative, the CPU 25a terminates the diagnostic program PR5 and repeats the operations in the diagnostic program PR5 from step S12c in the next cycle. This is because the supply power P0 to the ceramic carrier 21 has been determined in step S32.

Figure 12:
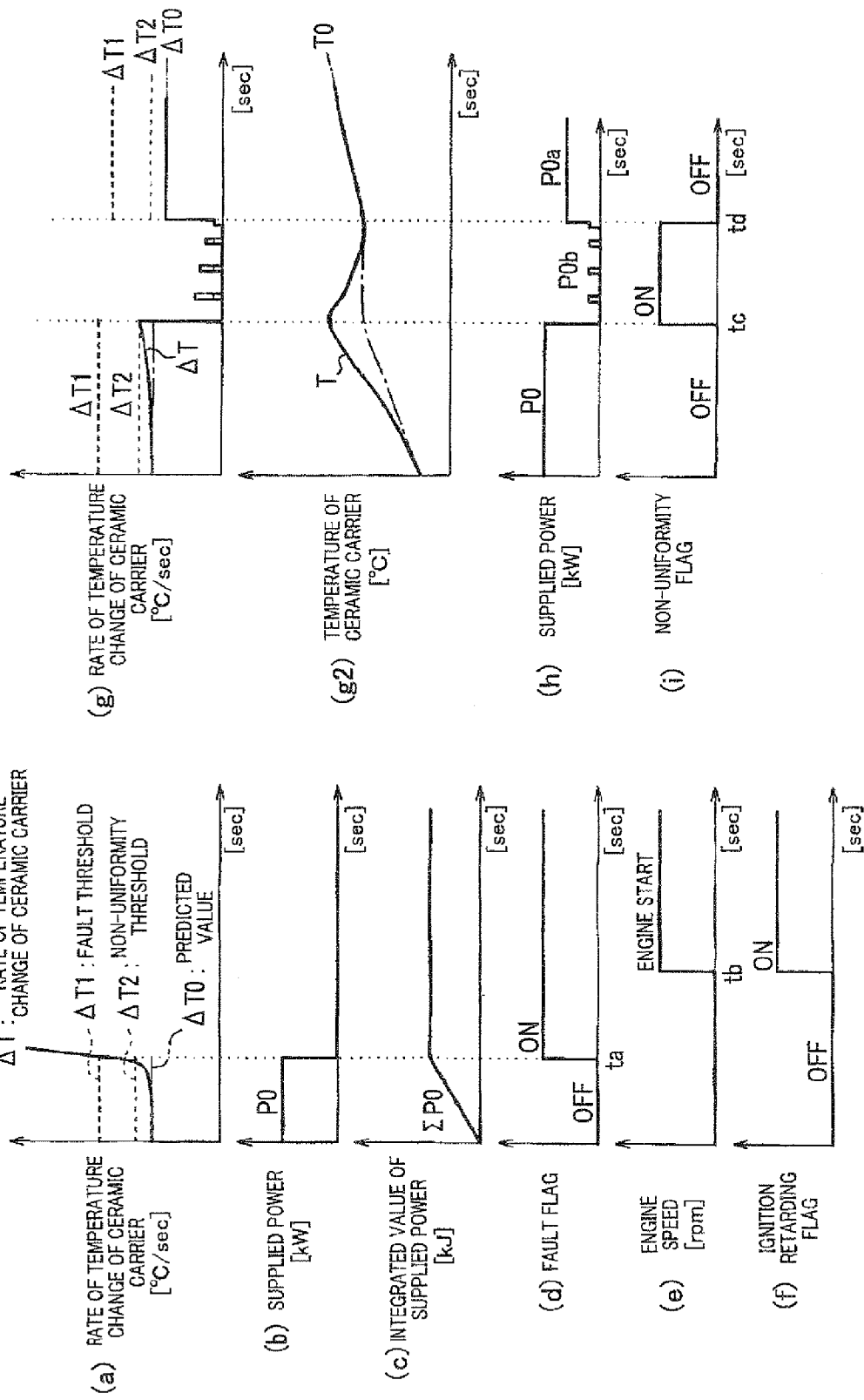
FIG. 12 is a timing chart schematically illustrating the transitions of the various parameters during the CPU running the diagnostic program according to the fourth embodiment.

FIG. 12 is a timing chart schematically illustrating the transitions of various parameters during the CPU 25a running the diagnostic program PR5. The various parameters include the rate $\Delta T$ of temperature change of the ceramic carrier 21, the fault threshold $\Delta T1$, the non-uniformity threshold $\Delta T2$, the predicted value $\Delta T0$, the supply power P0 to the ceramic carrier 21, the integral $\Sigma P0$ of the supply power P0, the fault flag, the engine speed, the ignition retarding flag, and the non-uniformity flag.

(a) to (f) of FIG. 12 demonstrate the transitions of these parameters except for the non-uniformity flag if the rate $\Delta T$ of temperature change of the ceramic carrier 21 rises abruptly due to local heating so that an excessive temperature-rise fault occurs in the ceramic carrier 21. (g) to (h) of FIG. 12 demonstrate the transitions of some of these parameters if the rate $\Delta T$ of temperature change of the ceramic carrier 21 rises so that the ceramic carrier 21 is in the temperature nonuniform state. Note that the descriptions of the parameters in (a) to (h) of FIG. 12, which are identical to those of the parameters (a) to (h) of FIG. 5, are omitted or simplified.

First, let us describe the transitions of the parameters for the case of the occurrence of an excessive temperature-rise fault in the ceramic carrier 21 during the CPU 25a running the diagnostic program PR5 with reference to (a) to (f) of FIG. 12.

When the supply of the power P0 determined in step S10 is started (see (b) of FIG. 12), the rate $\Delta T$ of temperature change of the ceramic carrier 21 rises abruptly due to local heating over the non-uniformity threshold $\Delta T2$, and further over the fault threshold $\Delta T1$ (see (a) of FIG. 12). At the time when the rate $\Delta T$ of temperature change of the ceramic carrier 21 is over the fault threshold $\Delta T1$ at time ta, the fault flag is set to ON in step S21 (see (d) of FIG. 12), and the supply of power to the ceramic carrier 21 is stopped in step S23 (see (b) of FIG. 12).

Note that the supply power P0 is constant up to the time ta (see (b) of FIG. 12). Thus, each of the fault threshold $\Delta T1$, the non-uniformity threshold $\Delta T2$, and the predicted value $\Delta T0$ is constant up to the time ta (see (a) of FIG. 12).

Thereafter, if the catalyst warm-up request has continued at time tb of the engine 10 starting up in response to the driver's operation in step S24, the ignition retarding control is carried out in step S25 with the ceramic carrier 21 being deenergized (see (e) and (f) of FIG. 12).

Next, let us describe the transitions of some of the parameters for the case where the ceramic carrier 21 is in the temperature nonuniform state during the CPU 25a running the diagnostic program PR5 with reference to (g) to (i) of FIG. 12.

When the supply of the power P0 determined in step S10 is started (see (h) of FIG. 12), the rate $\Delta T$ of temperature change of the ceramic carrier 21 rises gradually irrespective of local heating as compared with the increase in the rate $\Delta T$ of temperature change of the ceramic carrier 21 in (a) of FIG. 12 so that, when the rate $\Delta T$ of temperature change of the ceramic carrier 21 becomes higher than the non-uniformity threshold $\Delta T2$ at time tc, the non-uniformity flag is set to ON in step S31 (see (i) of FIG. 12), and the supply of power to the ceramic carrier 21 is reduced, that is, stopped in step S32 (see (h) of FIG. 12). The reduction in the supply of power to the ceramic carrier 21 causes the rate $\Delta T$ of temperature change of the ceramic carrier 21 to gradually drop (see (g) of FIG. 12).

Thereafter, when the rate $\Delta T$ of temperature change of the ceramic carrier 21 reaches the predicted value $\Delta T0$ at time td, it is determined that the temperature state of the ceramic carrier 21 is returned to a temperature uniform state so that the non-uniformity flag is set to OFF in step S34 (see (i) of FIG. 12). Thus, the supply of power to the ceramic carrier 21 is restarted (see (h) of FIG. 12), in other words, power supplied to the ceramic carrier 21 is increased from zero to a value P0a with the value P0a limited to be lower than the supply power P0; the supply power P0 was determined at the last time when the temperature state of the ceramic carrier 21 was determined to be a temperature uniform state with the temperature non-uniformity flag of OFF in step S35 (see (h) of FIG. 12).

Note that, as described above, in order to calculate the temperature T of the ceramic catalyst 21 based on the measured value of the resistance R of the ceramic carrier 21, the fine current is periodically supplied to the ceramic catalyst 21 within the period during the ceramic carrier 21 being deenergized by the operation of the CPU 25a in step S32 (see (h) of FIG. 12). Supply power P0b based on the fine current is set to be lower than the value P0a of power supplied to the ceramic carrier 21 by the operation of the CPU 25a in step S35. Although illustration is omitted in (g) of FIGS. 6, 8, and 10, the supply power P0b based on the fine current can be supplied to the ceramic carrier 21 in each of the first to third embodiments.

In addition, note that, because the value of the supplied power to the ceramic carrier 21 with the temperature non-uniformity flag of OFF is limited to be lower than the previous value of the supplied power with the temperature non-uniformity flag of ON, the gradient of variation of each of the fault threshold $\Delta T1$, the non-uniformity threshold $\Delta T2$, and the predicted value $\Delta T0$ after the time td is reduced as compared with its gradient of variation up to the time tc.

As described above, the diagnostic apparatus according to the fourth embodiment is configured to calculate the predicted value $\Delta T0$ of the rate $\Delta T$ of temperature change of the ceramic carrier 21 based on the determined supply power P0 to the ceramic carrier 21 (see step S12c). In addition, the diagnostic apparatus according to the fourth embodiment is configured to determine that the ceramic carrier 21 is in the temperature nonuniform state if the rate $\Delta T$ of temperature change of the ceramic carrier 21 is deviated from the predicted value $\Delta T0$, in other words, if the rate $\Delta T$ of temperature change of the ceramic carrier 21 is higher than the non-uniformity threshold $\Delta T2$ calculated based on the determined supply power P0 (see YES in step S30c).

These configurations allow the CPU 25a to diagnose whether the ceramic carrier 21 is in the temperature nonuniform state as immediately as possible.

If the rate $\Delta T$ of temperature change of the ceramic carrier 21 is further deviated from the predicted value $\Delta T0$, that is, if the rate $\Delta T$ of temperature change of the ceramic carrier 21 is higher than the fault threshold $\Delta T1$ calculated based on the determined supply power P0 (see YES in step S20c), the diagnostic apparatus according to the fourth embodiment is configured to determine that there is an excessive temperature-rise fault in the ceramic carrier 21 due to local heating. This configuration diagnoses whether there is an excessive temperature-rise fault in the ceramic carrier 21 as immediately as possible.

Accordingly, the diagnostic apparatus according to the fourth embodiment achieves the same technical effects as those in the first embodiment.

Fifth Embodiment

A diagnostic apparatus for the temperature state of the ceramic carrier 21 according to the fifth embodiment of the present disclosure will be described hereinafter with reference to FIGS. 13 and 14.

The structure and/or functions of the diagnostic apparatus according to the fifth embodiment are different from those of the diagnostic apparatus according to the first embodiment by the following points. So, the different points will be mainly described hereinafter.

The diagnostic apparatus according to the fifth embodiment is configured to use the inverse relationship of the rate $\Delta R$ of resistance change of the ceramic carrier 21 with respect to the rate $\Delta T$ of temperature change of the ceramic carrier 21 to thereby determine whether: the ceramic carrier 21 is in the temperature nonuniform state, and there is an excessive temperature-rise fault in the ceramic carrier 21 based on the integral $\Sigma P0$ of the supply power P0 to the ceramic carrier 21 and the rate $\Delta R$ of resistance change of the ceramic carrier 21. The rate $\Delta R$ of resistance change of the ceramic carrier 21 represents the amount of change of the resistance R of the ceramic carrier 21 per unit of time.

Specifically, the diagnostic apparatus according to the fifth embodiment is configured to determine whether: the ceramic carrier 21 is in the temperature nonuniform state, and there is an excessive temperature-rise fault in the ceramic carrier 21 based on the comparison of the rate $\Delta R$ of resistance change of the ceramic carrier 21 with each of a fault threshold $\Delta R1$ and a non-uniformity threshold $\Delta R2$ calculated based on the integral $\Sigma P0$ of the supply power P0 to the ceramic carrier 21.

Figure 13:
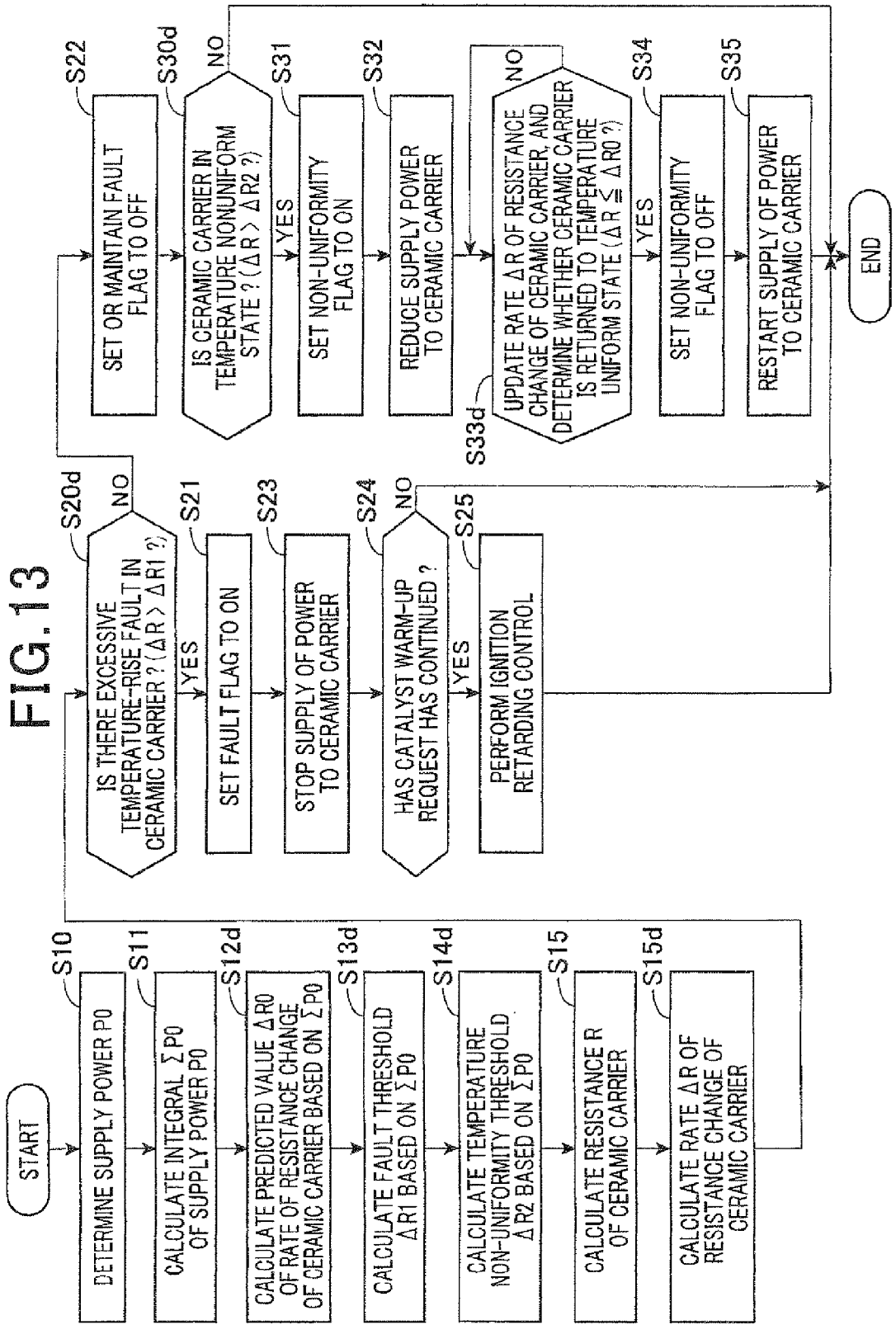
FIG. 13 is a flowchart schematically illustrating a sequence of operations of the CPU of the controller in accordance with a diagnostic program according to the fifth embodiment of the present disclosure.

FIG. 13 is a flowchart schematically illustrating a sequence of operations of the CPU 25a in accordance with a diagnostic program PR6 stored in the storage medium 25b in place of or in addition to the diagnostic program PR2 (see FIG. 3). Of course, the diagnostic program PR6 can be omitted in the storage medium 25b of the controller 25 according to the first embodiment.

The CPU 25a runs the diagnostic program PR6 in response to the occurrence of the catalyst warm-up request as a trigger, and repeatedly runs the diagnostic program PR6 in a preset cycle. In FIGS. 5 and 13, like operations (steps) therebetween, to which like reference characters are assigned, are omitted or simplified in description.

In step S12d after the operation of calculating the integral $\Sigma P0$ of the supply power P0 to the ceramic carrier 21 in step S11, the CPU 25a calculates a predicted value $\Delta R0$ of the rate of resistance change of the ceramic carrier 21 based on the integral $\Sigma P0$ of the supply power P0 to the ceramic carrier 21 calculated in step S11. Specifically, because the resistance R of the ceramic carrier 21 drops with increase in the supply power P0 to the ceramic carrier 21, the rate of resistance drop (resistance change) of the ceramic carrier 21 should be increased. This results in that the integral $\Sigma P0$ of the supply power P0 to the ceramic carrier 21 has a correlation with the rate of resistance change (resistance drop) of the ceramic carrier 21.

For example, in the fifth embodiment, the storage medium 25b stores therein a map M6 designed as, for example, a data table, a program, and/or a formula; this map M6 represents the correlation between a variable of the integral $\Sigma P0$ of the supply power P0 to the ceramic carrier 21 and a variable of the rate of resistance change of the ceramic carrier 21. The map M6 can have been determined based on data obtained by tests and/or simulations using the power supply system PS, the engine 10, and the EHC converter 20 or their equivalent computer models. The map M6 can be described in the diagnostic program PR6.

Specifically, in step S12d, the CPU 25a references the map M6 using the integral $\Sigma P0$ of the supply power P0 calculated in step S11 as a key to extract, based on a result of the reference, a predicted value $\Delta R0$ of the rate of resistance change of the ceramic carrier 21 corresponding to the integral $\Sigma P0$ of the supply power P0. The map M6 is illustrated in FIG. 3. Of course, the map M6 can be omitted in the storage medium 25b of the controller 25 according to the first embodiment.

Following the operation in step S12d, the CPU 25a calculates, based on the integral $\Sigma P0$ of the supply power P0 calculated in step S11, the fault threshold $\Delta R1$ for the rate of resistance change of the ceramic carrier 21; this fault threshold $\Delta R1$ is used to determine whether there is an excessive temperature-rise fault in the ceramic carrier 21 in step S13d. For example, the CPU 25a calculates the fault threshold $\Delta R1$ based on the map M6 such that, the greater the integral $\Sigma P0$ of the supply power P0 is, the higher the fault threshold $\Delta R1$ is.

Next, the CPU 25a calculates, based on the integral $\Sigma P0$ of the supply power P0 calculated in step S11, the non-uniformity threshold $\Delta R2$ for the rate of resistance change of the ceramic carrier 21; this non-uniformity threshold $\Delta R2$ is used to determine whether the ceramic carrier 21 is in the temperature nonuniform state in step S14d. For example, the CPU 25a calculates the non-uniformity threshold $\Delta R2$ based on the map M6 such that, the greater the integral $\Sigma P0$ of the supply power P0 is, the higher the non-uniformity threshold $\Delta R2$ is, and the non-uniformity threshold $\Delta R2$ is higher than the fault threshold $\Delta R1$.

Subsequent to the operation in step S14d, the CPU 25a carries out the operation in step S15 set forth above to calculate (measure) the resistance R of the electrically conducting path of the ceramic carrier 21 between the positive and negative electrodes 22 and 23 (the resistance R of the ceramic carrier 21).

Next, the CPU 25a calculates the rate $\Delta R$ of resistance change of the ceramic carrier 21 based on the present value of the resistance R of the ceramic carrier 21 calculated in step S15 of the present cycle and at least one previous value of the resistance R of the ceramic carrier 21 calculated in step S15 of at least one previous cycle. If this present cycle is the first cycle, the initial resistance of the ceramic carrier 21 is used as the at least one previous value of the resistance R of the ceramic carrier 21. Thus, the rate $\Delta R$ of resistance change of the ceramic carrier 21 is determined assuming that there is no local heating in the ceramic carrier 21.

Following the operation in step S15d, the CPU 25a compares the rate $\Delta R$ of resistance change of the ceramic carrier 21 calculated in step S15d with the fault threshold $\Delta R1$ calculated in step S13d to thereby determine, based on a result of the comparison, whether the rate $\Delta R$ of resistance change of the ceramic carrier 21 is higher than the fault threshold $\Delta R1$. This determination in step S20d is to determine whether there is an excessive temperature-rise fault in the ceramic carrier 21 due to local heating.

If the rate $\Delta R$ of resistance change of the ceramic carrier 21 is higher than the fault threshold $\Delta R1$ (YES in step S20d), the CPU 25a determines that the temperature nonuniform state is facilitated to a degree that there may be a risk of thermal damage of the EHC converter 20. In other words, the CPU 25a determines that an excessive temperature-rise fault occurs in the ceramic carrier 21. Then, the CPU 25a sets a fault flag in the form of, for example, a bit to ON (1) in step S21. For example, the fault flag is set to an initial value of OFF (0).

Otherwise, if the rate $\Delta R$ of resistance change of the ceramic carrier 21 is equal to or lower than the fault threshold $\Delta T1$ (NO in step S20d), the CPU 25a determines that the temperature nonuniform state is not facilitated to a degree that there may be a risk of thermal damage of the EHC converter 20. Then, the CPU 25a sets or maintains the fault flag to OFF (0) in step S22.

Following the operation in step S21, the CPU 25a carries out the operations in steps S23, S24, and S25 in the same procedure as corresponding steps illustrated in FIG. 5.

On the other hand, subsequent to the operation in step S22, the CPU 25a compares the rate $\Delta R$ of resistance change of the ceramic carrier 21 calculated in step S15d with the non-uniformity threshold $\Delta R2$ calculated in step S14d to thereby determine, based on a result of the comparison, whether the rate $\Delta R$ of resistance change of the ceramic carrier 21 is higher than the non-uniformity threshold $\Delta R2$ in step S30d. This determination in step S30d is to determine whether the ceramic carrier 21 is in the temperature nonuniform state due to local heating.

If the rate $\Delta R$ of resistance change of the ceramic carrier 21 is higher than the non-uniformity threshold $\Delta R2$ (YES in step S30d), the CPU 25a determines that the ceramic carrier 21 is in the temperature nonuniform state. Then, the CPU 25a sets a non-uniformity flag in the form of, for example, a bit to ON (1) in step S31; the non-uniformity flag of ON represents that the ceramic carrier 21 is in the temperature nonuniform state. For example, the non-uniformity flag is set to an initial value of OFF (0).

Otherwise, if the rate $\Delta R$ of resistance change of the ceramic carrier 21 is equal to or lower than the non-uniformity threshold $\Delta R2$ (NO in step S30d), the CPU 25a determines that the ceramic carrier 21 is not in the temperature nonuniform state. Then, the CPU 25a terminates the diagnostic program PR6 and repeats the operations in the diagnostic program PR6 from step S10 in the next cycle.

Following the operation in step S31, the CPU 25a controls the power source 24 to reduce supply power to the ceramic carrier 21 in step S32. For example, in the fifth embodiment, the CPU 25a reduces the supply power P0 to the ceramic carrier 21 up to zero.

Subsequent to the operation in step S32, the CPU 25a updates the rate ΔR of resistance change of the ceramic carrier 21 calculated in step S15d, and compares the updated rate ΔR of resistance change of the ceramic carrier 21 with the predicted value ΔR0 calculated in step S12d to thereby determine, based on a result of the comparison, whether the updated rate ΔR of resistance change of the ceramic carrier 21 is equal to or lower than the predicted value ΔR0 in step S33d. This determination in step S33d is to determine whether the non-uniformity of the temperature distribution in the ceramic carrier 21 is reduced to a degree that the temperature state of the ceramic carrier 21 can be taken to temperature uniform state.

For the same reason described in the first embodiment, in step S33d, the CPU 25a adjusts the duty cycle of the switch 24a to periodically supply fine current from the power source 24 to the ceramic carrier 21, and periodically updates the rate ΔR of resistance change of the ceramic carrier 21 with the fine current flowing through the ceramic carrier 21. Thus, in step S33d, the CPU 25a can compare the updated value of the temperature T with the predicted value T0 in place of the comparison of the updated rate ΔR of resistance change of the ceramic carrier 21 with the predicted value ΔR0 in the same procedure as step S33. In step S33d, the CPU 25a also can compare the updated value of the resistance R with the predicted value R0 in place of the comparison of the updated rate ΔR of resistance change of the ceramic carrier 21 with the predicted value ΔR0 in the same procedure as step S33a.

If the updated rate ΔR of resistance change of the ceramic carrier 21 is equal to or lower than the predicted value ΔR0 (YES in step S33d), the CPU 25a determines that the temperature state of the ceramic carrier 21 is returned to a temperature uniform state. Then, the CPU 25a sets the non-uniformity flag to OFF in step S34, and restarts the supply of power to the ceramic carrier 21 with a value of the supplied power limited to be lower than the supply power P0; the supply power P0 was determined at the last time when the temperature state of the ceramic carrier 21 was determined to be a temperature uniform state with the temperature non-uniformity flag of OFF in step S35. Thereafter, the CPU 25a terminates the diagnostic program PR6 and repeats the operations in the diagnostic program PR6 from step S10 in the next cycle.

Otherwise, if the updated rate ΔR of resistance change of the ceramic carrier 21 is higher than the predicted value ΔR0 (NO in step S33d), the CPU 25a determines that the ceramic carrier 21 remains the temperature nonuniform state. Then, the CPU 25a repeats step S33d while updating the rate ΔR of resistance change of the ceramic carrier 21 until the updated rate ΔR of resistance change of the ceramic carrier 21 is equal to or lower than the predicted value ΔR0 (YES in step S33d).

Note that, if the CPU 25a adjusts the duty cycle of the switch 24a such that the supply power P0 to the ceramic carrier 21 is higher than zero in step S32, and the determination in step S33d is negative, the CPU 25a terminates the diagnostic program PR6 and repeats the operations in the diagnostic program PR6 from step S12d in the next cycle. This is because the supply power P0 to the ceramic carrier 21 has been determined in step S32.

Figure 14:
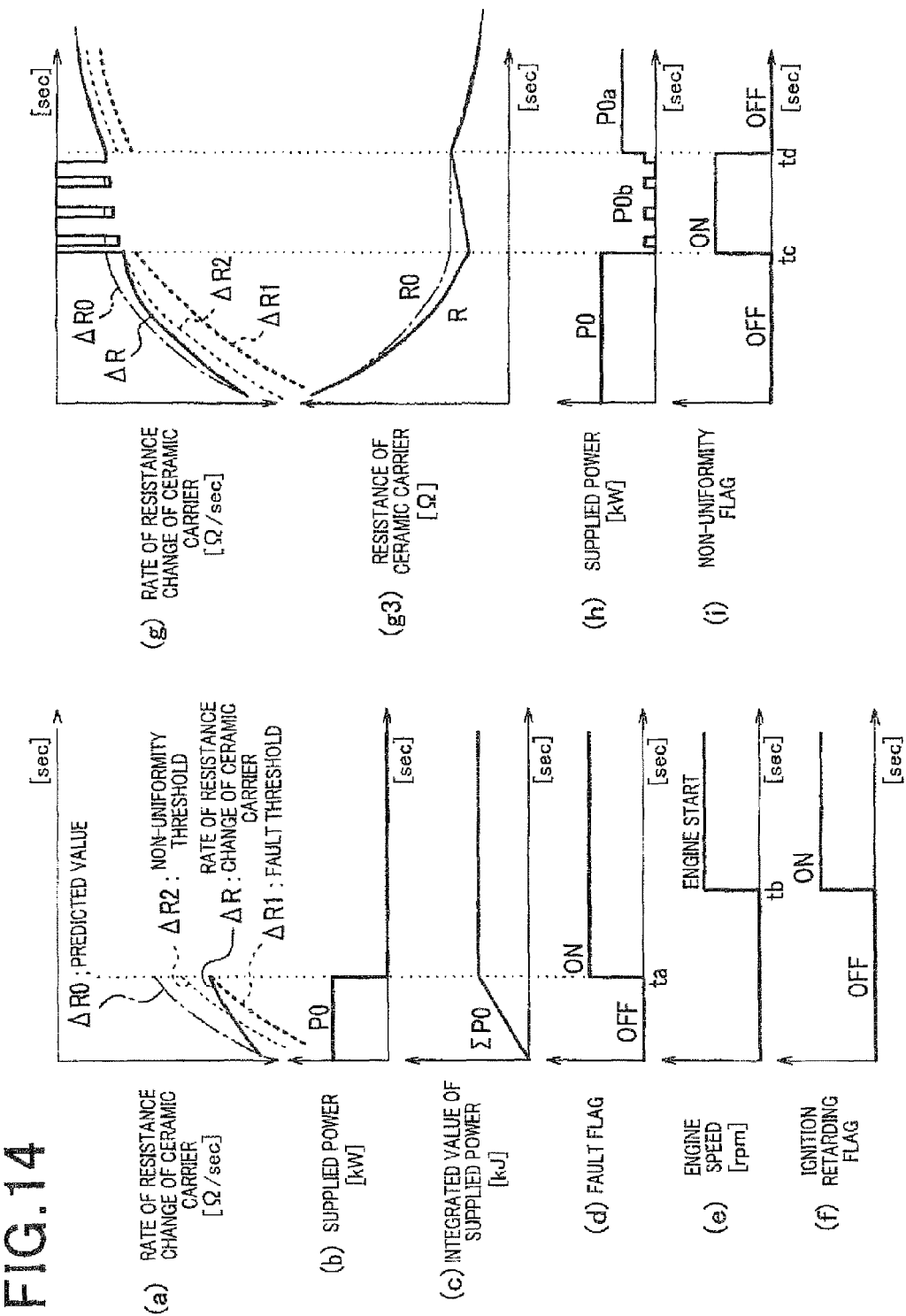
FIG. 14 is a timing chart schematically illustrating the transitions of the various parameters during the CPU running the diagnostic program according to the fifth embodiment.

FIG. 14 is a timing chart schematically illustrating the transitions of various parameters during the CPU 25a running the diagnostic program PR6. The various parameters include the rate ΔR of resistance change of the ceramic carrier 21, the fault threshold ΔR1, the non-uniformity threshold ΔR2, the predicted value ΔR0, the supply power P0 to the ceramic carrier 21, the integral ΣP0 of the supply power P0, the fault flag, the engine speed, the ignition retarding flag, and the non-uniformity flag.

(a) to (f) of FIG. 14 demonstrate the transitions of these parameters except for the non-uniformity flag if the rate ΔR of resistance change of the ceramic carrier 21 drops abruptly, in other words, the rate ΔR of resistance drop of the ceramic carrier 21 rises abruptly due to local heating so that an excessive temperature-rise fault occurs in the ceramic carrier 21. (g) to (h) of FIG. 14 demonstrate the transitions of some of these parameters if the rate ΔR of resistance change of the ceramic carrier 21 drops so that the ceramic carrier 21 is in the temperature nonuniform state. Note that the descriptions of the parameters in (a) to (h) of FIG. 14, which are identical to those of the parameters (a) to (h) of FIG. 5, are omitted or simplified.

First, let us describe the transitions of the parameters for the case of the occurrence of an excessive temperature-rise fault in the ceramic carrier 21 during the CPU 25a running the diagnostic program PR5 with reference to (a) to (f) of FIG. 14.

When the supply of the power P0 determined in step S10 is started (see (b) of FIG. 14), the temperature T of the ceramic carrier 21 rises due to the occurrence of local heating with the rate ΔR of resistance change of the ceramic carrier 21 dropping, resulting in that the rate ΔR of resistance change of the ceramic carrier 21 drops abruptly due to local heating below the non-uniformity threshold ΔR2, and further below the fault threshold ΔR1 (see (a) of FIG. 14). At the time when the rate ΔR of resistance change of the ceramic carrier 21 is below the fault threshold ΔR1 at time ta, the fault flag is set to ON in step S21 (see (d) of FIG. 14), and the supply of power to the ceramic carrier 21 is stopped in step S23 (see (b) of FIG. 14).

Note that, because the supply power P0 has been supplied up to the time ta, the integral ΣP0 of the supply power P0 rises up to the time ta (see (c) of FIG. 14). Thus, each of the fault threshold ΔR1, the non-uniformity threshold ΔR2, and the predicted value ΔR0 rises with increase in the integral ΣP0 of the supply power P0 up to the time ta (see (a) of FIG. 14).

Thereafter, if the catalyst warm-up request has continued at time tb of the engine 10 starting up in response to the driver's operation in step S24, the ignition retarding control is carried out in step S25 with the ceramic carrier 21 being deenergized (see (e) and (f) of FIG. 14).

Next, let us describe the transitions of some of the parameters for the case where the ceramic carrier 21 is in the temperature nonuniform state during the CPU 25a running the diagnostic program PR6 with reference to (g) to (i) of FIG. 14.

When the supply of the power P0 determined in step S10 is started (see (h) of FIG. 14), the rate ΔR of resistance change of the ceramic carrier 21 drops gradually irrespective of local heating as compared with the drop in the rate ΔR of reference change of the ceramic carrier 21 in (a) of FIG. 14 so that, when the rate ΔR of resistance change of the ceramic carrier 21 becomes lower than the non-uniformity threshold ΔR2 at time tc, the non-uniformity flag is set to ON in step S31 (see (i) of FIG. 14), and the supply of power to the ceramic carrier 21 is reduced, that is, stopped in step S32 (see (h) of FIG. 14). The reduction in the supply of power to the ceramic carrier 21 causes the rate ΔR of resistance change of the ceramic carrier 21 to gradually rise.

Thereafter, when the rate ΔR of resistance change of the ceramic carrier 21 reaches the predicted value ΔR0 at time td, it is determined that the temperature state of the ceramic carrier 21 is returned to a temperature uniform state so that the non-uniformity flag is set to OFF in step S34 (see (i) of FIG.

14). Thus, the supply of power to the ceramic carrier 21 is restarted (see (h) of FIG. 14), in other words, power supplied to the ceramic carrier 21 is increased from zero to a value P0a with the value P0a limited to be lower than the supply power P0; the supply power P0 was determined at the last time when the temperature state of the ceramic carrier 21 was determined to be a temperature uniform state with the temperature non-uniformity flag of OFF in step S35 (see (h) of FIG. 14).

Note that, as described above, in order to calculate the value of the resistance R of the ceramic carrier 21, the fine current is periodically supplied to the ceramic catalyst 21 within the period during the ceramic carrier 21 being deenergized by the operation of the CPU 25a in step S32 (see (h) of FIG. 14). Supply power P0b based on the fine current is set to be lower than the value P0a of power supplied to the ceramic carrier 21 by the operation of the CPU 25a in step S35, making it possible to accelerate temperature uniformity in the ceramic carrier 21.

In addition, note that, because the value of the supplied power to the ceramic carrier 21 with the temperature non-uniformity flag of OFF is limited to be lower than the previous value of the supplied power with the temperature non-uniformity flag of ON, the gradient of variation of each of the fault threshold $\Delta R1$, the non-uniformity threshold $\Delta R2$, and the predicted value $\Delta R0$ after the time td is reduced as compared with its gradient of variation up to the time tc (see (g) of FIG. 14).

As described above, the diagnostic apparatus according to the fifth embodiment is configured to calculate the predicted value $\Delta R0$ of the rate $\Delta R$ of resistance change of the ceramic carrier 21 based on the calculated integral $\Sigma P0$ of the supply power P0 to the ceramic carrier 21 (see step S12d). In addition, the diagnostic apparatus according to the fifth embodiment is configured to determine that the ceramic carrier 21 is in the temperature nonuniform state if the rate $\Delta R$ of resistance change of the ceramic carrier 21 is deviated from the predicted value $\Delta R0$, in other words, if the rate $\Delta R$ of resistance change of the ceramic carrier 21 is higher than the non-uniformity threshold $\Delta R2$ calculated based on the calculated integral $\Sigma P0$ of the supply power P0 (see YES in step S30d).

These configurations allow the CPU 25a to diagnose whether the ceramic carrier 21 is in the temperature nonuniform state as immediately as possible.

If the rate $\Delta R$ of resistance change of the ceramic carrier 21 is further deviated from the predicted value $\Delta R0$, that is, if the rate $\Delta R$ of resistance change of the ceramic carrier 21 is higher than the fault threshold $\Delta R1$ calculated based on the calculated integral $\Sigma P0$ of the supply power P0 (see YES in step S20d), the diagnostic apparatus according to the fifth embodiment is configured to determine that there is an excessive temperature-rise fault in the ceramic carrier 21 due to local heating. This configuration diagnoses whether there is an excessive temperature-rise fault in the ceramic carrier 21 as immediately as possible.

Accordingly, the diagnostic apparatus according to the fifth embodiment achieves the same technical effects as those in the first embodiment.

Specifically, the diagnostic apparatus according to the fifth embodiment is configured to determine whether: the ceramic carrier 21 is in the temperature nonuniform state, and there is an excessive temperature-rise fault in the ceramic carrier 21 based on the comparison of the rate $\Delta R$ of resistance change of the ceramic carrier 21 with each of a fault threshold $\Delta R1$ and a non-uniformity threshold $\Delta R2$ calculated based on the integral $\Sigma P0$ of the supply power P0 to the ceramic carrier 21.

Note that, because the rate of supply-current change to the ceramic carrier 21 has an inverse relationship with respect to the rate $\Delta R$ of resistance change of the ceramic carrier 21, a modified diagnostic apparatus according to the fifth embodiment can be configured to use the inverse relationship of the rate of supply-current change to the ceramic carrier 21 with respect to the rate $\Delta R$ of resistance change of the ceramic carrier 21 to thereby determine whether: the ceramic carrier 21 is in the temperature nonuniform state, and there is an excessive temperature-rise fault in the ceramic carrier 21 based on the integral $\Sigma P0$ of the supply power P0 to the ceramic carrier 21 and the rate of supply-current change to the ceramic carrier 21. The rate of supply-current change to the ceramic carrier 21 represents the amount of supply-current change to the ceramic carrier 21 per unit of time.

Sixth Embodiment

A diagnostic apparatus for the temperature state of the ceramic carrier 21 according to the sixth embodiment of the present disclosure will be described hereinafter with reference to FIGS. 15 to 17.

The structure and/or functions of the diagnostic apparatus according to the sixth embodiment are different from those of the diagnostic apparatus according to the first embodiment by the following points. So, the different points will be mainly described hereinafter.

The diagnostic apparatus according to the first embodiment determines whether: the ceramic carrier 21 is in the temperature nonuniform state, and there is an excessive temperature-rise fault in the ceramic carrier 21 based on the comparison of the temperature T of the ceramic carrier 21 with each of the thresholds T1 and T2 calculated based on the integral $\Sigma P0$ of the supply power P0 to the ceramic carrier 21.

In contrast, the diagnostic apparatus according to the sixth embodiment is provided with a temperature sensor 26 mounted on a portion 21g in the electrically conducting path of the ceramic carrier 21 between the positive and negative electrodes 22 and 23 of the ceramic carrier 21 illustrated in FIG. 2. The temperature sensor 26 is electrically connected with the controller 25 and operative to measure a value of the temperature T of the ceramic carrier 21; this measured value will be referred to as a "measured temperature value Tsen". In addition, the temperature sensor 26 is operative to output, to the controller 25, the measured temperature value Tsen.

Specifically, the diagnostic apparatus according to the sixth embodiment is configured to determine whether: the ceramic carrier 21 is in the temperature nonuniform state, and there is an excessive temperature-rise fault in the ceramic carrier 21 based on the comparison of the measured temperature value Tsen with each of: a first fault threshold T11, a second fault threshold T12, a first non-uniformity threshold T21, and a second non-uniformity threshold T22.

Figure 15:
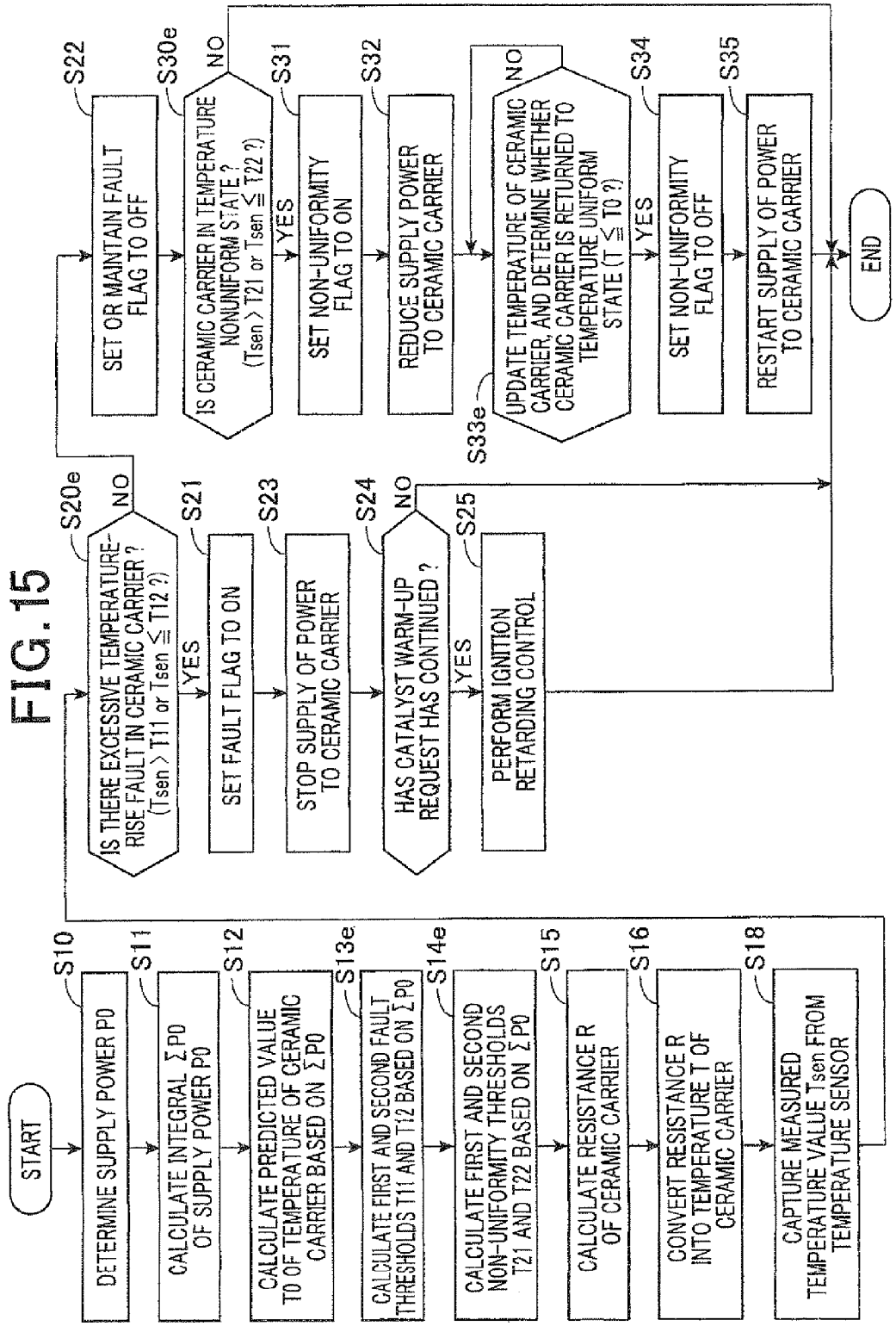
FIG. 15 is a flowchart schematically illustrating a sequence of operations of the CPU of the controller in accordance with a diagnostic program according to the sixth embodiment of the present disclosure.

FIG. 15 is a flowchart schematically illustrating a sequence of operations of the CPU 25a in accordance with a diagnostic program PR7 stored in the storage medium 25b in place of or in addition to the diagnostic program PR2 (see FIG. 3). Of course, the diagnostic program PR7 can be omitted in the storage medium 25b of the controller 25 according to the first embodiment.

The CPU 25a runs the diagnostic program PR7 in response to the occurrence of the catalyst warm-up request as a trigger, and repeatedly runs the diagnostic program PR7 in a preset cycle. In FIGS. 5 and 15, like operations (steps) therebetween, to which like reference characters are assigned, are omitted or simplified in description.

In step S13e after the operation of calculating the predicted value T0 of the temperature of the ceramic carrier 12 in step S12, the CPU 25a calculates, based on the integral ΣP0 of the supply power P0 calculated in step S11, the first fault threshold T11 and the second fault threshold T12 for the temperature of the ceramic carrier 21; these first and second fault thresholds T11 and T12 are used to determine whether there is an excessive temperature-rise fault in the ceramic carrier 21. The first fault threshold T11 is higher than the second fault threshold T12. The first threshold T11 is set to be higher than the activation temperature Tth.

For example, in the sixth embodiment, the storage medium 25b stores therein a map M7 designed as, for example, a data, table, a program, and/or a formula; this map M7 represents a correlation between a variable of the integral ΣP0 of the supply power P0 to the ceramic carrier 21 and a variable of the temperature of the ceramic carrier 21. The map M7 can have been determined based on data obtained by tests and/or simulations using the power supply system PS, the engine 10, and the EHC converter 20 or their equivalent computer models. The map M7 can be described in the diagnostic program PR7. Specifically, in step S13e, the CPU 25a references the map M7 using the integral ΣP0 of the supply power P0 calculated in step S11 as a key to extract, based on a result of the reference, each of the first and second fault thresholds T11 and T12 corresponding to the integral ΣP0 of the supply power P0. The map M7 is illustrated in FIG. 3. Of course, the map M7 can be omitted in the storage medium 25b of the controller 25 according to the first embodiment.

Next, the CPU 25a calculates, based on the integral ΣP0 of the supply power P0 calculated in step S11, the first and second non-uniformity threshold T21 and T22 for the temperature of the ceramic carrier 21; these first and second non-uniformity thresholds T21 and T22 are used to determine whether the ceramic carrier 21 is in the temperature nonuniform state in step S14e. The first non-uniformity threshold T21 is higher than the second non-uniformity threshold T22. For example, the CPU 25a calculates each of the first and second non-uniformity thresholds T21 and T22 based on the map M7 using the integral ΣP0 of the supply power P0 as a key.

Subsequent to the operation in step S14e, the CPU 25a carries out the operation in step S15 set forth above to calculate (measure) the resistance R of the electrically conducting path of the ceramic carrier 21 between the positive and negative electrodes 22 and 23 (the resistance R of the ceramic carrier 21). Next, in step S16, the CPU 25a carries out the operation in step S16 set forth above to convert the calculated value of the resistance R of the ceramic carrier 21 into a value of the temperature T of the ceramic carrier 21. That is, the value of the temperature T of the ceramic carrier 21 obtained by converting the resistance R of the ceramic carrier 21 is affected by the temperature of the locally heated portion 21p.

Next, in step S18, the CPU 25a captures the measured temperature value Tsen from the temperature sensor 26.

Following the operation in step S18, the CPU 25a compares the measured temperature value Tsen captured in step S18 with each of the first and second fault thresholds T11 and T12 calculated in step S13e to thereby determine, based on a result of the comparison, whether either the measured temperature value Tsen is higher than the first fault threshold T11 or it is equal to or lower than the second fault threshold T12 in step S20e. This determination in step S20e is to determine whether there is an excessive temperature-rise fault in the ceramic carrier 21 due to local heating.

In the sixth embodiment, as illustrated in FIG. 2, the portion 21g of the ceramic carrier 21 on which the temperature sensor 26 is mounted is different (separated) from the locally heated portion (lower-resistance portion) 21p (see FIG. 3).

This location of the temperature sensor 26 results in that the measured temperature value Tsen should be lower than the predicted value T0 of the temperature T of the ceramic carrier 21 if there is local heating in the portion 21p of the ceramic carrier 21. This is because current flowing through the portion 21g if there is local heating in the portion 21p of the ceramic carrier 21 is equal to or lower than that flowing through the ceramic carrier 21 if there is no local heating in the ceramic carrier 21.

In contrast, if the temperature sensor 26 were located on the locally heated portion 21p of the ceramic carrier 21, the measured temperature value Tsen should be higher than the predicted value T0 of the temperature T of the ceramic carrier 21 if there is local heating in the portion 21p of the ceramic carrier 21.

In view of these points based on the location of the temperature sensor 26, if it is determined that either the measured temperature value Tsen is higher than the first fault threshold T11 or it is equal to or lower than the second fault threshold T12 (YES in step S20e), the CPU 25a determines that the temperature nonuniform state is facilitated to a degree that there may be a risk of thermal damage of the EHC converter 20. In other words, the CPU 25a determines that an excessive temperature-rise fault occurs in the ceramic carrier 21. Then, the CPU 25a sets a fault flag in the form of, for example, a bit to ON (1) in step S21. For example, the fault flag is set to an initial value of OFF (0).

Otherwise, if neither the measured temperature value Tsen is higher than the first fault threshold T11 nor it is equal to or lower than the second fault threshold T12 (NO in step S20e), the CPU 25a determines that the temperature nonuniform state is not facilitated to a degree that there may be a risk of thermal damage of the EHC converter 20. Then, the CPU 25a sets or maintains the fault flag to OFF (0) in step S22.

Following the operation in step S21, the CPU 25a carries out the operations in steps S23, S24, and S25 in the same procedure as corresponding steps illustrated in FIG. 5.

On the other hand, subsequent to the operation in step S22, the CPU 25a compares the measured temperature value Tsen captured in step S18 with each of the first and second non-uniformity thresholds T21 and T21 calculated in step S14e to thereby determine, based on a result of the comparison, whether either the measured temperature value Tsen is higher than the first non-uniformity threshold T21 or it is equal to or lower than the second non-uniformity threshold T22 in step S30e. This determination in step S30e is to determine whether the ceramic carrier 21 is in the temperature nonuniform state due to local heating.

If either the measured temperature value Tsen is higher than the first non-uniformity threshold T21 or it is equal to or lower than the second non-uniformity threshold T22 (YES in step S30e), the CPU 25a determines that the ceramic carrier 21 is in the temperature nonuniform state. Then, the CPU 25a sets a non-uniformity flag in the form of, for example, a bit to ON (1) in step S31; the non-uniformity flag of ON represents that the ceramic carrier 21 is in the temperature nonuniform state. For example, the non-uniformity flag is set to an initial value of OFF (0).

Otherwise, if neither the measured temperature value Tsen is higher than the first non-uniformity threshold T21 nor it is equal to or lower than the second non-uniformity threshold T22 (NO in step S30e), the CPU 25a determines that the ceramic carrier 21 is not in the temperature nonuniform state. Then, the CPU 25a terminates the diagnostic program PR7 and repeats the operations in the diagnostic program PR7 from step S10 in the next cycle.

Following the operation in step S31, the CPU 25a controls the power source 24 to reduce supply power to the ceramic carrier 21 in step S32. For example, in the sixth embodiment, the CPU 25a reduces the supply power to the ceramic carrier 21 up to zero.

Subsequent to the operation in step S32, the CPU 25a updates the value of the temperature T obtained in step S16, and compares the updated value of the temperature value T with the predicted value T0 calculated in step S12 to thereby determine, based on a result of the comparison, whether the updated value of the temperature T is equal to or lower than the predicted value T0 in step S33e. This determination in step S33e is to determine whether the non-uniformity of the temperature distribution in the ceramic carrier 21 is reduced to a degree that the temperature state of the ceramic carrier 21 can be taken to temperature uniform state.

If the updated value of the temperature T is equal to or lower than the predicted value T0 (YES in step S33e), the CPU 25a determines that the temperature state of the ceramic carrier 21 is returned to a temperature uniform state. Then, the CPU 25a sets the non-uniformity flag to OFF in step S34, and restarts the supply of power to the ceramic carrier 21 with a value of the supplied power limited to be lower than the supply power P0; the supply power P0 was determined at the last time when the temperature state of the ceramic carrier 21 was determined to be a temperature uniform state with the temperature non-uniformity flag of OFF in step S35. Thereafter, the CPU 25a terminates the diagnostic program PR7 and repeats the operations in the diagnostic program PR7 from step S10 in the next cycle.

Otherwise, if the updated value of the temperature T is higher than the predicted value T0 (NO in step S33e), the CPU 25a determines that the ceramic carrier 21 remains the temperature nonuniform state. Then, the CPU 25a repeats step S33e while updating the value of the temperature T until the updated value of the temperature T is equal to or lower than the predicted value T0 (YES in step S33e).

Note that, if the CPU 25a adjusts the duty cycle of the switch 24a such that the supply power to the ceramic carrier 21 is higher than zero in step S32, and the determination in step S33e is negative, the CPU 25a terminates the diagnostic program PR7 and repeats the operations in the diagnostic program PR7 from step S11 in the next cycle. This is because the supply power P0 to the ceramic carrier 21 has been determined in step S32.

Figure 16:
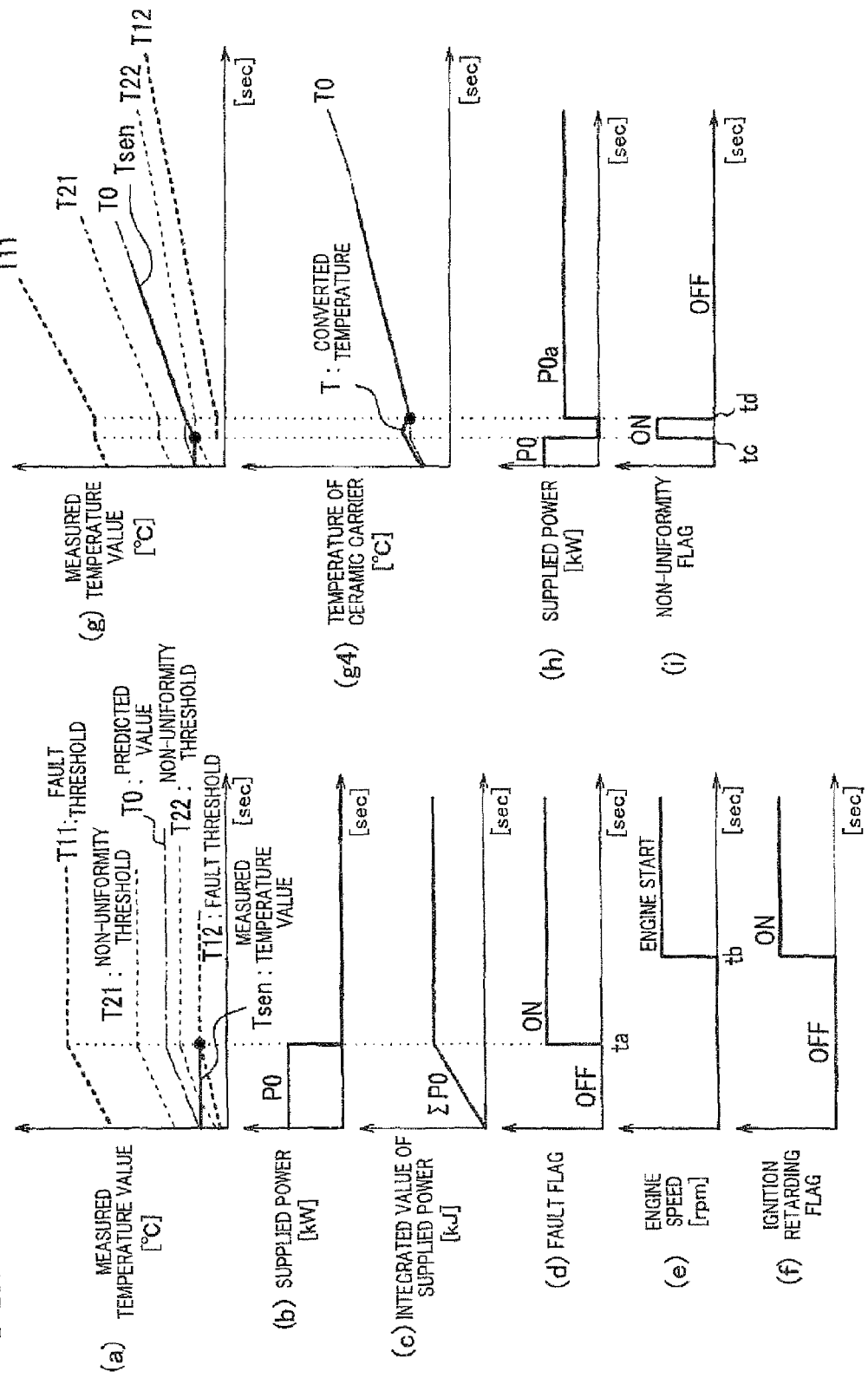
FIG. 16 is a timing chart schematically illustrating the transitions of the various parameters during the CPU running the diagnostic program if a portion of the ceramic carrier on which a temperature sensor is mounted is different from a locally heated portion of the ceramic carrier according to the sixth embodiment.

FIG. 16 is a timing chart schematically illustrating the transitions of various parameters during the CPU 25a running the diagnostic program PR7 if the portion 21g of the ceramic carrier 21 on which the temperature sensor 26 is mounted is different from the locally heated portion 21p of the ceramic carrier 21. FIG. 17 is also a timing chart schematically illustrating the transitions of the various parameters during the CPU 25a running the diagnostic program PR7 if the portion 21g of the ceramic carrier 21 on which the temperature sensor 26 is mounted is identical to the locally heated portion 21p of the ceramic carrier 21.

The various parameters include the measured temperature value Tsen, each of the first and second fault thresholds T11 and T12, each of the first and second non-uniformity thresholds T21 and T22, the predicted value T0, the supply power P0 to the ceramic carrier 21, the integral ΣP0 of the supply power P0, the fault flag, the engine speed, the ignition retarding flag, and the non-uniformity flag.

Let us describe first the transitions of the various parameters during the CPU 25a running the diagnostic program PR7 with reference to FIG. 16.

(a) to (f) of FIG. 16 demonstrate the transitions of these parameters except for the non-uniformity flag if the temperature of the portion 21p rises abruptly due to local heating so that an excessive temperature-rise fault occurs in the ceramic carrier 21. (g) to (h) of FIG. 16 demonstrate the transitions of some of these parameters if the temperature of the portion 21g on which the temperature sensor 26 is mounted drops as compared with the portion 21p so that the ceramic carrier 21 is in the temperature nonuniform state. Note that the descriptions of the parameters in (a) to (h) of FIG. 16, which are identical to those of the parameters (a) to (h) of FIG. 5, are omitted or simplified.

First, let us describe the transitions of the parameters for the case of the occurrence of an excessive temperature-rise fault in the ceramic carrier 21 during the CPU 25a running the diagnostic program PR7 with reference to (a) to (f) of FIG. 16.

Although the supply of the power P0 determined in step S10 is started (see (b) of FIG. 16), the measured temperature value Tsen does not rise if the temperature of the portion 21p abruptly rises. In the case illustrated in (a) of FIG. 16, the measured temperature value Tsen does not rise although the second fault threshold T12 rises with increase in the integral ΣP0 of the supply power P0 to the ceramic carrier 21. At the time when the measured temperature value Tsen reaches the second fault threshold T12 at time ta, the fault flag is set to ON in step S21 (see (d) of FIG. 16), and the supply of power to the ceramic carrier 21 is stopped in step S23 (see (b) of FIG. 16).

Note that, because the supply power P0 has been supplied up to the time ta, the integral ΣP0 of the supply power P0 rises up to the time ta (see (c) of FIG. 16). Thus, each of the first and second fault thresholds T11 and T12, each of the first and second non-uniformity thresholds T21 and T22, and the predicted value T0 rises with increase in the integral ΣP0 of the supply power P0 up to the time ta (see (a) of FIG. 16).

Thereafter, if the catalyst warm-up request has continued at time tb of the engine 10 starting up in response to the driver's operation in step S24, the ignition retarding control is carried out in step S25 with the ceramic carrier 21 being deenergized (see (e) and (f) of FIG. 16).

Next, let us describe the transitions of some of the parameters for the case where the ceramic carrier 21 is in the temperature nonuniform state during the CPU 25a running the diagnostic program PR7 with reference to (g) to (i) of FIG. 16.

When the supply of the power P0 determined in step S10 is started (see (h) of FIG. 16), the temperature T of the ceramic carrier 21 (the EHC converter 20) calculated based on the resistance R of the ceramic carrier 21 rises whereas the measured temperature value Tsen is substantially constant. This is because, as described above, the temperature T of the ceramic carrier 21 calculated based on the resistance R of the ceramic carrier 21 is affected by the temperature of the locally heated portion 21p.

As illustrated in (g) of FIG. 16, when the measured temperature value Tsen reaches the second non-uniformity threshold T22 at time tc, the non-uniformity flag is set to ON in step S31 (see (i) of FIG. 16), and the supply of power to the ceramic carrier 21 is reduced, that is, stopped in step S32 (see (h) of FIG. 16). The reduction in the supply of power to the ceramic carrier 21 causes heat to be conducted from the locally heated portion 21p to another portion in the ceramic carrier 21, resulting in gradual drop of the temperature T of the ceramic carrier 21 calculated based on the resistance R of the ceramic carrier 21 (see (g4) of FIG. 16).

The heat from the locally heated portion 21p is conducted to the portion 21g of the ceramic carrier 21 on which the temperature sensor 26 is mounted so that the measured temperature value Tsen gradually rises (see (g) of FIG. 16).

When the measured temperature value Tsen reaches the predicted value $\Delta T0$ at time td with the resistance-based temperature T of the ceramic carrier 21 reaching the predicted value $\Delta T0$, it is determined that the temperature state of the ceramic carrier 21 is returned to a temperature uniform state (see step S33e, (g), and (g4) of FIG. 16). Thus, the non-uniformity flag is set to OFF in step S34 (see (i) of FIG. 16), and the supply of power to the ceramic carrier 21 is restarted (see (h) of FIG. 16), in other words, power supplied to the ceramic carrier 21 is increased from zero to a value P0a with the value P0a limited to be lower than the supply power P0. The supply power P0 was determined at the last time when the temperature state of the ceramic carrier 21 was determined to be a temperature uniform state with the temperature non-uniformity flag of OFF in step S35 (see (h) of FIG. 16).

Note that, because the value of the supplied power to the ceramic carrier 21 with the temperature non-uniformity flag of OFF is limited to be lower than the previous value of the supplied power with the temperature non-uniformity flag of ON, the gradient of variation of each of the first and second fault thresholds T11 and T12, the first and second non-uniformity thresholds T21 and T22, and the predicted value T0 after the time td is reduced as compared with its gradient of variation up to the time tc (see (g) of FIG. 16).

Figure 17:
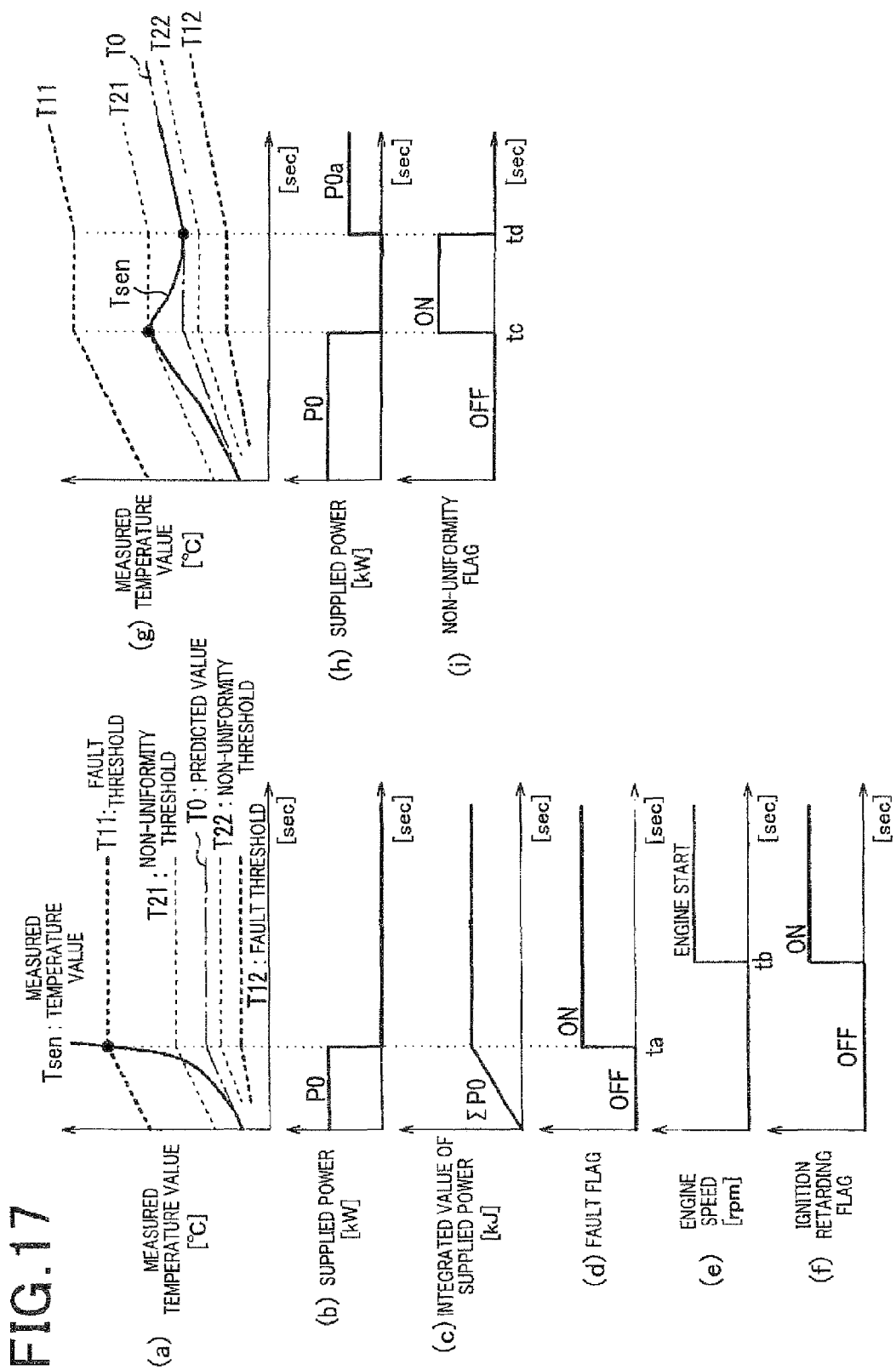
FIG. 17 is a timing chart schematically illustrating the transitions of the various parameters during the CPU running the diagnostic program if the portion of the ceramic carrier on which a temperature sensor is mounted is identical to the locally heated portion of the ceramic carrier according to the sixth embodiment.

Next, let us describe the transitions of the parameters for the case of the occurrence of an excessive temperature-rise fault in the ceramic carrier 21 during the CPU 25a running the diagnostic program PR7 with reference to (a) to (f) of FIG. 17.

When the supply of the power P0 determined in step S10 is started (see (b) of FIG. 17), the measured temperature value Tsen rises abruptly due to local heating over the first non-uniformity threshold T21, and further over the first fault threshold T11 (see (a) of FIG. 17). This is because the measured temperature value Tsen is substantially equivalent to the resistance-based temperature T. At the time when the measured temperature value Tsen becomes higher than the first fault threshold T11 at time ta, the fault flag is set to ON in step S21 (see (d) of FIG. 17), and the supply of power to the ceramic carrier 21 is stopped in step S23 (see (b) of FIG. 17).

Note that, because the supply power P0 has been supplied up to the time ta, the integral $\Sigma P0$ of the supply power P0 rises up to the time ta (see (c) of FIG. 17). Thus, each of the first and second fault thresholds T11 and T12, each of the first and second non-uniformity thresholds T21 and T22, and the predicted value T0 rises with increase in the integral $\Sigma P0$ of the supply power P0 up to the time ta (see (a) of FIG. 17).

Thereafter, if the catalyst warm-up request has continued at time tb of the engine 10 starting up in response to the driver's operation in step S24, the ignition retarding control is carried out in step S25 with the ceramic carrier 21 being deenergized (see (e) and (f) of FIG. 17).

Next, let us describe the transitions of some of the parameters for the case where the ceramic carrier 21 is in the temperature nonuniform state during the CPU 25a running the diagnostic program PR7 with reference to (g) to (i) of FIG. 17.

When the supply of the power P0 determined in step S10 is started (see (h) of FIG. 17), the measured temperature value Tsen rises, due to local heating, gradually as compared with the increase in the measured temperature value Tsen in (a) of FIG. 16 so that, when the measured temperature value Tsen becomes higher than the first temperature non-uniformity threshold T21 at time tc, the non-uniformity flag is set to ON in step S31 (see (i) of FIG. 17), and the supply of power to the ceramic carrier 21 is reduced, that is, stopped in step S32 (see (h) of FIG. 17). The reduction in the supply of power to the ceramic carrier 21 causes the measured temperature value Tsen to gradually drop (see (g) of FIG. 17).

Thereafter, when the temperature T of the ceramic carrier 21, equivalent to the measured temperature value Tsen, reaches the predicted value T0 at time td, it is determined that the temperature state of the ceramic carrier 21 is returned to a temperature uniform state so that the non-uniformity flag is set to OFF in step S34 (see (i) of FIG. 17). Thus, the supply of power to the ceramic carrier 21 is restarted (see (h) of FIG. 17), in other words, power supplied to the ceramic carrier 21 is increased from zero to a value P0a with the value P0a limited to be lower than the supply power P0. The supply power P0 was determined at the last time when the temperature state of the ceramic carrier 21 was determined to be a temperature uniform state with the temperature non-uniformity flag of OFF in step S35 (see (h) of FIG. 17).

Note that, because the value of the supplied power to the ceramic carrier 21 with the temperature non-uniformity flag of OFF is limited to be lower than the previous value of the supplied power with the temperature non-uniformity flag of ON, the gradient of variation of each of the first and second fault thresholds T11 and T12, the first and second non-uniformity thresholds T21 and T22, and the predicted value T0 after the time td is reduced as compared with its gradient of variation up to the time tc (see (g) of FIG. 17).

As described above, the diagnostic apparatus according to the sixth embodiment is configured to determine that the ceramic carrier 21 is in the temperature nonuniform state if either the temperature value Tsen of the ceramic carrier 21 measured by the temperature sensor 26 is higher than the first non-uniformity threshold T21 or it is equal to or lower than the second non-uniformity threshold T22; these thresholds T21 and T22 are calculated based on the integral $\Sigma P0$ of the supply power P0 to the ceramic carrier 21 (see YES in step S30e).

This configuration allows the CPU 25a to diagnose whether the ceramic carrier 21 is in the temperature nonuniform state as immediately as possible.

If either the temperature value Tsen of the ceramic carrier 21 measured by the temperature sensor 26 is higher than the first fault threshold T11 or it is equal to or lower than the second fault threshold T12 (see YES in step S20e), the diagnostic apparatus according to the sixth embodiment is configured to determine that there is an excessive temperature-rise fault in the ceramic carrier 21 due to local heating. This configuration diagnoses whether there is an excessive temperature-rise fault in the ceramic carrier 21 as immediately as possible.

Accordingly, the diagnostic apparatus according to the sixth embodiment achieves the same technical effects as those in the first embodiment.

Seventh Embodiment

A diagnostic apparatus for the temperature state of the ceramic carrier 21 according to the seventh embodiment of the present disclosure will be described hereinafter with reference to FIGS. 18 and 19.

The structure and/or functions of the diagnostic apparatus according to the seventh embodiment are different from those of the diagnostic apparatus according to the first embodiment by the following points. So, the different points will be mainly described hereinafter.

The diagnostic apparatus according to the first embodiment carries out, for each execution cycle of the diagnostic program PR2, the determination of whether there is an excessive temperature-rise fault in the ceramic carrier 21 based on the comparison of the temperature T of the ceramic carrier 21 with the fault threshold T1 calculated based on the integral $\Sigma P0$ of the power supplied to the ceramic carrier 21.

In contrast, the diagnostic apparatus according to the seventh embodiment is configured to carry out the determination of whether there is an excessive temperature-rise fault in the ceramic carrier 21 based on the comparison of the integral $\Sigma P0$ of the supply power P0 to the ceramic carrier 21 with a preset threshold $\Sigma P3$ as long as the temperature T of the ceramic carrier 21 is higher than a preset threshold T3.

Figure 18:
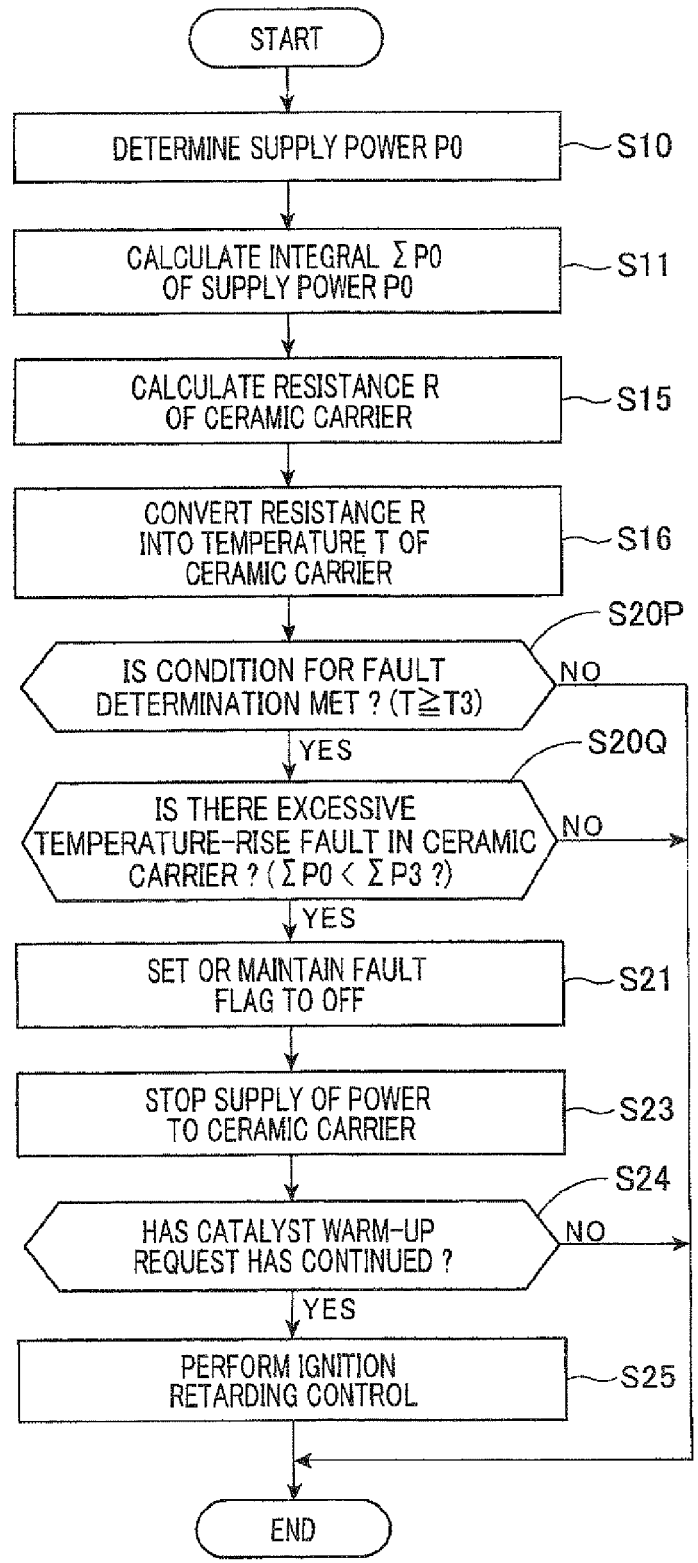
FIG. 18 is a flowchart schematically illustrating a sequence of operations of the CPU of the controller in accordance with a diagnostic program according to the seventh embodiment of the present disclosure.

FIG. 18 is a flowchart schematically illustrating a sequence of operations of the CPU 25a in accordance with a diagnostic program PR8 stored in the storage medium 25b in place of or in addition to the diagnostic program PR2 (see FIG. 3). Of course, the diagnostic program PR8 can be omitted in the storage medium 25b of the controller 25 according to the first embodiment.

The CPU 25a runs the diagnostic program PR8 in response to the occurrence of the catalyst warm-up request as a trigger, and repeatedly runs the diagnostic program PR8 in a preset cycle. In FIGS. 5 and 18, like operations (steps) therebetween, to which like reference characters are assigned, are omitted or simplified in description.

In step S20P after the operation of calculating a value of the temperature T of the ceramic carrier 21, the CPU 25a determines whether the calculated value of the temperature T is equal to or higher than the threshold T3; this threshold T3 can be set to a fixed value or a value variable depending on the integral $\Sigma P0$ of the supply power P0 to the ceramic carrier 21 or the supply power P0 to the ceramic carrier 21.

Specifically, the CPU 25a determines whether there is an excessive temperature-rise fault in the ceramic carrier 21 in step S20Q as long as it is determined that the calculated value of the temperature T of the ceramic carrier 21 is equal to or higher than the threshold T3 (YES in step S20P). In other words, the CPU 25a terminates the diagnostic program PR8 unless it is determined that the calculated value of the temperature T of the ceramic carrier 21 is equal to or higher than the threshold T3 (NO in step S20P). That is, in step S20P, the CPU 25a determines whether a condition for fault determination is met.

In step S20Q, the CPU 25a compares the integral $\Sigma P0$ of the supply power P0 to the ceramic carrier 21 calculated in step S11 with the threshold $\Sigma P3$ to thereby determine, based on a result of the comparison, whether the integral $\Sigma P0$ of the supply power P0 to the ceramic carrier 21 is lower than the threshold $\Sigma P3$. This determination in step S20Q is to determine whether there is an excessive temperature-rise fault in the ceramic carrier 21 due to local heating.

The threshold P3 is set to integrated power supplied to the ceramic carrier 21 required to increase the temperature of the ceramic carrier 21 up to the calculated value of the temperature T assuming that there is no local heating in the ceramic carrier 21. The threshold $\Sigma P3$ can be set to a fixed value or a value variable depending on the integral $\Sigma P0$ of the supply power P0 to the ceramic carrier 21 or the supply power P0 to the ceramic carrier 21.

If the integral $\Sigma P0$ of the supply power P0 to the ceramic carrier 21 is lower than the threshold $\Sigma P3$ (YES in step S20Q), the CPU 25a determines that the temperature nonuniform state is facilitated to a degree that there may be a risk of thermal damage of the EHC converter 20. In other words, the CPU 25a determines that an excessive temperature-rise fault occurs in the ceramic carrier 21. Then, the CPU 25a sets a fault flag in the form of, for example, a bit to ON (1) in step S21. For example, the fault flag is set to an initial value of OFF (0).

Otherwise, if the integral $\Sigma P0$ of the supply power P0 to the ceramic carrier 21 is equal to or higher than the threshold $\Sigma P3$ (NO in step S20Q), the CPU 25a determines that the temperature nonuniform state is not facilitated to a degree that there may be a risk of thermal damage of the EHC converter 20. Then, the CPU 25a sets or maintains the fault flag to OFF (0), terminating the diagnostic program PR8.

Following the operation in step S21, the CPU 25a carries out the operations in steps S23, S24, and S25 in the same procedure as corresponding steps illustrated in FIG. 5.

Figure 19:
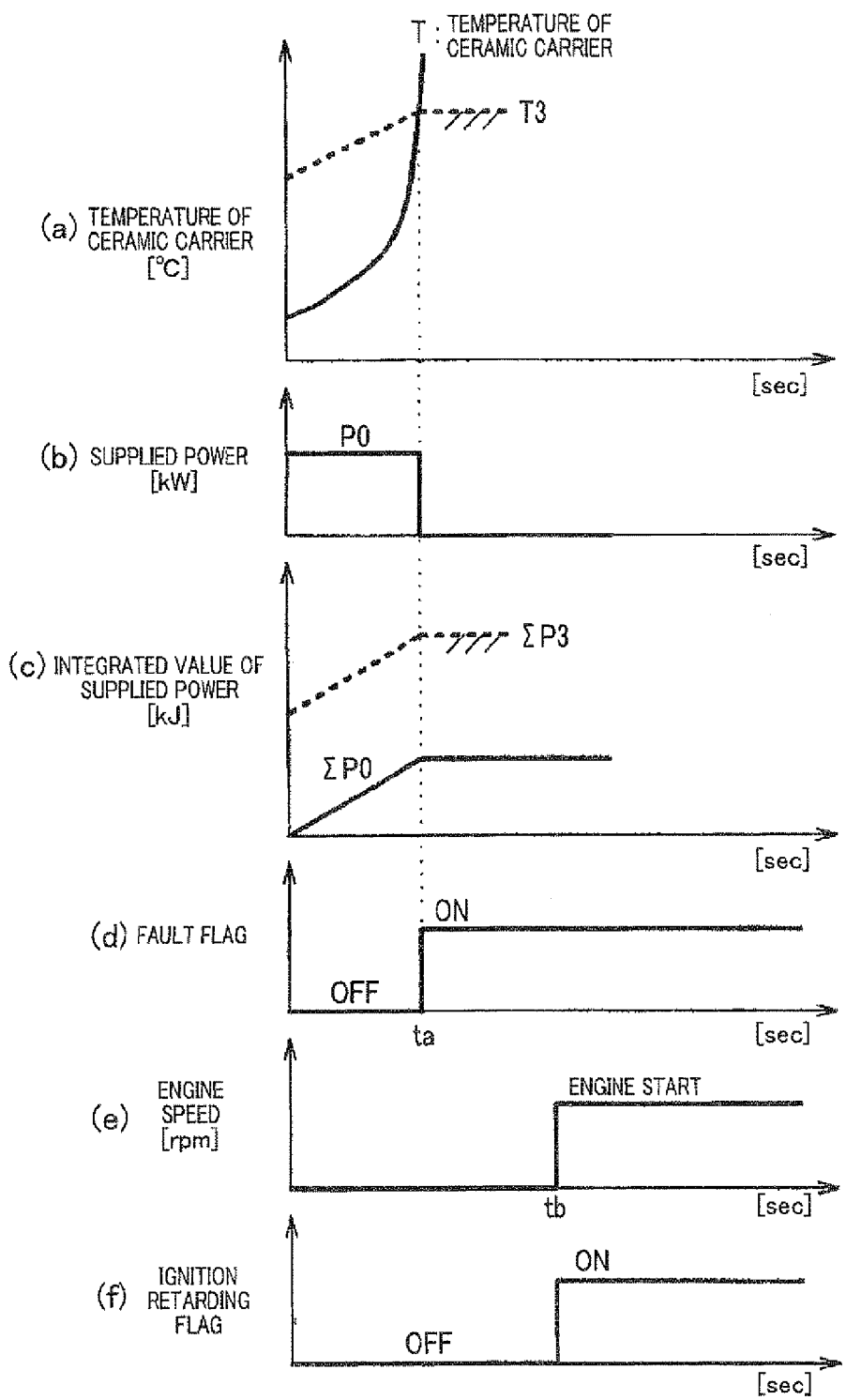
FIG. 19 is a timing chart schematically illustrating the transitions of the various parameters during the CPU running the diagnostic program according to the seventh embodiment.

(a) to (f) of FIG. 19 demonstrate the transitions of the parameters identical to the parameters except for the nonuniformity flag according to the first embodiment if the temperature T of the ceramic carrier 21 rises abruptly due to local heating so that an excessive temperature-rise fault occurs in the ceramic carrier 21.

Note that the descriptions of the parameters in (a) to (f) of FIG. 19, which are identical to those of the parameters (a) to (f) of FIG. 5, are omitted or simplified.

When the supply of the power P0 determined in step S10 is started (see (b) of FIG. 19), the temperature T of the ceramic carrier 21 rises abruptly due to local heating (see (a) of FIG. 19). When the temperature T of the ceramic carrier 21 exceeds the threshold T3 at time ta, the integral $\Sigma P0$ of the supply power P0 to the ceramic carrier 21 is compared with the threshold $\Sigma P3$ to thereby determine whether there is an excessive temperature-rise fault in the ceramic carrier 21.

As illustrated in (c) of FIG. 19 as an example, because the integral $\Sigma P0$ of the supply power P0 to the ceramic carrier 21 is lower than the threshold $\Sigma P3$ (YES in step S20Q), it is determined that there is an excessive temperature-rise fault in the ceramic carrier 21. This results in that the fault flag is set to ON in step S21 (see (d) of FIG. 19), and the supply of power to the ceramic carrier 21 is stopped in step S23 (see (b) of FIG. 19).

Thereafter, if the catalyst warm-up request has continued at time tb of the engine 10 starting up in response to the driver's operation in step S24, the ignition retarding control is carried out in step S25 with the ceramic carrier 21 being deenergized (see (e) and (f) of FIG. 19).

As described above, the diagnostic apparatus according to the seventh embodiment is configured to carry out the determination of whether there is an excessive temperature-rise fault in the ceramic carrier 21 as long as the calculated value of the temperature T of the ceramic carrier 21 is equal to or higher than the threshold T3. In other words, the diagnostic apparatus according to the seventh embodiment is configured not to carry out the determination of whether there is an excessive temperature-rise fault in the ceramic carrier 21 unless the calculated value of the temperature T of the ceramic carrier 21 is equal to or higher than the threshold T3.

Accordingly, the diagnostic apparatus according to the seventh embodiment achieves, in addition to the same technical effects as those in the first embodiment, a technical effect of reducing the computing load required to carry out the determination of whether there is an excessive temperature-rise fault in the ceramic carrier 21.

The present disclosure is not limited to the aforementioned embodiments, and can be modified as follows. Note that some of the subject matters of the first to seventh embodiments set forth above can be freely combined with each other.

In the seventh embodiment, the temperature T of the ceramic carrier 21 is used to determine whether to carry out the determination in step S20Q, but the present disclosure is not limited thereto. Specifically, in place of the temperature T of the ceramic carrier 21, the resistance R of the ceramic carrier 21, the supply current I to the ceramic carrier 21, the rate ΔT of temperature change of the ceramic carrier 21, the rate ΔR of resistance change of the ceramic carrier 21, or the measured temperature value Tsen, which have been used in the respective second to sixth embodiments, can be used to determine whether to carry out the determination in step S20Q.

The diagnostic apparatus according to each of the first to seventh embodiments is configured to compare a threshold calculated based on the integral ΣP0 of the supply power P0 to the ceramic carrier 21 or the supply power P0 to the ceramic carrier 21 with a corresponding physical parameter indicative of the temperature of the ceramic carrier 21, such as the resistance-based temperature T of the ceramic carrier 22, the resistance R of the ceramic carrier 21, the supply current I to the ceramic carrier 21, the rate ΔT of temperature change of the ceramic carrier 21, the rate ΔR of resistance change of the ceramic carrier 21, and the measured temperature value Tsen. The diagnostic apparatus according to each of the first to seventh embodiments is also configured to determine whether: the ceramic carrier 21 is in the temperature nonuniform state, and there is an excessive temperature-rise fault in the ceramic carrier 21 based on a result of the comparison. The present disclosure is however not limited to the configurations.

Specifically, the present disclosure can include a modified diagnostic apparatus configured to compare any one of the predicted values T0, R0, I0, ΔT0, and ΔR0 with a corresponding physical parameter indicative of the temperature of the ceramic carrier 21, and determine whether: the ceramic carrier 21 is in the temperature nonuniform state, and there is an excessive temperature-rise fault in the ceramic carrier 21 based on a result of the comparison.

For example, if the difference between a predicted value and a corresponding physical parameter indicative of the temperature of the ceramic carrier 21 is equal to or greater than a preset value, the modified diagnostic apparatus can determine that the ceramic carrier 21 is in the temperature nonuniform state, or there is an excessive temperature-rise fault in the ceramic carrier 21.

In each of steps S12 to S14, S12a to S14a, S12b to S14b, S12d to S14d, S13e, and S14e, the supply power P0 to the ceramic carrier 21 can be used to calculate a corresponding physical parameter indicative of the temperature of the ceramic carrier 21 in place of the integral ΣP0 of the supply power P0 to the ceramic carrier 21.

In the fifth embodiment, if there is no local heating in the ceramic carrier 21, the supply power P0 to the ceramic carrier 21 is in proportion to the resistance R of the ceramic carrier 21 in accordance with the following equation (3):

$$P0 = I \times I \times R \qquad (3)$$

where I represents supply current to the ceramic carrier 21 based on the supply power P0.

Differentiating both sides of the equation (3) allows the following equation (4) to be obtained:

$$\Delta P0 = C3 \times \Delta R \qquad (4)$$

where C3 is a proportional constant, and ΔP0 represents the rate of change of the supply power P0 to the ceramic carrier 21.

Thus, the present disclosure can include a further modified diagnostic apparatus configured to determine whether: the ceramic carrier 21 is in the temperature nonuniform state, and there is an excessive temperature-rise fault in the ceramic carrier 21 based on the comparison of the rate ΔR of resistance change of the ceramic carrier 21 with threshold values calculated based on the rate of change of the supply power P0 to the ceramic carrier 21.

The diagnostic apparatuses according to the respective first to sixth embodiments each carry out both the determination of whether the ceramic carrier 21 is in the temperature nonuniform state, and the determination of whether there is an excessive temperature-rise fault in the ceramic carrier 21. However, the present disclosure is however not limited to the diagnostic apparatuses.

Specifically, the present disclosure can include an alternative modified diagnostic apparatus configured to carry out any one of the determination of whether the ceramic carrier 21 is in the temperature nonuniform state, and the determination of whether there is an excessive temperature-rise fault in the ceramic carrier 21.

In each of the first to seventh embodiments, the present disclosure is applied to the EHC converter 20 using the ceramic carrier 21 illustrated as an example in FIG. 2, but can be applied to an EHC member using a conductive catalyst carrier, such as a metal catalyst carrier, with the NTC characteristic set forth above.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. An apparatus for diagnosing temperature state of a catalyst converter comprising a catalyst for cleaning an emission, and a conductive carrier for carrying the catalyst, the conductive carrier being energized for temperature rise of the catalyst, the conductive carrier having a characteristic in which resistance drops with temperature increase, the apparatus comprising:
   a first obtaining unit configured to obtain an integral of supply power to the conductive carrier for energization of the conductive carrier from occurrence of a warm-up request to the conductive carrier;
   a second obtaining unit configured to obtain a predicted value of a parameter indicative of a temperature of the conductive carrier based on a current and a voltage supplied to the conductive carrier; and
   a diagnosing unit configured to:
      calculate, based on the integral of the supply power to the conductive carrier, a first threshold used to determine whether the conductive carrier is in temperature nonuniform state; and
      determine, based on the comparison between the first threshold and the predicted value of the parameter indicative of the temperature of the conductive carrier, whether the conductive carrier is in temperature uniform state or in the temperature nonuniform state due to local heating in the conductive carrier as diagnosis of the temperature state of the conductive carrier.

2. The apparatus according to claim 1, further comprising a power reducer configured to reduce the supply power to the conductive carrier when it is determined that the conductive carrier is in the temperature nonuniform state.

3. The apparatus according to claim 2, wherein the diagnosing unit cyclically carries out the determination of whether the conductive carrier is in the temperature nonuniform state or the temperature uniform state, and, when it is determined that the conductive carrier is in the temperature uniform state at a present cycle while reducing the supply power to the conductive carrier once it has been determined that the conductive carrier is in the temperature nonuniform state, the power reducer increases the supply power to the conductive carrier while limiting a first value of the supply power to the conductive carrier at the present cycle in which it is determined that the conductive carrier is in the temperature uniform state to be lower than a second value of the supply power to the conductive carrier at a previous cycle in which it is determined that the conductive carrier is in the temperature uniform state.

4. The apparatus according to claim 1, further comprising a determiner configured to determine, based on the comparison between the first threshold and the predicted value of the parameter indicative of the temperature of the conductive carrier, whether there is a fault in the conductive carrier.

5. The apparatus according to claim 4, wherein the determiner is configured to determine, based on the comparison between the first threshold and the predicted value of the parameter indicative of the temperature of the conductive carrier, whether there is a fault in the conductive carrier due to progress of the temperature nonuniform state in the conductive carrier.

6. The apparatus according to claim 5, further comprising a power-supply stop unit configured to stop supply of the power to the conductive carrier when it is determined that there is a fault in the conductive carrier due to the progress of the temperature nonuniform state in the conductive carrier.

7. The apparatus according to claim 4, wherein the determiner is configured to calculate a second threshold based on the the integral of the supply power to the conductive carrier, and determine, based on the comparison between the second threshold and the predicted value of the parameter indicative of the temperature of the conductive carrier, whether there is a fault in the conductive carrier.

8. The apparatus according to claim 1, wherein the parameter is any one of a supply current through a portion of the conductive carrier based on the supply power, a resistance of the portion of the conductive carrier through which the supply current flows, a calculated value of the temperature of the conductive carrier based on the resistance, a measured value of the temperature of the conductive carrier, a rate of change of the temperature of the conductive carrier, a rate of change of the resistance of the portion of the conductive carrier, and a rate of change of the supply current.

9. The apparatus according to claim 1, wherein the conductive carrier is made from an SiC material having the characteristic in which resistance drops with temperature increase.

10. A computer program product for an apparatus for diagnosing temperature state of a catalyst converter, the catalyst converter comprising a catalyst for cleaning an emission, and a conductive carrier for carrying the catalyst, the conductive carrier being energized for temperature rise of the catalyst, the conductive carrier having a characteristic in which resistance drops with temperature increase, the computer program product comprising:
a computer usable medium; and
a set of computer program instructions embodied on the computer useable medium, the instructions including:
a first instruction to obtain an integral of supply power to the conductive carrier for energization of the conductive carrier from occurrence of a warm-up request to the conductive carrier;
a second instruction to obtain a predicted value of a parameter indicative of a temperature of the conductive carrier based on a current and a voltage supplied to the conductive carrier; and
a third instruction to:
calculate, based on the integral of the supply power to the conductive carrier, a first threshold used to determine whether the conductive carrier is in temperature nonuniform state; and
determine, based on the comparison between the first threshold and the predicted value of the parameter indicative of the temperature of the conductive carrier, whether the conductive carrier is in temperature uniform state or in the temperature nonuniform state due to local heating in the conductive carrier as diagnosis of the temperature state of the conductive carrier.

11. An apparatus for diagnosing temperature state of a catalyst converter comprising a catalyst for cleaning an emission, and a conductive carrier for carrying the catalyst, the conductive carrier being energized for temperature rise of the catalyst, the conductive carrier having a characteristic in which resistance drops with temperature increase, the apparatus comprising:
a first obtaining unit configured to obtain a value of supply power to the conductive carrier for energization of the conductive carrier from occurrence of a warm-up request to the conductive carrier;
a second obtaining unit configured to obtain a predicted value of a parameter indicative of a temperature of the conductive carrier based on a current and a voltage supplied to the conductive carrier; and
a diagnosing unit configured to:
calculate, based on the value of the supply power to the conductive carrier, a rate of change of the temperature of the conductive carrier as a threshold value, the rate of change of the temperature of the conductive carrier being used to determine whether the conductive carrier is in temperature nonuniform state; and
determine, based on the comparison between a rate of change of the parameter obtained by the second obtaining unit and the threshold value calculated based on the value of the supply power to the conductive carrier, whether the conductive carrier is in temperature uniform state or in the temperature nonuniform state due to local heating in the conductive carrier as diagnosis of the temperature state of the conductive carrier.

* * * * *